(12) United States Patent
Heo et al.

(10) Patent No.: US 11,128,857 B2
(45) Date of Patent: Sep. 21, 2021

(54) INTRA PREDICTION-BASED IMAGE CODING METHOD USING MPM LIST AND APPARATUS THEREFOR

(71) Applicant: LG ELECTRONICS INC., Seoul (KR)

(72) Inventors: Jin Heo, Seoul (KR); Seunghwan Kim, Seoul (KR); Ling Li, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/837,857

(22) Filed: Apr. 1, 2020

(65) Prior Publication Data

US 2020/0244954 A1 Jul. 30, 2020

Related U.S. Application Data

(63) Continuation of application No. PCT/KR2019/011542, filed on Sep. 6, 2019.
(Continued)

(30) Foreign Application Priority Data

Sep. 6, 2018 (KR) .......................... 10-2018-0106665

(51) Int. Cl.
*H04B 1/66* (2006.01)
*H04N 19/105* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11)

(58) Field of Classification Search
CPC .... H04N 19/176; H04N 19/593; H04N 19/11; H04N 19/44; H04N 19/61; H04N 19/463;
(Continued)

(56) References Cited

U.S. PATENT DOCUMENTS

2014/0226717 A1* 8/2014 Lim ..................... H04N 19/124
375/240.12
2017/0332084 A1* 11/2017 Seregin ................ H04N 19/159
(Continued)

FOREIGN PATENT DOCUMENTS

KR 10-1490216 B1 2/2015
KR 10-1502674 B1 3/2015
(Continued)

*Primary Examiner* — Masum Billah
(74) *Attorney, Agent, or Firm* — Dentons US LLP

(57) ABSTRACT

An image decoding method according to the present disclosure comprises deriving a first candidate intra prediction mode based on a first neighboring block of a current block; deriving a second candidate intra prediction mode based on a second neighboring block of the current block; constructing MPM (Most Probable Mode) list of the current block based on the first candidate intra prediction mode and the second candidate intra prediction mode; deriving an intra prediction mode for the current block based on the MPM list; and generating a prediction sample for the current block based on the intra prediction mode, wherein the first neighboring block is a left neighboring block located at the lowermost side among neighboring blocks adjacent to a left boundary of the current block, and wherein the second neighboring block is an upper neighboring block located at the rightmost side among neighboring blocks adjacent to an upper boundary of the current block.

14 Claims, 33 Drawing Sheets

Related U.S. Application Data

(60) Provisional application No. 62/742,267, filed on Oct. 5, 2018, provisional application No. 62/735,207, filed on Sep. 24, 2018.

(51) Int. Cl.
*H04N 19/132* (2014.01)
*H04N 19/159* (2014.01)
*H04N 19/176* (2014.01)

(58) Field of Classification Search
CPC .... H04N 19/91; H04N 19/105; H04N 19/117; H04N 19/159; H04N 19/46; H04N 19/13; H04N 19/132
USPC .................................................. 375/340, 240
See application file for complete search history.

(56) References Cited

U.S. PATENT DOCUMENTS

2018/0160113 A1* 6/2018 Jeong .................. H04N 19/593
2018/0316913 A1* 11/2018 Jun ........................ H04N 19/44

FOREIGN PATENT DOCUMENTS

| | | |
|---|---|---|
| KR | 10-2018-0057727 A | 5/2018 |
| KR | 10-1867884 B1 | 6/2018 |
| WO | 2018/062788 A1 | 4/2018 |

* cited by examiner

INTRA PREDICTION-BASED IMAGE CODING METHOD USING MPM LIST AND APPARATUS THEREFOR

CROSS-REFERENCE TO RELATED APPLICATIONS

Pursuant to 35 U.S.C. § 119(e), this application is a continuation of International Application PCT/KR2019/011542, with an international filing date of Sep. 6, 2019, which claims the benefit of U.S. Provisional Applications No. 62/735,207 filed on Sep. 24, 2018, Ser. No. 62/742,267 filed on Oct. 5, 2018, and Korean Patent Application No. 10-2018-0106665 filed on Sep. 6, 2018, the contents of which are all hereby incorporated by reference herein in their entirety.

BACKGROUND OF THE DISCLOSURE

Field of the Disclosure

The present disclosure relates to an image coding technique and, more particularly, to an image coding method using intra prediction based on an MPM list and an apparatus for the method.

Related Art

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

A technical object of the present disclosure is to provide a method for improving image coding efficiency and an apparatus for the method.

Another technical object of the present disclosure is to provide an efficient intra prediction method and an apparatus for the method.

Yet another technical object of the present disclosure is to provide an image decoding method for deriving an MPM list for a current block and an apparatus for the method.

Still another technical object of the present disclosure is to provide an image decoding method for deriving an MPM list based on neighboring blocks of a current block and an apparatus for the method.

Still yet another technical object of the present disclosure is to provide an image decoding method for deriving an MPM list of a current block based on a plurality of conditions and an apparatus for the method.

According to one embodiment of the present disclosure, an image decoding method performed by a decoding apparatus is provided. The method comprises deriving a first candidate intra prediction mode based on a first neighboring block of a current block; deriving a second candidate intra prediction mode based on a second neighboring block of the current block; constructing a Most Probable Mode (MPM) list of the current block based on the first candidate intra prediction mode and the second candidate intra prediction mode; deriving an intra prediction mode for the current block based on the MPM list; and generating a prediction sample for the current block based on the intra prediction mode, wherein the first neighboring block is a left neighboring block located at the lowermost side among neighboring blocks adjacent to a left boundary of the current block, and the second neighboring block is an upper neighboring block located at the rightmost side among neighboring blocks adjacent to an upper boundary of the current block.

According to another embodiment of the present disclosure, a decoding apparatus performing image decoding is provided. The decoding apparatus comprises a predictor deriving a first candidate intra prediction mode based on a first neighboring block of a current block, deriving a second candidate intra prediction mode based on a second neighboring block of the current block, constructing a Most Probable Mode (MPM) list of the current block based on the first candidate intra prediction mode and the second candidate intra prediction mode, deriving an intra prediction mode for the current block based on the MPM list, and generating a prediction sample for the current block based on the intra prediction mode, wherein the first neighboring block is a left neighboring block located at the lowermost side among neighboring blocks adjacent to a left boundary of the current block, and the second neighboring block is an upper neighboring block located at the rightmost side among neighboring blocks adjacent to an upper boundary of the current block.

According to yet another embodiment of the present disclosure, an image encoding method performed by an encoding apparatus is provided. The method comprises deriving a first candidate intra prediction mode based on a first neighboring block of a current block; deriving a second candidate intra prediction mode based on a second neighboring block of the current block; constructing a Most Probable Mode (MPM) list of the current block based on the first candidate intra prediction mode and the second candidate intra prediction mode; determining an intra prediction mode for the current block based on the MPM list; generating a prediction sample for the current block based on the intra prediction mode; and encoding image information comprising intra prediction mode information for the current block, wherein the first neighboring block is a left neighboring block located at the lowermost side among neighboring blocks adjacent to a left boundary of the current block, and the second neighboring block is an upper neighboring block located at the rightmost side among neighboring blocks adjacent to an upper boundary of the current block.

According to still another embodiment of the present disclosure, an image encoding apparatus performing image encoding is provided. The encoding apparatus comprises a predictor deriving a first candidate intra prediction mode based on a first neighboring block of a current block, deriving a second candidate intra prediction mode based on a second neighboring block of the current block, constructing a Most Probable Mode (MPM) list of the current block based on the first candidate intra prediction mode and the second candidate intra prediction mode, determining an intra prediction mode for the current block based on the MPM list, and generating a prediction sample for the current block based on the intra prediction mode; and an entropy encoder encoding image information comprising intra prediction mode information for the current block, wherein the first neighboring block is a left neighboring block located at the lowermost side among neighboring blocks adjacent to a left boundary of the current block, and the second neighboring block is an upper neighboring block located at the rightmost side among neighboring blocks adjacent to an upper boundary of the current block.

According to still yet another embodiment of the present disclosure, a digital storage medium storing image data including encoded image information generated according to an image encoding method performed by an encoding apparatus is provided.

According to still yet further embodiment of the present disclosure, a digital storage medium storing image data including encoded image information that triggers the image decoding method to be performed by a decoding apparatus is provided.

According to one embodiment of the present disclosure, the overall image/video compression efficiency may be improved.

According to one embodiment of the present disclosure, through efficient intra prediction, computational complexity may be reduced, and the overall coding efficiency may be improved.

According to one embodiment of the present disclosure, an MPM list for the current block may be constructed by considering the increase of the number of intra prediction modes, through which accuracy of the MPM list for representing an intra prediction mode of the current block may be improved, and the overall coding efficiency may be improved.

According to one embodiment of the present disclosure, complicated computations may be reduced, and an MPM list including a plurality of MPM candidates may be constructed based on candidate intra prediction modes derived from neighboring blocks, through which computational complexity of a process for representing an intra prediction mode of a current block may be reduced, and the overall coding efficiency may be improved.

DESCRIPTION OF EXEMPLARY EMBODIMENTS

Figure 1:
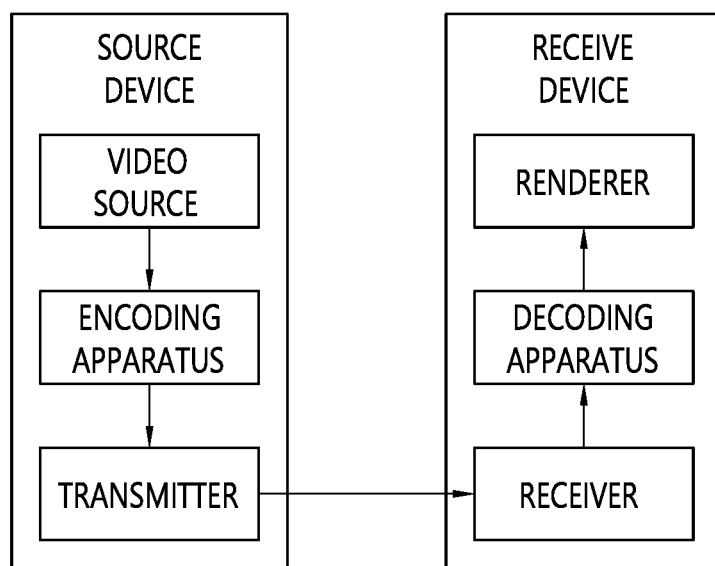
FIG. 1 illustrates an example of a video/image coding system to which the present disclosure may be applied.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 illustrates an example of a video/image coding system to which the present disclosure may be applied.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel and may represent only a pixel/pixel value of a luma component or only a pixel/pixel value of a chroma component.

A unit may represent a basic unit of image processing. The unit may include at least one of specific regions of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
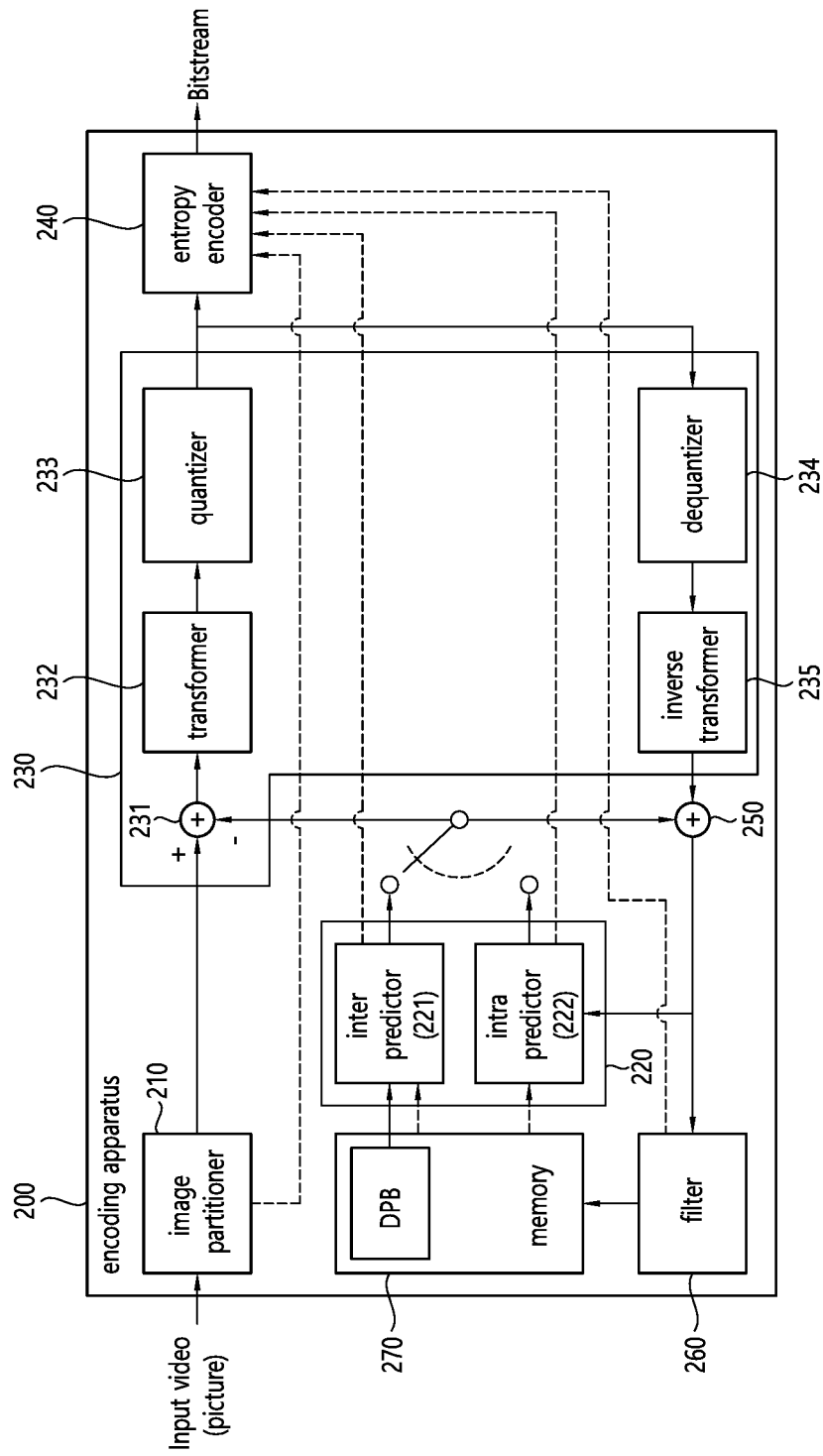
FIG. 2 illustrates a structure of a video/image encoding apparatus to which the present disclosure may be applied.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first, and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
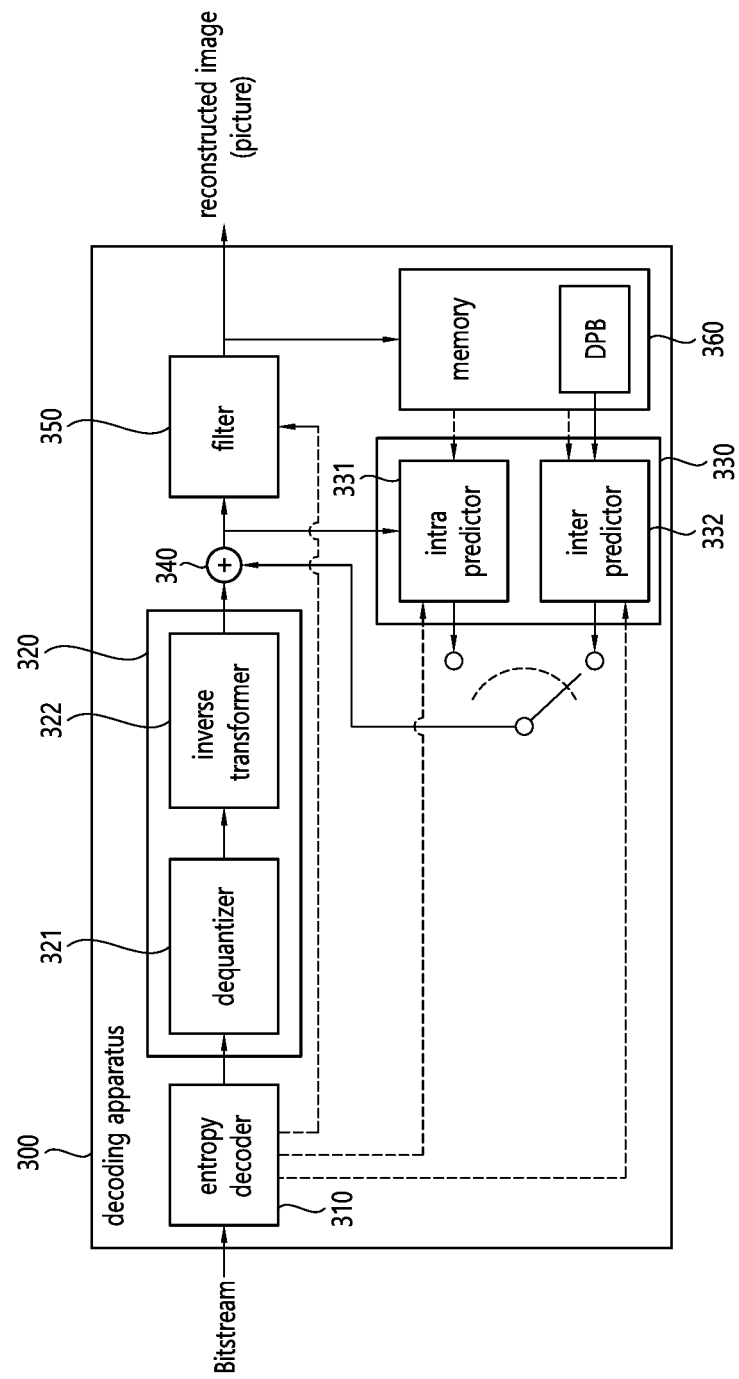
FIG. 3 illustrates a structure of a video/image decoding apparatus to which the present disclosure may be applied.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300.

As described above, in performing video coding, prediction is performed to increase compression efficiency. By doing so, a prediction block including prediction samples for a current block, which is a coding target block, may be generated. Here, the prediction block includes prediction samples in the spatial domain (or pixel domain). The prediction block is derived in both of the encoding and decoding apparatus, where the encoding apparatus may increase image coding efficiency by signaling information about residuals (residual information) between an original block and the prediction block, rather than original sample values of the original block, to the decoding apparatus. The decoding apparatus may derive a residual block including residual samples based on the residual information, generate a reconstructed block including reconstructed samples by combining the residual block and the prediction block, and generate a reconstructed picture including reconstructed blocks.

The residual information may be generated through a transform and quantization processes. For example, the encoding apparatus may derive a residual block between the original block and the prediction block, derive transform coefficients by performing the transform process to residual samples (residual sample array) included in the residual block, derive quantized transform coefficients by performing the quantization process on the transform coefficients, and signal related residual information to the decoding apparatus (through a bitstream). Here, the residual information may include information about the values of the quantized transform coefficients, position information, transform technique, transform kernel, and quantization parameters. The decoding apparatus may perform a dequantization/inverse-transform process based on the residual information and derive residual samples (or residual block). The decoding apparatus may generate a reconstructed picture based on a prediction block and the residual block.

Meanwhile, if the intra prediction is performed, correlation among samples may be utilized, and a difference between an original block and a prediction block, namely, residuals may be obtained. The transform and quantization processes may be applied to the residuals, through which spatial redundancy may be removed. More specifically, an encoding and decoding methods employing intra prediction may be described as follows.

FIG. 4 illustrates one example of an image encoding method performed by a video encoding apparatus and an image decoding method performed by a video decoding apparatus.

Figure 4A:
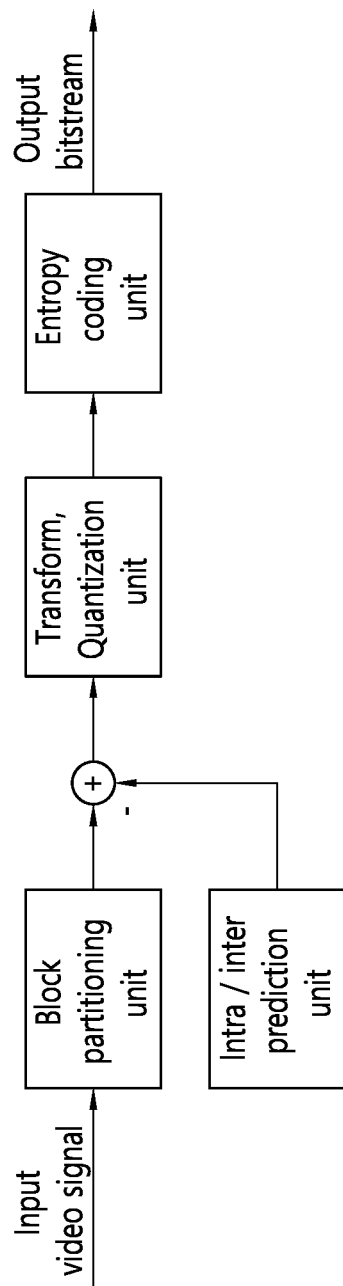
FIGS. 4a to 4b illustrate one example of an image encoding method performed by a video encoding apparatus and an image decoding method performed by a video decoding apparatus.

FIG. 4a illustrates one example of an image encoding method performed by a video encoding apparatus. Referring to FIG. 4a, the image encoding method may include a block partitioning process, an intra/inter prediction process, a transform process, a quantization process, and an entropy encoding process. For example, a current picture may be split into a plurality of blocks, a prediction block of a current block may be generated through intra/inter prediction, and a residual block of the current block may be generated through subtraction between an input block of the current block and the prediction block. Afterwards, a coefficient block, namely transform coefficients of the current block may be generated through transform of the residual block. The transform coefficients may be quantized, entropy-encoded, and then stored in a bitstream.

Figure 4B:
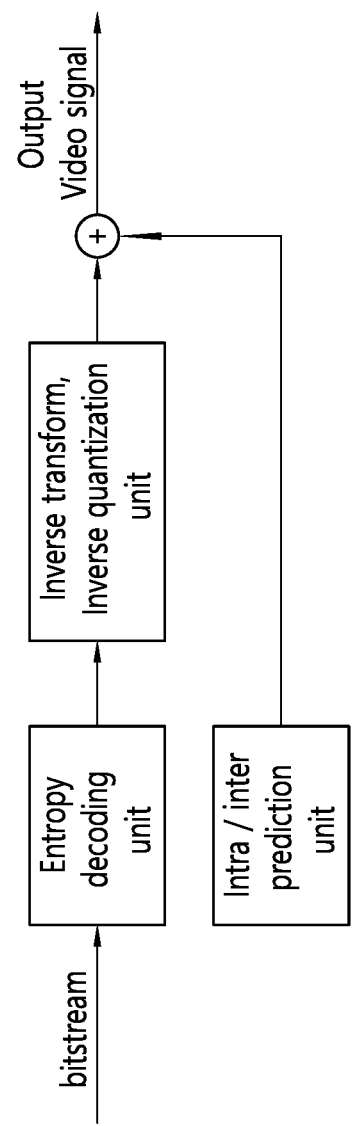

FIG. 4b illustrates one example of an image decoding method performed by a decoding apparatus. Referring to FIG. 4b, the image decoding method may include an entropy decoding process, a dequantization process, an inverse transform process, and an intra/inter prediction process. More specifically, quantized transform coefficients may be obtained through entropy decoding of a bitstream, and a coefficient block of a current block, namely transform coefficients may be obtained through dequantization of the quantized transform coefficients. A residual block of the current block may be derived through inverse transform of the transform coefficients, and a reconstructed block of the current block may be derived through addition of a prediction block of the current block derived through intra/inter prediction and the residual block.

Figure 5:
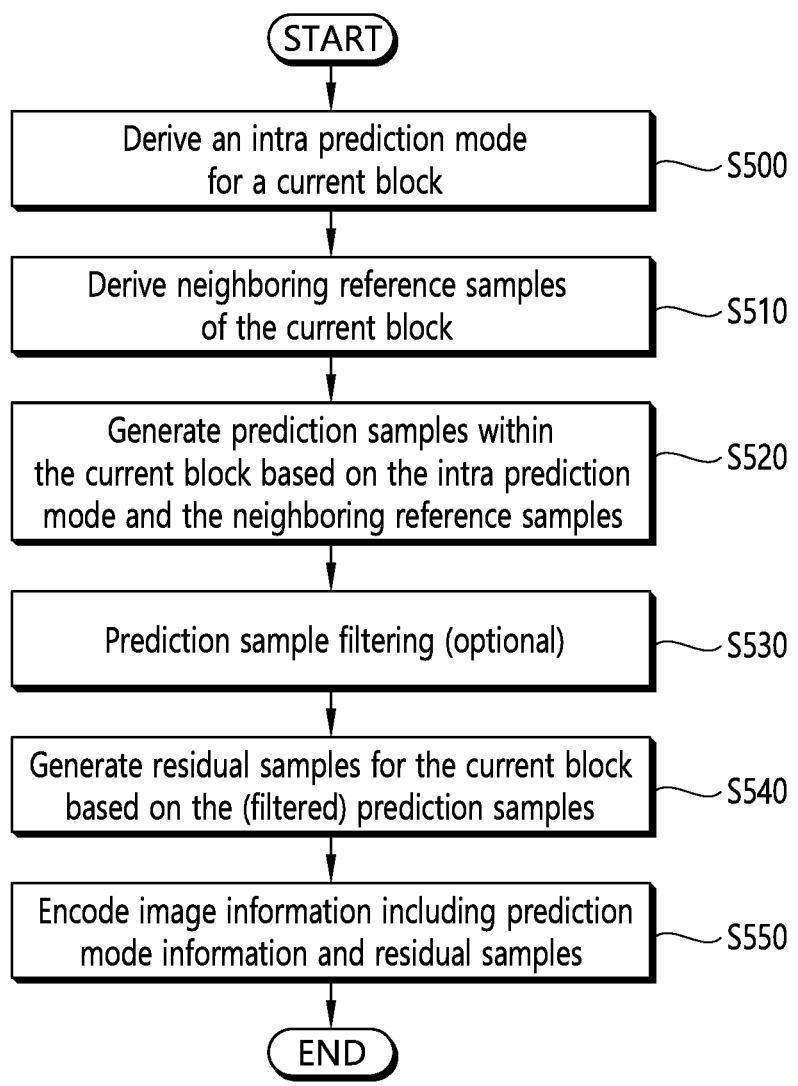
FIG. 5 illustrates one example of an image encoding method based on intra prediction.

FIG. 5 illustrates one example of an intra prediction-based image encoding method. Referring to FIG. 5, an encoding apparatus may derive an intra prediction mode for a current block S500 and derive neighboring reference samples of the current block S510. The encoding apparatus may determine a bit rate for the current block and the optimal intra prediction mode in which distortion is minimized. The encoding apparatus may generate prediction samples within the current block based on the intra prediction mode and the neighboring reference samples S520. In this case, the encoding apparatus may perform a prediction sample filtering process S530. Prediction sample filtering may be called post-filtering. According to the prediction sample filtering process, all or part of the prediction samples may be filtered. Depending on situations, the S530 step may be omitted.

The encoding apparatus may generate residual samples for the current block based on (filtered) prediction samples S540. The encoding apparatus may encode prediction mode information representing the intra prediction mode and image information including residual information about the residual samples S550. The encoded image information may be output in the form of a bitstream. The output bitstream may be provided to a decoding apparatus via a storage medium or a network.

Figure 6:
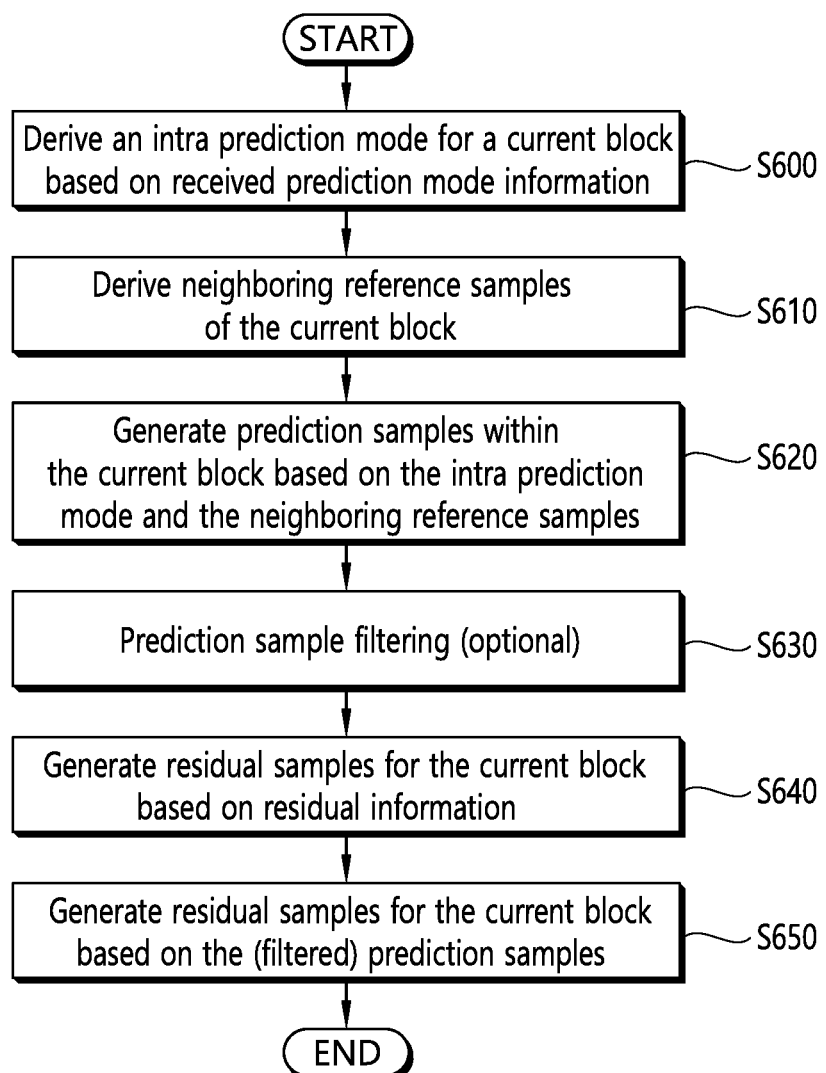
FIG. 6 illustrates one example of an image decoding method based on intra prediction.

FIG. 6 illustrates one example of an intra prediction-based image decoding method. Referring to FIG. 6, a decoding apparatus may perform operations corresponding to the operations performed by the encoding apparatus. For example, the decoding apparatus may derive an intra prediction mode for a current block based on received prediction mode information S600. The decoding apparatus may derive neighboring reference samples of the current block S610. The decoding apparatus may generate prediction samples within the current block based on the intra prediction mode and the neighboring reference samples S620. In this case, the decoding apparatus may perform a prediction sample filtering process S630. Prediction sample filtering may be called post-filtering. All or part of the prediction samples may be filtered according to the prediction sample filtering process. Depending on situations, the S630 step may be omitted.

The decoding apparatus may generate residual samples for the current block based on received residual information S640. The decoding apparatus may generate reconstructed samples for the current block based on the (filtered) prediction samples and the residual samples; and generate a reconstructed picture based on the reconstructed samples S650.

Meanwhile, if intra prediction is applied to the current block, as described above, the encoding apparatus/decoding apparatus may derive an intra prediction mode for the current block and derive a prediction sample of the current block based on the intra prediction mode. In other words, the encoding apparatus/decoding apparatus may derive the prediction sample of the current block by applying a directional mode or a non-directional mode based on neighboring reference samples of the current block.

For example, the intra prediction mode may include 2 non-directional or non-angular intra prediction modes and 65 directional or angular intra prediction modes. The non-directional intra prediction modes may include a planar intra prediction mode of 0 and a DC intra prediction mode of 1 while the directional intra prediction modes may include 65 intra prediction modes of 2 to 66. However, it should be noted that this particular configuration is only an example, and the present disclosure may also be applied to other case where the number of intra prediction modes is different from that of the current example. Meanwhile, depending on situations, an intra prediction mode of 67 may be further included, where the 67 intra prediction mode may represent a linear model (LM) mode.

Figure 7:
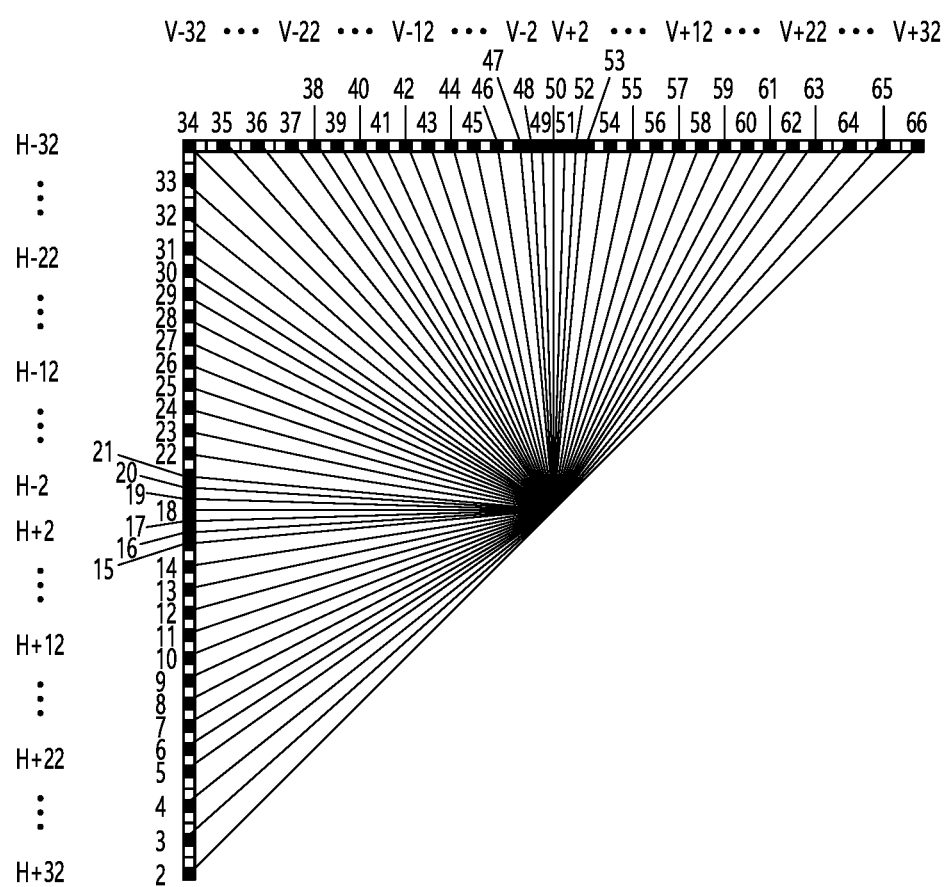
FIG. 7 illustrates intra directional modes of 65 prediction directions.

FIG. 7 illustrates intra directional modes of 65 prediction directions.

Referring to FIG. 7, intra prediction modes having horizontal directionality and intra prediction modes having vertical directionality may be distinguished from each other with reference to the intra prediction mode 34 along the top-left diagonal prediction direction. H and V of FIG. 7 represent the horizontal and vertical directionality, respectively, and the number ranging from −32 to 32 represents angular positions in units of 1/32 on the sample grids. The intra prediction modes 2 to 33 have horizontal directionality while the intra prediction modes 34 to 66 have vertical directionality. The intra prediction mode 18 and the intra prediction mode 50 represent the horizontal intra prediction mode and the vertical intra prediction mode, respectively; the intra prediction mode 2 may be referred to as the lower-left diagonal intra prediction mode, the intra prediction mode 34 as the upper-left diagonal intra prediction mode, and the intra prediction mode 66 as the upper-right diagonal intra prediction mode.

Meanwhile, if the intra prediction is applied to the current block, an intra prediction mode may be derived, which is applied to the current block based on the intra prediction mode of neighboring blocks of the current block. For example, the decoding apparatus may derive a Most Probable Mode (MPM) list based on the intra prediction modes of neighboring blocks (for example, a left neighboring block and/or an upper neighboring block) of a current block and additional candidate modes, may select, based on a received MPM index, one among MPM candidates within the derived MPM list, or may select, based on the remaining intra prediction mode information, one among the remaining intra prediction modes not included in the MPM candidates. The MPM list may be referred to as an intra prediction mode candidate list or may be termed as candModeList.

Here, for example, the MPM list may include 3 MPM candidates, 5 candidates, or 6 MPM candidates. As one example, the MPM list may include an intra prediction mode of a neighboring block, a derived intra prediction mode and/or candidates derived based on a default intra prediction mode. The encoding apparatus/decoding apparatus may search for neighboring blocks of a current block according to a specific order and derive an intra prediction mode of the neighboring block as the MPM candidate according to a derived order. For example, the neighboring blocks may include a left neighboring block, an upper neighboring block, a lower-left neighboring block, an upper-right neighboring block, and an upper-left neighboring block.

For example, in the HEVC standard, an MPM list comprising 3 MPM candidates may be constructed, where the 3 MPM candidates may be derived based on the intra prediction modes of a neighboring block F and a neighboring block G. The neighboring blocks of the current block including the neighboring block F and the neighboring block G may be the same as described below.

Figure 8:
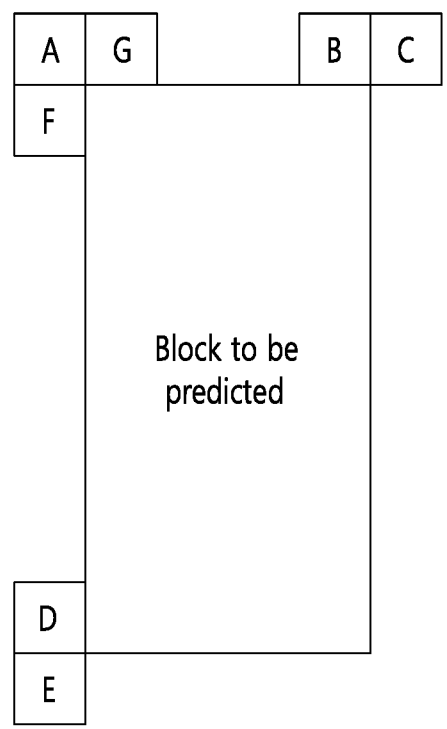
FIG. 8 illustrates neighboring blocks of the current block.

FIG. 8 illustrates neighboring blocks of the current block. Referring to FIG. 8, neighboring blocks of the current block may include a neighboring block A, neighboring block B, neighboring block C, neighboring block D, neighboring block E, neighboring block F and/or neighboring block G.

Here, the neighboring block A may represent a neighboring block located at the top-left of the top-left sample position of the current block, the neighboring block B may represent a neighboring block located at the upper of the top-right sample position of the current block, the neighboring block C may represent a neighboring block located at the top-right of the top-right sample position of the current block, the neighboring block D may represent a neighboring block located at the left of the lower-left sample position of the current block, the neighboring block E may represent a neighboring block located at the lower left of the lower-left sample position of the current block, the neighboring block G may represent a neighboring block located at the upper of the top-left sample position of the current block, and the neighboring block F may represent a neighboring block located at the left of the top-left sample position of the current block.

For example, if the size of the current block is W×H, x component of the top-left sample position of the current block is 0, and y component thereof is 0, the neighboring block A may be a block containing a sample at the coordinates of (−1, −1), the neighboring block B may be a block containing a sample at the coordinates of (W−1, −1), the neighboring block C is a block containing a sample at the coordinates of (W, −1), the neighboring block D is a block containing a sample at the coordinates of (−1, H−1), the neighboring block E is a block containing a sample at the coordinates of (−1, H−1), the neighboring block F is a block containing a sample at the coordinates of (−1, 0), and the neighboring block G is a block containing a sample at the coordinates of (0, −1).

According to the HEVC standard, 3 MPM candidates may be derived based on the intra prediction mode of the neighboring block F and the intra prediction mode of the neighboring block G. For example, the intra prediction mode of the neighboring block F and the intra prediction mode of the neighboring block G may be derived. Meanwhile, for the following cases, the intra prediction mode of the neighboring block F or the intra prediction mode of the neighboring block G may be derived as a DC intra prediction mode:

1) The case where the neighboring block F or the neighboring block G is unavailable, 2) The case where the neighboring block F or the neighboring block G is not coded in an intra prediction mode (the case where the neighboring block F or the neighboring block G is not an intra coded block), or 3) The case where the neighboring block F or the neighboring block G leaves a current coding tree unit.

If the intra prediction mode of the neighboring block F or the intra prediction mode of the neighboring block G is determined, the three MPM candidates may be derived as shown in the table below.

TABLE 1

```
if (intra mode of F and G are equal)
{
  if (intra mode of F < intra mode 2)
  { MPM list1 }
  else
  { MPM list2 }
}
else
{
  if (Neither intra mode of F nor G are intra mode Planar)
  { MPM list3 }
  else if (intra mode of (F+G) <intra mode 2)
  { MPM list4 }
  else
  { MPM list5 }
}
```

Table 1 represents pseudo code for constructing the MPM list.

Referring to Table 1, it may be determined whether the intra prediction mode of the neighboring block F is the same as the intra prediction mode of the neighboring block G.

If the intra prediction mode of the neighboring block F is the same as the intra prediction mode of the neighboring block G, and the mode number of the intra prediction mode of the neighboring block F is smaller than 2, the MPM list of the current block may be derived as MPM list 1. In other words, if the intra prediction mode of the neighboring block F is the same as the intra prediction mode of the neighboring block G, and the intra prediction mode of the neighboring block F is intra prediction mode 0 or intra prediction mode 1, the MPM list of the current block may be derived as MPM list 1.

Also, if the intra prediction mode of the neighboring block F is the same as the intra prediction mode of the neighboring block G, and the mode number of the intra prediction mode of the neighboring block F is not smaller than 2, the MPM list of the current block may be derived as MPM list 2.

Also, if the intra prediction mode of the neighboring block F is not the same as the intra prediction mode of the neighboring block G, and the intra prediction mode of the neighboring block F and the intra prediction mode of the neighboring block G are not the planar intra prediction mode, the MPM list of the current block may be derived as MPM list 3.

Also, if the intra prediction mode of the neighboring block F is not the same as the intra prediction mode of the neighboring block G, and a sum of the mode number of the intra prediction mode of the neighboring block F, the intra prediction mode of the neighboring block G, and the mode number of the planar intra prediction mode is smaller than 2, the MPM list of the current block may be derived as MPM list 4.

Also, if the intra prediction mode of the neighboring block F is not the same as the intra prediction mode of the neighboring block G, at least one of the intra prediction mode of the neighboring block F and the intra prediction mode of the neighboring block G is a planar intra prediction mode, and a sum of the mode number of the intra prediction mode of the neighboring block F, the intra prediction mode of the neighboring block G, and the mode number of the planar intra prediction mode is not smaller than 2, the MPM list of the current block may be derived as MPM list 5.

Meanwhile, with the increase of the number of intra prediction modes, the number of MPM candidates needs to be increased. Accordingly, the number of MPM candidates may vary according to the number of intra prediction modes. For most cases, if the number of intra prediction modes is increased, the number of MPM candidates may be increased. However, the increase of the number of intra prediction modes does not always lead to an increase of the number of MPM candidates. For example, in the existence of 35 intra prediction modes or in the existence of 67 intra prediction modes, a various number of MPM candidates may be obtained, such as 3, 4, 5, or 6 depending on the design.

For example, construction of a 6 MPM list may be performed. In other words, an MPM list including the 6 MPM candidates may be constructed. For example, during construction of the 6 MPM list, a process of searching for positions of various neighboring blocks and a continuous pruning check process for excluding the same intra prediction mode may be performed. As one example, configuration of 6 MPM candidates may be performed in the following order:

Neighboring block D, neighboring block B, planar intra prediction mode, DC intra prediction mode, neighboring block E, neighboring block C, and neighboring block A.

In other words, an intra prediction mode may be derived as an MPM candidate in the order of the intra prediction mode of the neighboring block D, intra prediction mode of the neighboring block B, planar intra prediction mode, DC intra prediction mode, intra prediction mode of the neighboring block E, intra prediction mode of the neighboring block C, and intra prediction mode of the neighboring block A; and if an intra prediction mode is the same as the intra prediction mode already derived, it may not be derived as an MPM candidate.

Also, if an MPM list does not include the maximum number of MPM candidates, namely, if the number of derived MPM candidates is smaller than the maximum number of candidates, a directional intra prediction mode adjacent to a derived MPM candidate and a predefined default intra prediction mode may be considered as MPM candidates, and the pruning check process may be performed together. Here, the directional intra prediction mode adjacent to the MPM candidate may indicate an intra prediction mode the mode number of which is adjacent to the MPM candidate. Although the search of neighboring blocks and continuous pruning check described above is advantageous in saving bit transfer rate, it may increase the hardware operation frequency for constructing an MPM list of each block. The worst scenario may be the case where a 3840×2160 4K image is split into 4×4 sized blocks for intra prediction, where the increased hardware operating frequency for each 4×4 sized block may be considered to be important in terms of throughput. Meanwhile, if a neighboring block coded by inter prediction of the current block knows the intra prediction mode of the neighboring block, the intra prediction mode of the neighboring block may be used for construction of an MPM list.

As described above, a current block to be coded and its neighboring blocks usually have similar image characteristics, and since the current block and its neighboring blocks have a high probability of having the same or similar intra prediction mode, an MPM list of the current block may be determined to derive an intra prediction mode applied to the current block. However, if 67 intra prediction modes are used for intra prediction, an MPM list including existing three MPM candidates may not be sufficient to represent the diversity of a plurality of intra prediction modes. Also, a method for constructing the 6 MPM list including the search process for neighboring blocks and pruning check process is so complicated that the method may impact throughput. Therefore, as described in the embodiments below, the present disclosure proposes an efficient method for constructing an MPM list that appropriately trades off complexity for coding efficiency.

FIG. 9 illustrates one embodiment of constructing an MPM list for a current block.

Figure 9A:
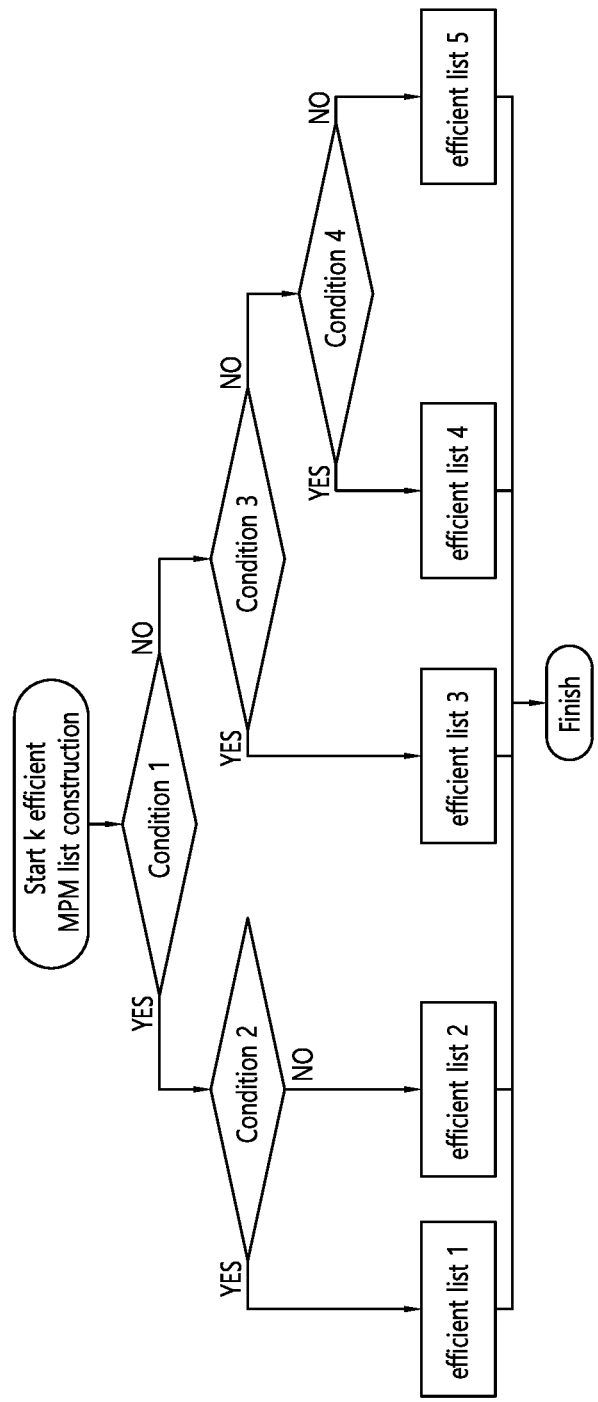
FIGS. 9a to 9b illustrate one embodiment of constructing an MPM list for a current block.
Figure 9B:
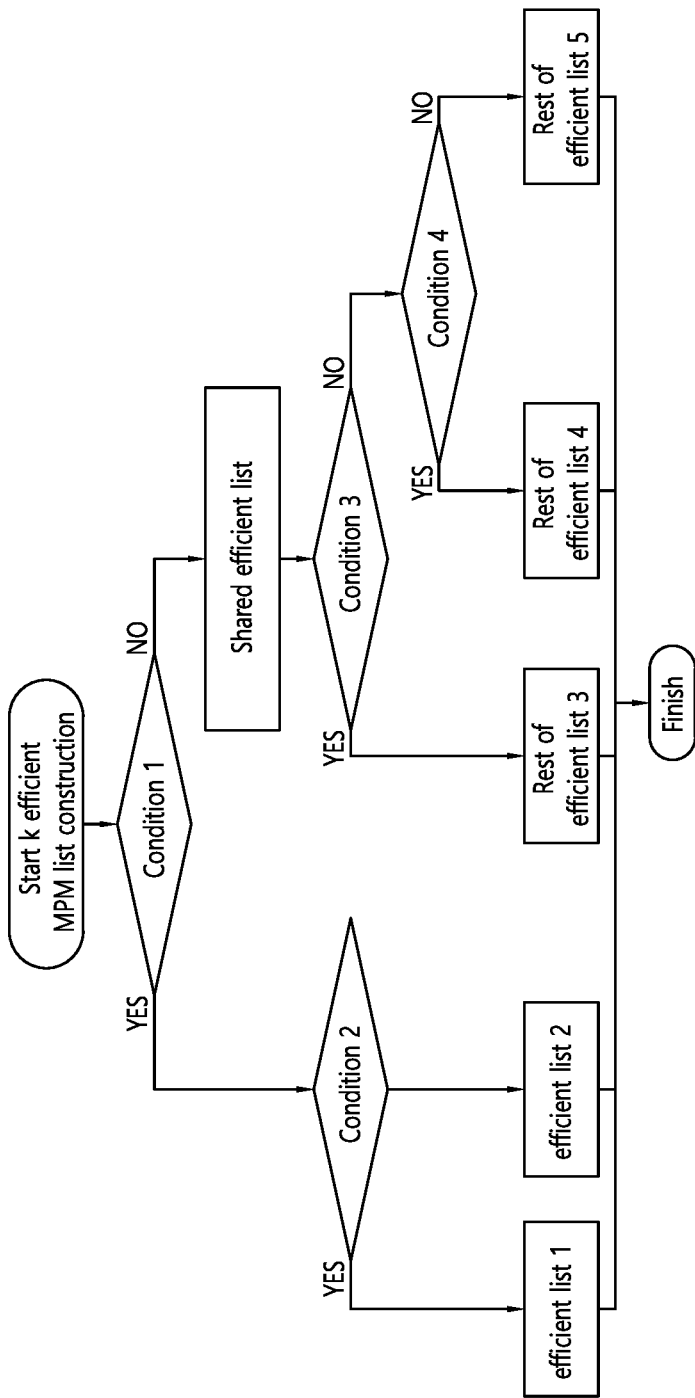

Referring to FIG. 9, an MPM list for the current block, including k MPM candidates, may be constructed. k shown in FIG. 9 may represent the length of the MPM list, namely, the number of MPM candidates included in the MPM list. According to one embodiment of FIG. 9, one among 5 efficient MPM lists may be constructed based on four conditions. In other words, referring to FIG. 9, one of 5 MPM lists may be derived as an MPM list for the current block based on four conditions. As shown in FIG. 9*a*, the MPM lists may be independent lists, or as shown in FIG. 9*b*, the MPM lists may have a portion partially shared among them. As shown in FIG. 9*b*, if the shared portion of the lists is used, a duplication process may be avoided. The conditions may be modeled so that the sum of probabilities of all of the conditions is equal to 1.

Figure 10:
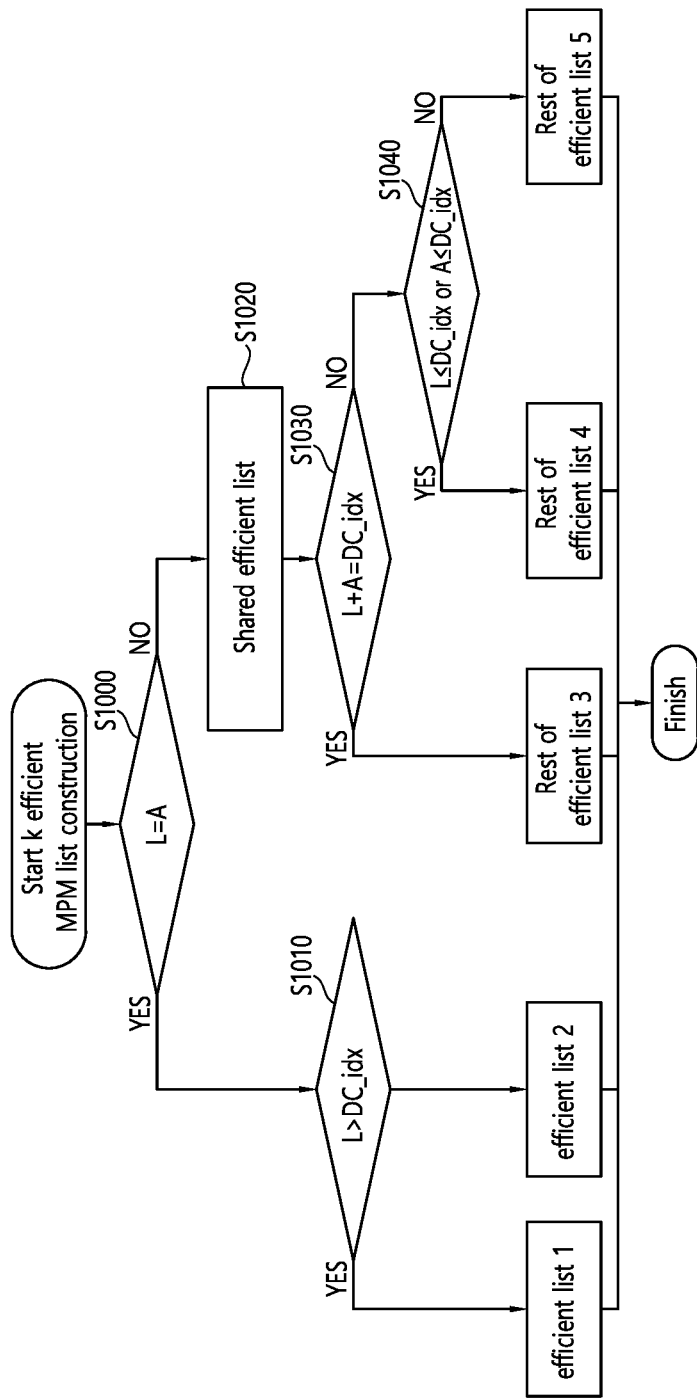
FIG. 10 illustrates one embodiment of constructing an MPM list for a current block.

FIG. 10 illustrates one embodiment of constructing an MPM list for a current block.

FIG. 10 illustrates one embodiment of efficiently constructing an MPM list for the current block including k MPM candidates based on neighboring blocks of the current block. For example, k may be 6, and 4 conditions may be used to construct an MPM list for the current block among 5 efficient lists. Meanwhile, referring to FIG. 10, L may represent an intra prediction mode of the neighboring block B, and A may represent an intra prediction mode of the neighboring block D. Or, referring to FIG. 10, L may represent an intra prediction mode of the neighboring block D, and A may represent an intra prediction mode of the neighboring block B.

More specifically, for example, referring to FIG. 10, the encoding apparatus/decoding apparatus may check condition 1 indicating that the L is the same as the A S1000. In other words, the encoding apparatus/decoding apparatus may determine whether the L is the same as the A.

If the L is the same as the A, the encoding apparatus/decoding apparatus may check condition 2 indicating that the L is the same as the A, and the L and the A are directional intra prediction modes S1010. In other words, if the L is the same as the A, the encoding apparatus/decoding apparatus may determine whether the mode number of the L is larger than the mode number of the DC intra prediction mode. If the second condition is satisfied, MPM list 1 may be derived as an MPM list for the current block while, if the second condition is not satisfied, MPM list 2 may be derived as an MPM list for the current block.

Meanwhile, if the L is not the same as the A, the encoding apparatus/decoding apparatus may derive a shared list S1020 and perform the next step S1030. The shared list may be derived as part of the MPM list for the current block.

The shared list may be derived as shown in the table below.

TABLE 2

| mpm[0] = L |
| --- |
| mpm[1] = A |

Referring to Table 2, the shared list may include a first MPM candidate representing the L and a second MPM candidate representing the A. In other words, if the L is not the same as the A, the encoding apparatus/decoding apparatus may derive the L as the first MPM candidate and derive the A as the second MPM candidate. Referring to Table 2, mpm[0] may represent the first MPM candidate, and mpm[1] may represent the second MPM candidate. The shared list may represent a portion shared by MPM list 3, MPM list 4, and MPM list 5. If the value of an MPM index is 0, the first MPM candidate may represent an MPM candidate indicated by the MPM index, and if the value of the MPM index is 1, the second MPM candidate may represent an MPM candidate indicated by the MPM index.

Afterwards, the encoding apparatus/decoding apparatus may check the third condition S1030. The third condition may indicate whether a sum of the mode number of the L and the mode number of the A is the same as the mode number of the DC intra prediction mode. If the third condition is satisfied, namely, if a sum of the mode number of the L and the mode number of the A is the same as the mode number of the DC intra prediction mode, the encoding apparatus/decoding apparatus may derive the remaining portion of MPM list 3. In other words, the encoding apparatus/decoding apparatus may derive the MPM list 3 as an MPM list for the current block.

If the third condition is not satisfied, the encoding apparatus/decoding apparatus may check the fourth condition S1040. The fourth condition may indicate whether the mode number of the L is smaller than or equal to the mode number of the DC intra prediction mode, or the mode number of the A is smaller than or equal to the mode number of the DC intra prediction mode. In other words, the fourth condition may indicate whether at least one of the L and the A is the planar intra prediction mode and/or DC intra prediction mode. The fourth condition may indicate whether one of the L and the A is the planar intra prediction mode and/or DC intra prediction mode and whether one of the two is a directional intra prediction mode. If the fourth condition is satisfied, the encoding apparatus/decoding apparatus may derive the remaining portion of the MPM list 4. In other words, the encoding apparatus/decoding apparatus may derive the MPM list 4 as an MPM list for the current block. Meanwhile, if the fourth condition is not satisfied, the encoding apparatus/decoding apparatus may derive the remaining portion of the MPM list 5. In other words, the encoding apparatus/decoding apparatus may derive the MPM list 5 as an MPM list for the current block.

Meanwhile, the MPM list 1 may be derived as shown in the following table.

TABLE 3

| mpm[0] = L |
| --- |
| mpm[1] = L−1 |

TABLE 3-continued

| mpm[2] = L+1 |
| --- |
| mpm[3] = L−2 |
| mpm[4] = Planar_idx |
| mpm[5] = DC_idx |

The MPM list 1 may include a first MPM candidate representing L, a second MPM candidate representing L−1, a third MPM candidate representing L+1, a fourth MPM candidate representing L−2, a fifth MPM candidate representing a planar intra prediction mode, and a sixth MPM candidate representing a DC intra prediction mode. If the L is the N-th intra prediction mode, L−1 may represent the (N−1)-th intra prediction mode, L+1 may represent the (N+1)-th intra prediction mode, and L−2 may represent the (N−2)-th intra prediction mode.

Also, the MPM list 2 may be derived as shown in the table below.

TABLE 4

| mpm[0] = Planar_idx |
| --- |
| mpm[1] = DC_idx |
| mpm[2] = Vertical_idx |
| mpm[3] = Horizontal_idx |
| mpm[4] = Horizontal_Diagonal_idx |
| mpm[5] = Vertical_Diagonal_idx |

The MPM list 2 may include a first MPM candidate representing a planar intra prediction mode, a second MPM candidate representing a DC intra prediction mode, a third MPM candidate representing a vertical intra prediction mode, a fourth MPM candidate representing a horizontal intra prediction mode, a fifth MPM candidate representing a horizontal diagonal intra prediction mode, and a sixth MPM candidate representing a vertical diagonal intra prediction mode.

Also, the rest of the MPM list 3 may be derived as shown in the table below.

TABLE 5

| mpm[2] = Vertical_idx |
| --- |
| mpm[3] = Horizontal_idx |
| mpm[4] = Horizontal_Diagonal_idx |
| mpm[5] = Vertical_Diagonal_idx |

Table 5 may represent the rest of the MPM list 3 except for the shared list. The MPM list 3 may include a third MPM candidate representing a vertical intra prediction mode, a fourth MPM candidate representing a horizontal intra prediction mode, a fifth MPM candidate representing a horizontal diagonal intra prediction mode, and a sixth MPM candidate representing a vertical diagonal intra prediction mode.

Also, the rest of the MPM list 4 may be derived as shown in the table below.

TABLE 6

| mpm[2] = (Min (L, A) == Planar_idx) ? DC_idx : Planar_idx |
| --- |
| mpm[3] = Max (L, A)−1 |
| mpm[4] = Max (L, A)+1 |
| mpm[5] = Max (L, A)−2 |

Table 6 may represent the rest of the MPM list 4 except for the shared list. Referring to FIG. 6, if the smaller of the mode numbers of the L and the A is the same as the mode number of a planar intra prediction mode, the third MPM candidate of the MPM list 4 may be derived as a DC intra prediction mode; if the smaller of the mode numbers of the L and the A is not the same as the mode number of the planar intra prediction mode, the third MPM candidate of the MPM list 4 may be derived as the planar intra prediction mode. Also, the fourth MPM candidate of the MPM list 4 may be derived as an intra prediction mode having a value obtained by subtracting 1 from the larger of the mode numbers of the L and the A; the fifth MPM candidate of the MPM list 4 may be derived as an intra prediction mode having a value obtained by adding 1 to the larger of the mode numbers of the L and the A; and the sixth MPM candidate of the MPM list 4 may be derived as an intra prediction mode having a value obtained by subtracting 2 from the larger of the mode numbers of the L and the A.

Also, the rest of the MPM list 5 may be derives as shown in the table below.

TABLE 7 mpm[2] = Planar_idx
mpm[3] = DC_idx
If (L−1 mode is not included in the current MPM list)
  Add L−1 mode into the MPM list
If (L+1 mode is not included in the current MPM list)
  Add L+1 mode into the MPM list
If (A−1 mode is not included in the current MPM list)
  Add A−1 mode into the MPM list
  If length of MPM list is equal to 6, stop MPM list generation process
If (A+1 mode is not included in the current MPM list)
  Add A+1 mode into the MPM list
If length of MPM list is equal to 6, stop MPM list generation process Table 7 may represent the rest of the MPM list 5 except for the shared list. Referring to Table 7, the third MPM candidate of the MPM list 5 may be derived as a planar intra prediction mode, and the fourth MPM candidate of the MPM list 5 may be derived as a DC intra prediction mode. Afterwards, if L−1 is not included in the MPM list for the current block, the L−1 may be added to the MPM list of the current block as an MPM candidate. Afterwards, it may be determined whether L+1 is included in the MPM list for the current block, and if the L+1 is not included in the MPM list for the current block, the L+1 may be added to the MPM list of the current block as an MPM candidate.

Afterwards, it may be determined whether A−1 is included in the MPM list for the current block, and if the A−1 is not included in the MPM list for the current block, the A−1 may be added to the MPM list of the current block as an MPM candidate. Afterwards, if the length of the MPM list for the current block is 6, namely, if the number of MPM candidates included in the MPM list is 6, the MPM list generation process may be stopped.

If the number of MPM candidates included in the MPM list is smaller than 6, it may be determined whether A+1 is included in the MPM list for the current block, and if the A+1 is not included in the MPM list for the current block, the A+1 may be added to the MPM list for the current block as an MPM candidate. Afterwards, if the length of the MPM list for the current block is 6, namely, if the number of MPM candidates included in the MPM list is 6, the MPM list generation process may be stopped.

Figure 11A:
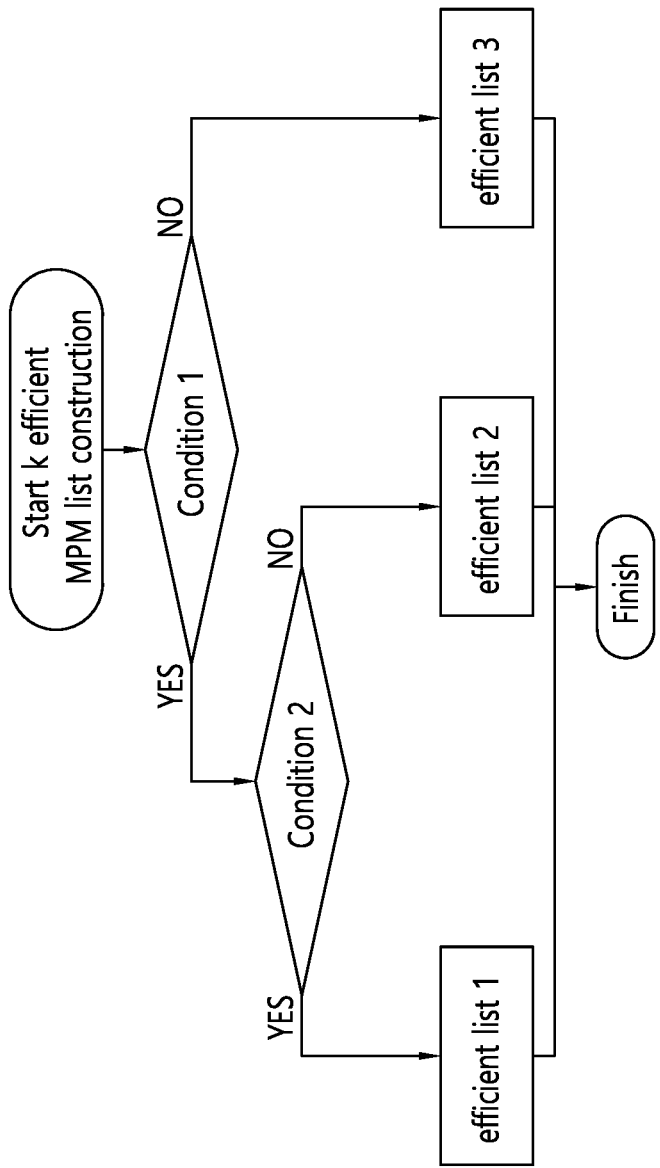
FIGS. 11a to 11b illustrate one embodiment of constructing an MPM list for a current block.
Figure 11B:
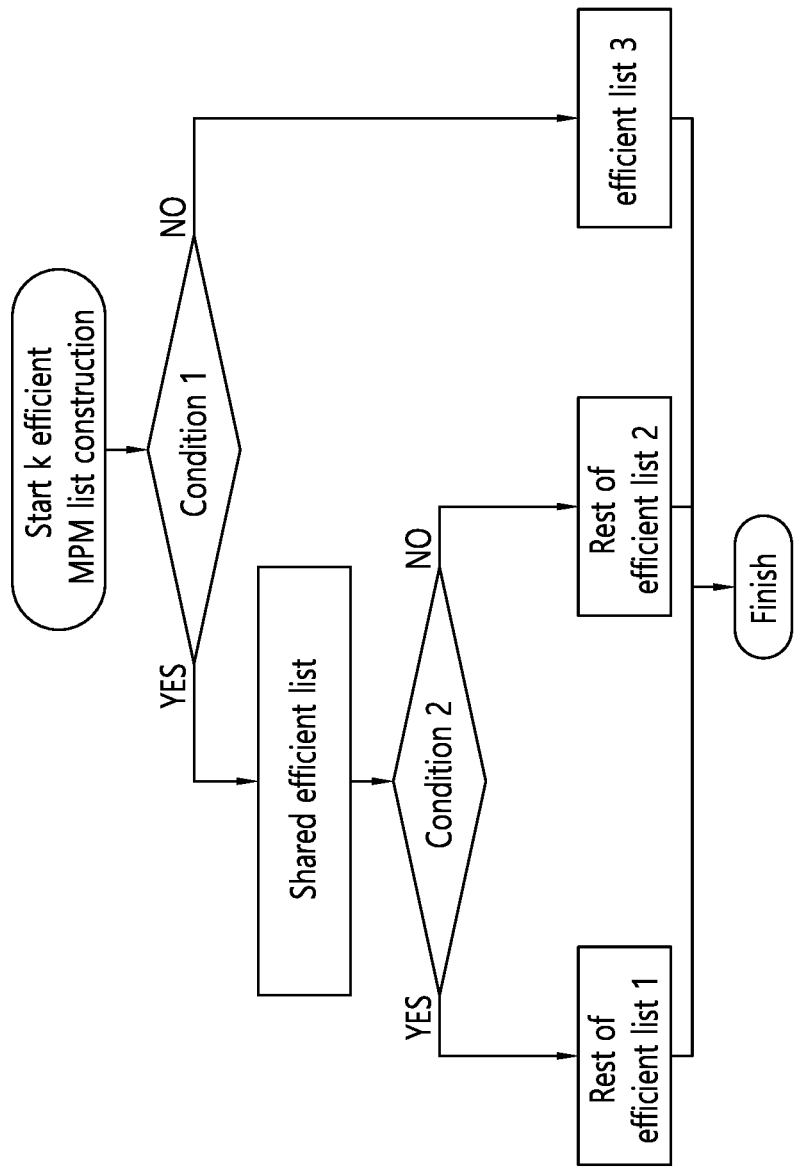

FIGS. 11a to 11b illustrate one embodiment of constructing an MPM list for a current block.

Referring to FIG. 11, an MPM list for the current block, including k MPM candidates, may be constructed. k disclosed in FIG. 11 may represent the length of an MPM list, namely, the number of MPM candidates included in the MPM list. The embodiment of FIG. 11 may illustrate a method for constructing an MPM list in a simpler way than the embodiment shown in FIG. 9. For example, according to the embodiment of FIG. 11, one of three efficient MPM lists may be constructed based on two conditions. As shown in FIG. 11a, the MPM lists may be independent lists, or as shown in FIG. 11b, the MPM lists may have a portion partially shared among them. As shown in FIG. 11b, if the shared portion of the lists is used, a duplication process may be avoided. The conditions may be modeled so that the sum of probabilities of all of the conditions is equal to 1.

Figure 12:
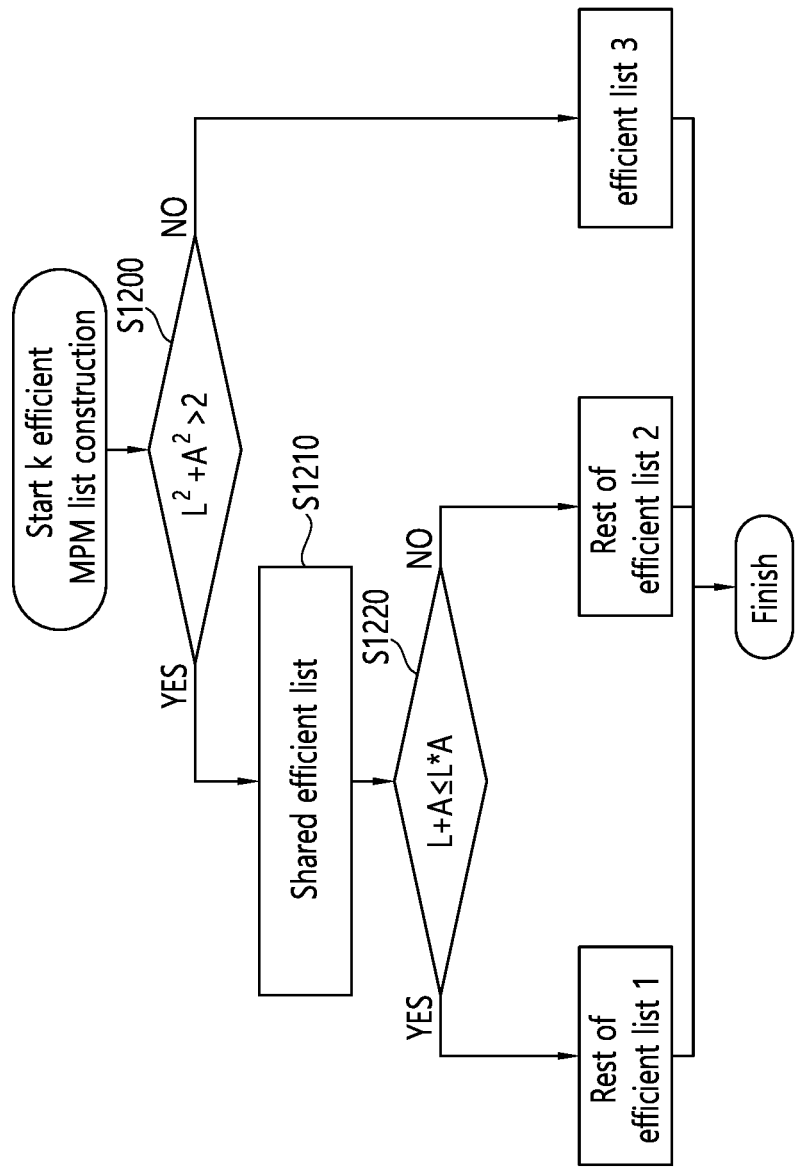
FIG. 12 illustrates one embodiment of constructing an MPM list for a current block.

FIG. 12 illustrates one embodiment of constructing an MPM list for a current block.

FIG. 12 illustrates one embodiment of efficiently constructing an MPM list for the current block including k MPM candidates based on neighboring blocks of the current block. For example, k may be 6, and 2 conditions may be used to construct an MPM list for the current block among 3 efficient lists. Meanwhile, referring to FIG. 12, L may represent an intra prediction mode of the neighboring block B, and A may represent an intra prediction mode of the neighboring block D. Or, referring to FIG. 12, L may represent an intra prediction mode of the neighboring block D, and A may represent an intra prediction mode of the neighboring block B.

Referring to FIG. 12, the encoding apparatus/decoding apparatus may check condition 5 that indicates whether the L or the A is a planar intra prediction mode and a DC intra prediction mode S1200. In other words, the encoding apparatus/decoding apparatus may determine whether the L or the A is the planar intra prediction mode and the DC intra prediction mode. For example, the encoding apparatus/decoding apparatus may determine whether a sum of the square value of the mode number of the L and the square value of the mode number of the A is larger than 2.

If the L or the A is not the planar intra prediction mode and the DC intra prediction mode (namely, if the sum of the square value of the mode number of the L and the square value of the mode number of the A is larger than 2), the encoding apparatus/decoding apparatus may derive a shared list S1210 and perform the next step S1220. The shared list may be derived as part of the MPM list for the current block.

The shared list may be derived as shown in the table below.

TABLE 8 mpm[0] = L

Referring to Table 8, the shared list may include a first MPM candidate representing the L. In other words, if the L or the A is not a planar intra prediction mode and a DC intra prediction mode (namely, if the sum of the square value of the mode number of the L and the square value of the mode number of the A is larger than 2), the encoding apparatus/decoding apparatus may derive the L as the first MPM candidate. Referring to Table 8, mpm[0] may represent the first MPM candidate. The shared list may represent a portion shared by MPM list 1 and MPM list 2. If the value of an MPM index is 0, the first MPM candidate may represent an MPM candidate indicated by the MPM index.

Afterwards, the encoding apparatus/decoding apparatus may check the sixth condition S1220. The sixth condition may indicate whether the L and the A are directional intra prediction modes. In other words, the encoding apparatus/decoding apparatus may determine whether the L and the A are directional intra prediction modes. For example, the encoding apparatus/decoding apparatus may determine whether a sum of the mode number of the L and the mode number of the A is smaller than or equal to a product of the mode number of the L and the mode number of the A.

If the sixth condition is satisfied, namely, if the L and the A are directional intra prediction modes, the encoding apparatus/decoding apparatus may derive the rest of the MPM list 1. In other words, the encoding apparatus/decoding apparatus may derive the MPM list 1 as an MPM list for the current block.

The rest of the MPM list 1 may be derived as shown in the table below.

TABLE 9

If (A is not included in the current MPM list )
  Add A mode into the next MPM index
Add Planar_idx into the next MPM index
Add DC_idx into the next MPM index
If (L−1 is not included in the current MPM list)
  Add A mode into the next MPM index
If (L+1 is not included in the current MPM list )
  Add A mode into the next MPM index
If (A−1 is not included in the current MPM list )
  Add A mode into the next MPM index
If (A−1 is not included in the current MPM list )
  Add A mode into the next MPM index
If length of MPM list is equal to 6, stop MPM list generation process Table 9 may represent the remaining portion of the MPM list 1 except for the shared list. The MPM list 1 shown in Table 9 may be derived as an MPM list for the current block. Referring to FIG. 9, it may be determined whether the A is included in the MPM list for the current block, and if the A is not included in the MPM list for the current block, the A may be added to the MPM list of the current block as a second MPM candidate, a planar intra prediction mode may be added to the MPM list of the current block as a third MPM candidate, and a DC intra prediction mode may be added to the MPM list of the current block as a fourth MPM candidate.

Afterwards, if L−1 is not included in the MPM list for the current block, the A may be added to the MPM list of the current block as an MPM candidate. Afterwards, it may be determined whether L+1 is included in the MPM list for the current block, and if L+1 is not included in the MPM list for the current block, the A may be added to the MPM list of the current block as an MPM candidate. Afterwards, it may be determined whether A−1 is included in the MPM list for the current block, and if A−1 is not included in the MPM list for the current block, the A may be added to the MPM list of the current block as an MPM candidate. Meanwhile, if the length of the MPM list for the current block is 6, namely, if the number of MPM candidates included in the MPM list is 6, the MPM list generation process may be stopped.

Also, if the sixth condition is not satisfied, namely, if at least one of the L and the A is not a directional intra prediction mode, the encoding apparatus/decoding apparatus may derive the remaining portion of the MPM list 2. In other words, the encoding apparatus/decoding apparatus may derive the MPM list 2 as an MPM list for the current block.

The rest of the MPM list 2 may be derived as shown in the table below.

TABLE 10 mpm[1] = A
If (DC mode is not included in the current MPM list)
  Add DC mode into the next MPM index
Otherwise add Planar mode into the next MPM index
If (Max(L, A)−1 mode is not included in the current MPM list)
  Add L−1 mode into the next MPM index
If (Max(L, A)+1 mode is not included in the current MPM list)
  Add L+1 mode into the next MPM list index
If (Max(L, A)−2 mode is not included in the current MPM list)
  Add A−1 mode into the next MPM list index
If (Max(L, A)+2 mode is not included in the current MPM list)
  Add A+1 mode into the next MPM list index
If length of MPM list is equal to 6, stop MPM list generation process Table 10 may represent the remaining portion of the MPM list 2 except for the shared list. The MPM list 2 shown in Table 10 may be derived as an MPM list for the current block. Referring to Table 10, the A may be added to the MPM list of the current block as a second MPM candidate. Afterwards, it may be determined whether a DC intra prediction mode is included in the MPM list for the current block; if the DC intra prediction mode is not included in the MPM list for the current block, the DC intra prediction mode may be added to the MPM list of the current block as an MPM candidate; and if the DC intra prediction mode is included in the MPM list for the current block, a planar intra prediction mode may be added to the MPM list of the current block as an MPM candidate.

Afterwards, it may be determined whether an intra prediction mode having a mode number obtained by subtracting 1 from the larger of the mode number of the L and the mode number of the A is included in the MPM list for the current block, and if the intra prediction mode is not included in the MPM list for the current block, L−1 may be added to the MPM list of the current block as an MPM candidate. Here, the L−1 may represent an intra prediction mode having a mode number obtained by subtracting 1 from the mode number of the L.

Afterwards, it may be determined whether an intra prediction mode having a mode number obtained by adding 1 to the larger of the mode number of the L and the mode number of the A is included in the MPM list for the current block, and if the intra prediction mode is not included in the MPM list for the current block, L+1 may be added to the MPM list of the current block as an MPM candidate. Here, the L+1 may represent an intra prediction mode having a mode number obtained by adding 1 from the mode number of the L.

Afterwards, it may be determined whether an intra prediction mode having a mode number obtained by subtracting 2 from the larger of the mode number of the L and the mode number of the A is included in the MPM list for the current block, and if the intra prediction mode is not included in the MPM list for the current block, A−1 may be added to the MPM list of the current block as an MPM candidate. Here, the A−1 may represent an intra prediction mode having a mode number obtained by subtracting 1 from the mode number of the A.

Afterwards, it may be determined whether an intra prediction mode having a mode number obtained by adding 2 to the larger of the mode number of the L and the mode number of the A is included in the MPM list for the current block, and if the intra prediction mode is not included in the MPM list for the current block, A+1 may be added to the MPM list of the current block as an MPM candidate. Here, the A+1 may represent an intra prediction mode having a mode number obtained by adding 1 from the mode number of the A.

Meanwhile, if the L and the A are a planar intra prediction mode or a DC intra prediction mode (namely, if a sum of the square value of the mode number of the L and the square value of the mode number of the A is not larger than 2), MPM list 3 may be derived as an MPM list for the current block.

The MPM list 3 may be derived as shown in the table below.

TABLE 11 mpm[0] = Planar
mpm[1] = DC
mpm[2] = Vertical_idx
mpm[3] = Horizontal_idx
mpm[4] = Horizontal_Diagonal_idx
mpm[5] = Vertical_Diagonal_idx Table 11 may represent the MPM list 3. The MPM list 3 may include a first MPM candidate representing a planar intra prediction mode, a second MPM candidate representing a DC intra prediction mode, a third MPM candidate representing a vertical intra prediction mode, a fourth MPM candidate representing a horizontal intra prediction mode, a fifth MPM candidate representing a horizontal diagonal intra prediction mode, and a sixth MPM candidate representing a vertical diagonal intra prediction mode.

Meanwhile, the present disclosure proposes an embodiment described later as a method for constructing an MPM list for the current block.

Figure 13:
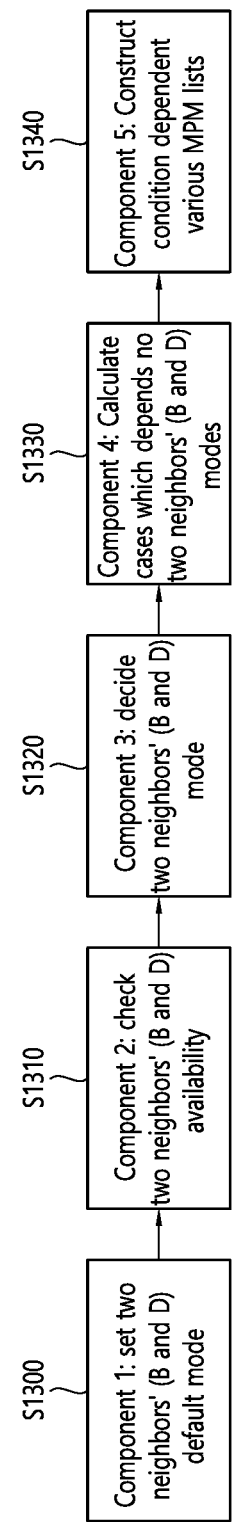
FIG. 13 illustrates one example of constructing an MPM list.

FIG. 13 illustrates one example of constructing an MPM list. As described above, in existing MPM list generation, only 3 MPM candidates have been generated; however, with the increase of the number of intra prediction modes, the 3 MPM list may not be sufficient to represent the correlation between an intra prediction mode of a current block to be predicted and intra prediction modes of its neighboring intra blocks. Therefore, a method for constructing a 6 MPM list, namely, an MPM list including 6 MPM candidates may be proposed. Referring to FIG. 13, an embodiment of constructing an MPM list including 6 MPM candidates based on intra prediction modes of the neighboring block B and the neighboring block D may be proposed. According to the present embodiment, simplicity is retained in constructing an MPM list while a sufficient number of MPM candidates may still be derived; therefore, better coding efficiency may be provided than for the exiting case where 3 MPM candidates are derived.

Referring to FIG. 13, the encoding apparatus/decoding apparatus may set the intra prediction mode of the neighboring block B and the intra prediction mode of the neighboring block D to a default intra prediction mode S1300. For example, the default intra prediction mode may be a planar intra prediction mode. In this case, the encoding apparatus/decoding apparatus may set the intra prediction mode of the neighboring block B and the intra prediction mode of the neighboring block D to the planar intra prediction mode. Meanwhile, a process of setting the intra prediction mode of the neighboring block B to the default intra prediction mode may be performed when the intra prediction mode of the neighboring block B is not available. In other words, if the neighboring block B is unavailable or the neighboring block B is not an intra coded block, the process of setting the intra prediction mode of the neighboring block B to the default intra prediction mode may be performed. Here, the intra coded block may represent a block coded based on intra prediction. Also, the process of setting the intra prediction mode of the neighboring block D to the default intra prediction mode may be performed when the intra prediction mode of the neighboring block D is unavailable. In other words, if the neighboring block D is unavailable or the neighboring block D is not an intra coded block, the process of setting the intra prediction mode of the neighboring block D to the default intra prediction mode may be performed.

The encoding apparatus/decoding apparatus may check availability of the neighboring block B and the neighboring block D S1310. The encoding apparatus/decoding apparatus may check availability of the neighboring block B and the neighboring block D and derive the intra prediction mode of the neighboring block B and/or the neighboring block D.

For example, the S1310 step may be described in more detail as shown in FIG. 14.

Figure 14A:
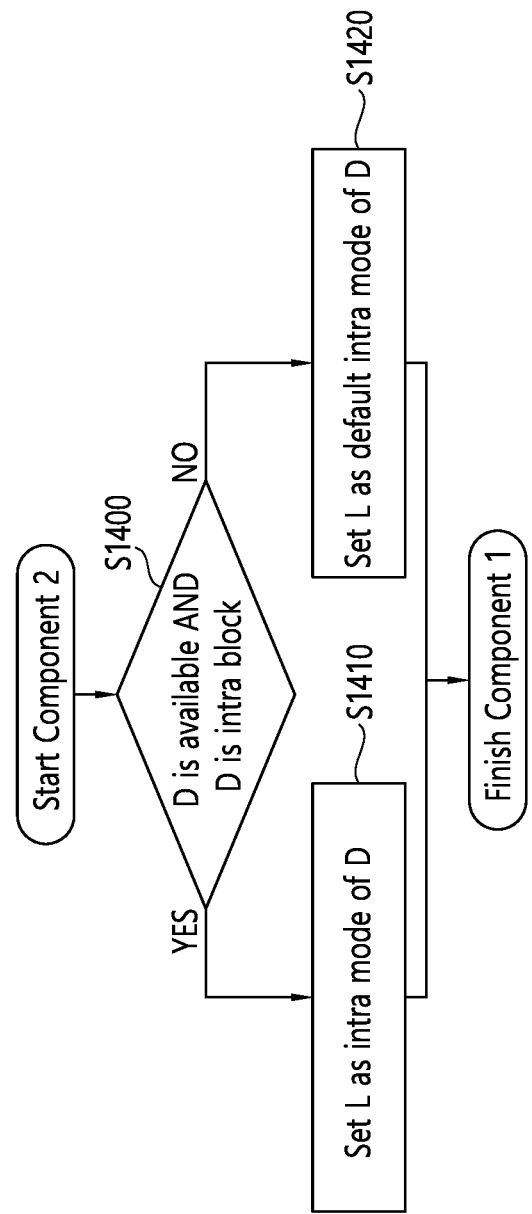
FIGS. 14a to 14b illustrate one example of determining availability of the neighboring block B and the neighboring block D.
Figure 14B:
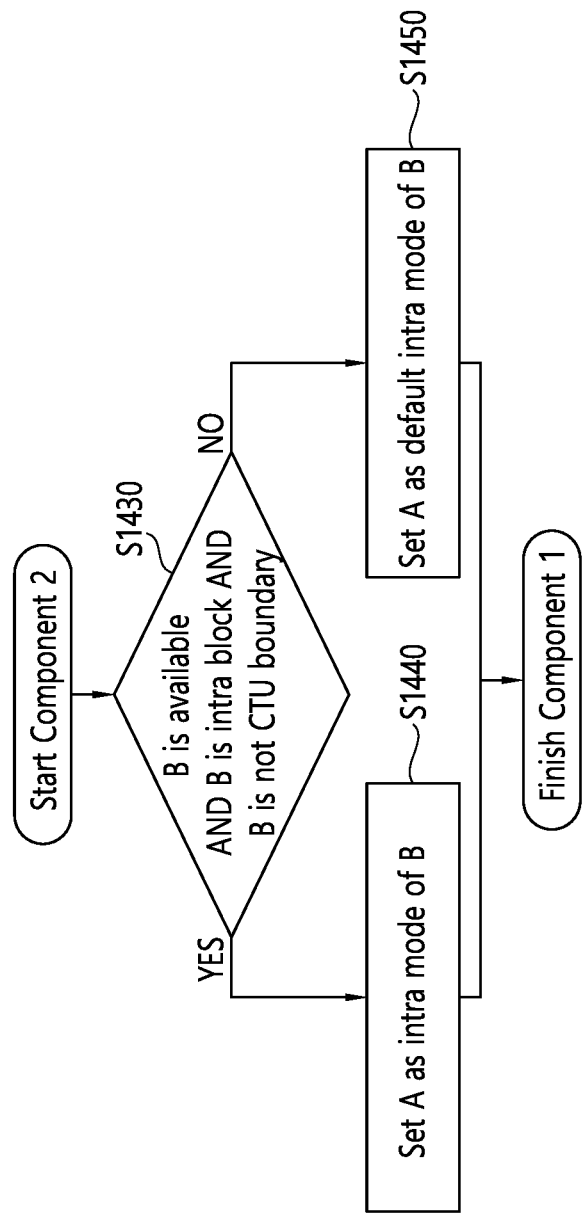

FIGS. 14a to 14b illustrate one example of determining availability of the neighboring block B and the neighboring block D.

Referring to FIG. 14a, the encoding apparatus/decoding apparatus may determine whether the neighboring block D is available, and the neighboring block D is an intra coded block S1400. Here, the intra coded block may represent a block coded based on intra prediction.

If the neighboring block D is available, and the neighboring block D is the intra coded block, the encoding apparatus/decoding apparatus may set L of the current block as the intra prediction mode of the neighboring block D S1410. If the neighboring block D is available, and the neighboring block D is the intra coded block, the encoding apparatus/decoding apparatus may derive the intra prediction mode of the neighboring block D as L of the current block. The L may represent a first intra prediction mode of the current block.

Meanwhile, if the neighboring block D is unavailable, or the neighboring block D is not the intra coded block, the encoding apparatus/decoding apparatus may set the L of the current block as the default intra prediction mode which is set as the intra prediction mode of the neighboring block D S1420. In other words, if the neighboring block D is unavailable, or the neighboring block D is not the intra coded block, the encoding apparatus/decoding apparatus may derive the default intra prediction mode as the L of the current block. Here, for example, the default intra prediction mode may be the planar intra prediction mode.

A procedure similar to that for the neighboring block D described in detail above may be applied to the neighboring block B. However, since the neighboring block B is located in an upper region of a current block, it is possible that the neighboring block B is located outside a current CTU including the current block. In other words, since the neighboring block B is located in the upper region of the current block, it is possible that the neighboring block B is not included in the current CTU. If the neighboring block B is not included in the current CTU, storing information of the neighboring block B may not be taken into consideration in order to reduce a large amount of storage. In other words, prediction information of the neighboring block B may not be stored. FIG. 14b may illustrates a method for determining availability of the neighboring block B in consideration of the descriptions given above.

Referring to FIG. 14b, the encoding apparatus/decoding apparatus may determine whether the neighboring block B is available, the neighboring block B is an intra coded block, and the neighboring block B is at the CTU boundary S1430. In other words, the encoding apparatus/decoding apparatus may determine whether the neighboring block B is available, the neighboring block B is an intra coded block, and the neighboring block B belongs to a current CTU.

If the neighboring block B is available, the neighboring block B is an intra coded block, and the neighboring block B is contained in the current CTU, the encoding apparatus/decoding apparatus may set A of the current block as the intra prediction mode of the neighboring block B S1440. If the neighboring block B is available, the neighboring block B is an intra coded block, and the neighboring block B is contained in the current CTU, the encoding apparatus/decoding apparatus may derive the intra prediction mode of the neighboring block B as A of the current block. The A may represent a second intra prediction mode of the current block.

Meanwhile, if the neighboring block B is unavailable, the neighboring block D is not the intra coded block, or the neighboring block B is not contained in the current CTU, the encoding apparatus/decoding apparatus may set the A of the current block as the default intra prediction mode which is set as the intra prediction mode of the neighboring block B S1450. In other words, if the neighboring block B is unavailable, the neighboring block D is not the intra coded block, or the neighboring block B is not contained in the current CTU, the encoding apparatus/decoding apparatus may derive the default intra prediction mode as the A of the current block. Here, for example, the default intra prediction mode may be the planar intra prediction mode.

Meanwhile, the S1310 step, which is a process for determining availability of the neighboring block B and the neighboring block D, may be performed in an embodiment different from the embodiment shown in FIG. 14. For example, the S1310 step may be described as shown in FIG. 15.

Figure 15A:
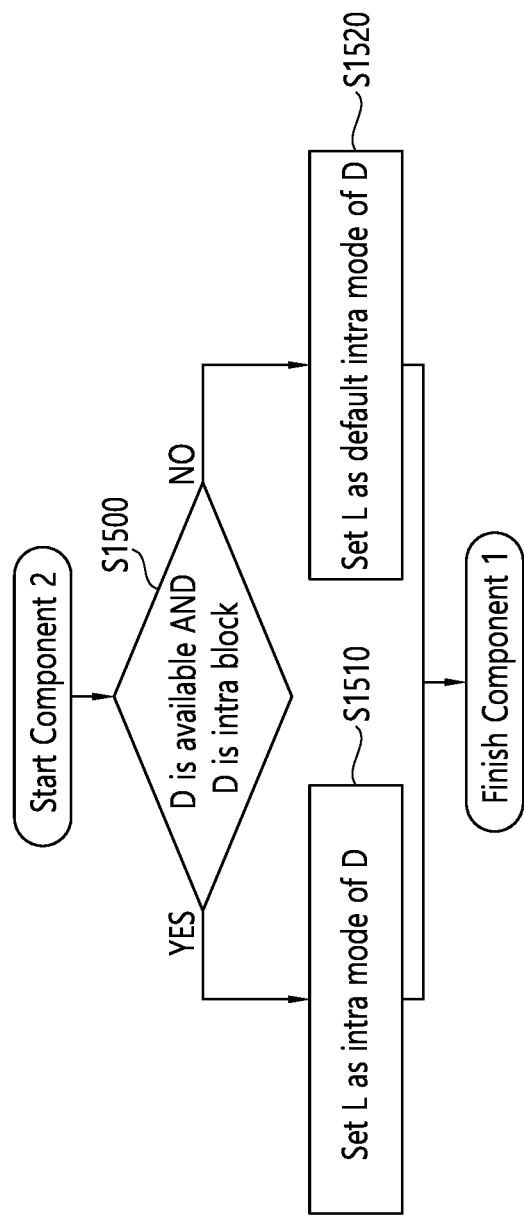
FIGS. 15a to 15b illustrate one example of determining availability of the neighboring block B and the neighboring block D.
Figure 15B:
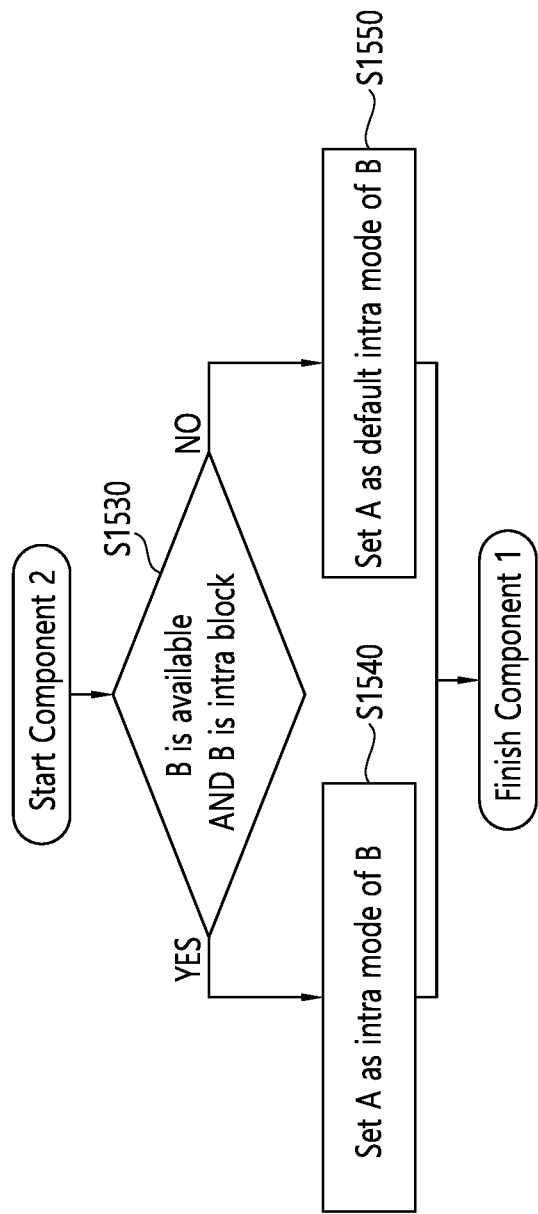

FIGS. 15a to 15b illustrate one example of determining availability of the neighboring block B and the neighboring block D. FIG. 15 illustrates one example in which availability of the neighboring block B and the neighboring block D is determined when the encoding apparatus/decoding apparatus has a large amount of storage to store all the detailed information of reconstructed blocks. Therefore, the intra prediction mode of the neighboring block B may be available regardless of whether the neighboring block B is located inside or outside the current CTU. Therefore, an embodiment different from the process for determining availability of the neighboring block B of FIG. 14 may be proposed.

For example, referring to FIG. 15a, the encoding apparatus/decoding apparatus may determine whether the neighboring block D is available, and the neighboring block D is an intra coded block S1500. Here, the intra coded block may represent a block coded based in intra prediction.

If the neighboring block D is available, and the neighboring block D is the intra coded block, the encoding apparatus/decoding apparatus may set L of the current block as the intra prediction mode of the neighboring block D S1510. If the neighboring block D is available, and the neighboring block D is the intra coded block, the encoding apparatus/decoding apparatus may derive the intra prediction mode of the neighboring block D as L of the current block. The L may represent a first intra prediction mode of the current block.

Meanwhile, if the neighboring block D is unavailable, or the neighboring block D is not the intra coded block, the encoding apparatus/decoding apparatus may set the L of the current block as the default intra prediction mode which is set as the intra prediction mode of the neighboring block D S1520. In other words, if the neighboring block D is unavailable, or the neighboring block D is not the intra coded block, the encoding apparatus/decoding apparatus may derive the default intra prediction mode as the L of the current block. Here, for example, the default intra prediction mode may be the planar intra prediction mode.

Referring to FIG. 15b, the encoding apparatus/decoding apparatus may determine whether the neighboring block B is available, and the neighboring block B is an intra coded block S1530. In other words, the encoding apparatus/decoding apparatus may determine whether the neighboring block B is available, and the neighboring block B is an intra coded block. Different from the embodiment of FIG. 14b, whether the neighboring block B is contained in the current CTU may not be determined.

If the neighboring block B is available, and the neighboring block B is an intra coded block, the encoding apparatus/decoding apparatus may set A of the current block as the intra prediction mode of the neighboring block B S1540. If the neighboring block B is available, and the neighboring block B is an intra coded block, the encoding apparatus/decoding apparatus may derive the intra prediction mode of the neighboring block B as A of the current block. The A may represent a second intra prediction mode of the current block.

Meanwhile, if the neighboring block B is unavailable, or the neighboring block D is not the intra coded block, the encoding apparatus/decoding apparatus may set the A of the current block as the default intra prediction mode which is set as the intra prediction mode of the neighboring block B S1550. In other words, if the neighboring block B is unavailable, or the neighboring block D is not the intra coded block, the encoding apparatus/decoding apparatus may derive the default intra prediction mode as the A of the current block. Here, for example, the default intra prediction mode may be the planar intra prediction mode.

Referring again to FIG. 13, the encoding apparatus/decoding apparatus determines neighboring intra prediction modes of the current block S1320. Here, the neighboring intra prediction modes may include the L and the A. In other words, the neighboring intra prediction modes may include the first intra prediction mode and the second intra prediction mode of the current block. The encoding apparatus/decoding apparatus may determine whether neighboring intra prediction modes of the current block derived through the S1310 step satisfy a specific condition and if the specific condition is satisfied, may modify the neighboring intra prediction modes derived through the S1310 step. For example, the S1320 step may be described as shown in FIG. 16.

Figure 16:
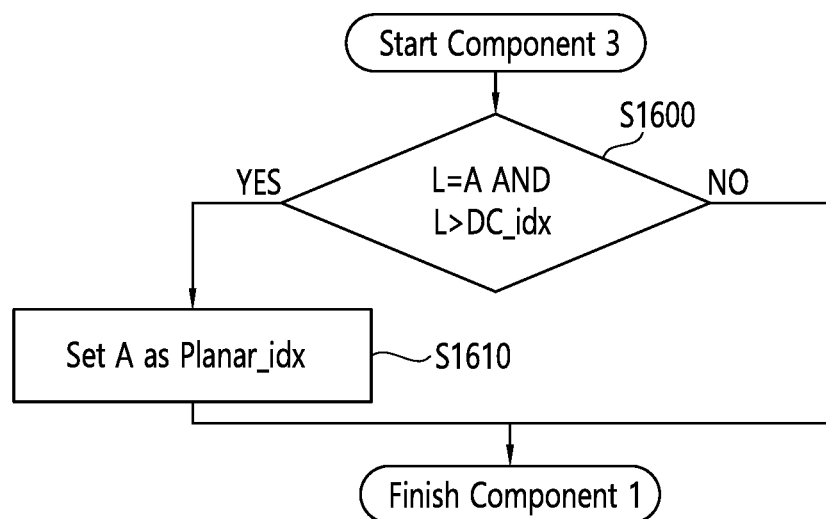
FIG. 16 illustrates one example of determining neighboring intra prediction modes of the current block.

FIG. 16 illustrates one example of determining neighboring intra prediction modes of the current block.

Referring to FIG. 16, the encoding apparatus/decoding apparatus may determine whether the L is the same as the A, and the mode number of the L is larger than the mode number (namely, 1) of a DC intra prediction mode S1600.

If the L is the same as the A, and the mode number of the L is larger than the mode number of the DC intra prediction mode, the encoding apparatus/decoding apparatus may set the A as a planar intra prediction mode S1610. In other words, if the L is the same as the A, and the mode number of the L is larger than the mode number of the DC intra prediction mode, the encoding apparatus/decoding apparatus may modify the A as a planar intra prediction mode.

Meanwhile, if the L is not the same as the A, or the mode number of the L is smaller than or equal to the mode number of the DC intra prediction mode, the encoding apparatus/decoding apparatus may maintain the L and the A. In other words, if the L is not the same as the A, or the mode number of the L is smaller than or equal to the mode number of the DC intra prediction mode, the encoding apparatus/decoding apparatus may determine the L and the A derived in the S1310 step as the neighboring intra prediction modes of the current block.

Referring again to FIG. 13, the encoding apparatus/decoding apparatus may derive a case for the current block based on the neighboring intra prediction modes S1330. In other words, based on the neighboring intra prediction modes, the encoding apparatus/decoding apparatus may derive a case to which the current block corresponds. For example, the S1330 step may be described as shown in FIG. 17.

Figure 17:
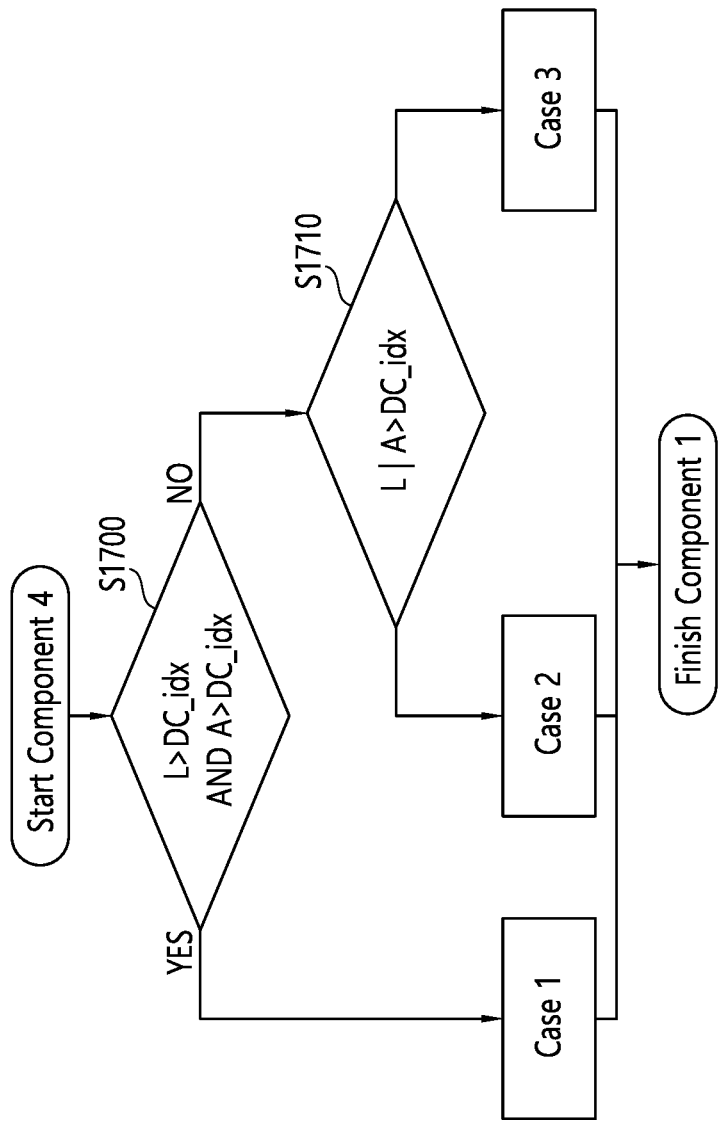
FIG. 17 illustrates one example of deriving a case for the current block based on the neighboring intra prediction modes.

FIG. 17 illustrates one example of deriving a case for the current block based on the neighboring intra prediction modes.

The encoding apparatus/decoding apparatus may determine whether the mode number of the L is larger than the mode number (namely, 1) of a DC intra prediction mode, and the mode number of the A is larger than the mode number (namely, 1) of the DC intra prediction mode S1700. In other words, the encoding apparatus/decoding apparatus may determine whether the L and the A are directional intra prediction modes. If the mode number of the L is larger than the mode number of the DC intra prediction mode, and the mode number of the A is larger than the mode number of the DC intra prediction mode (namely, if the L and the A are directional intra prediction modes), the encoding apparatus/decoding apparatus may derive the case for the current block as case 1.

Meanwhile, if the mode number of the L is not larger than the mode number of the DC intra prediction mode, or the mode number of the A is not larger than the mode number of the DC intra prediction mode (namely, if at least one of the mode number of the A and the mode number of the A is not larger than the mode number of the DC intra prediction mode), the encoding apparatus/decoding apparatus may determine whether the bitwise OR operation of the L and the A is larger than the mode number of the DC intra prediction mode S1710. If the mode number of the L is not larger than the mode number of the DC intra prediction mode, or the mode number of the A is not larger than the mode number of the DC intra prediction mode (namely, if at least one of the mode numbers of the L and the A is not larger than the mode number of the DC intra prediction mode), the encoding apparatus/decoding apparatus may determine whether the bitwise OR operation of the mode number of the L and the mode number of the A is larger than the mode number of the DC intra prediction mode. The bitwise OR operation of the mode number of the L and the mode number of the A may be derived as the OR operation of the binary value of the mode number of the L and the binary value of the mode number of the A. Meanwhile, "|" shown in FIG. 17 may denote the bitwise OR operation. For example, suppose the bitwise OR operation is applied to 2 and 1. Since the binary representation of 2 is 10, and the binary representation of 1 is 01, 2|1 may be derived as a binary value of 11, where the binary value 11 may represent 3. If the bitwise OR operation of the mode number of the L and the mode number of the A (namely, L|A) is larger than the mode number of the DC intra prediction mode, it may represent a case where one of the L and the A is a directional intra prediction mode. If the bitwise OR operation of the mode number of the L and the mode number of the A (namely, L|A) is larger than the mode number of the DC intra prediction mode, the encoding apparatus/decoding apparatus may derive the case for the current block as case 3.

Referring again to FIG. 13, the encoding apparatus/decoding apparatus may construct an MPM list of the current block according to the derived case S1340.

For example, if the case for the current block is case 1, namely, if both of the L and the A are directional intra prediction modes, the MPM list for the current block may be constructed as shown in FIG. 18.

Figure 18A:
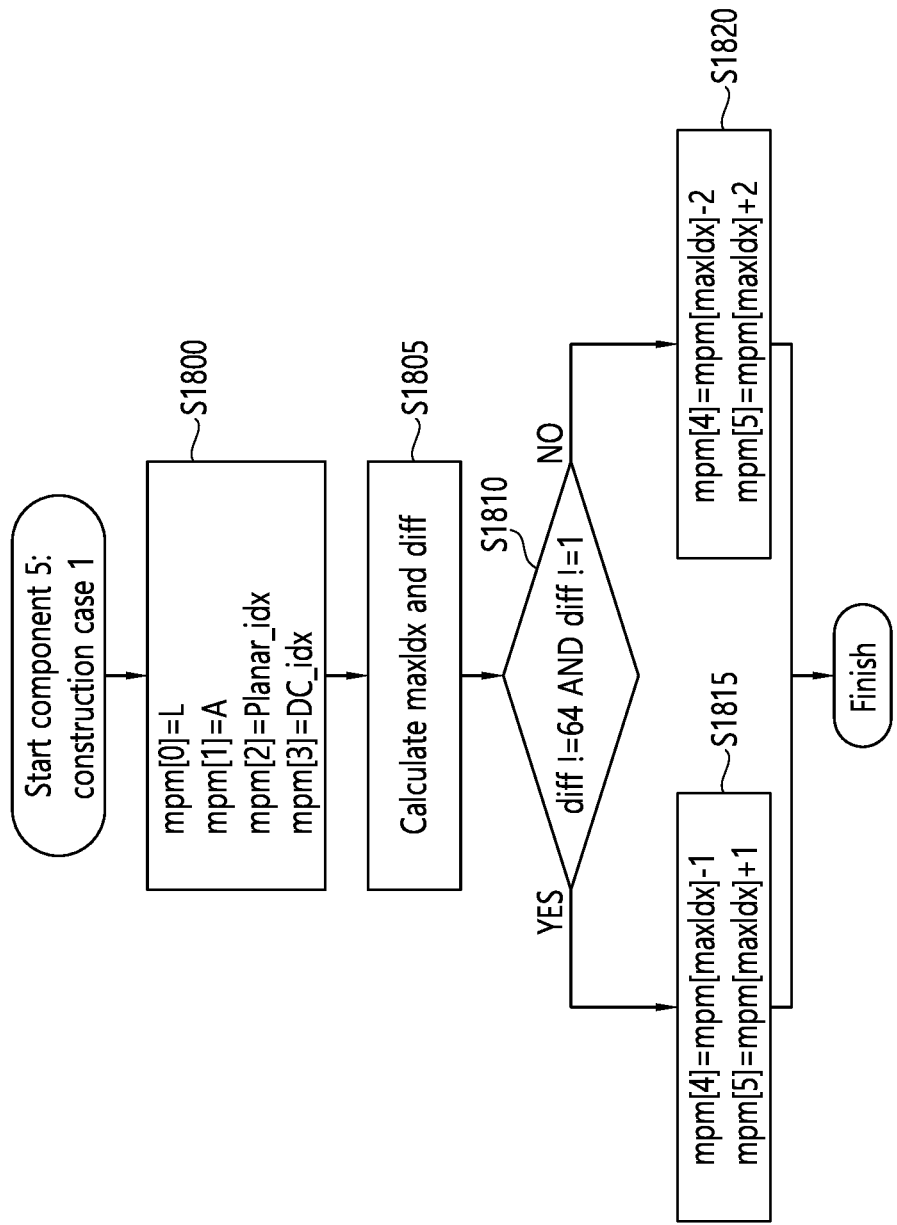
FIGS. 18a to 18b illustrate one example of constructing an MPM list of the current block when the case for the current block is case 1.
Figure 18B:
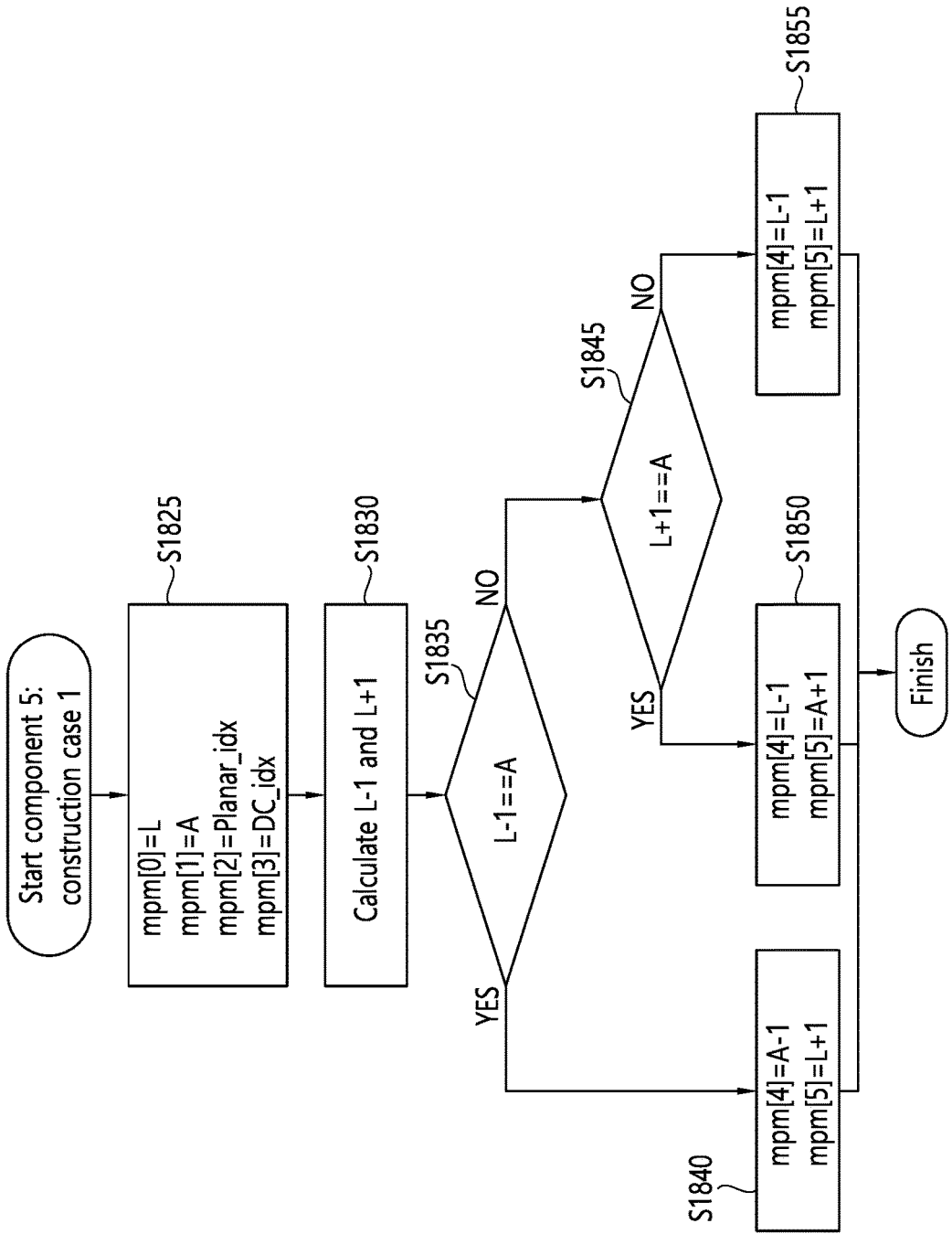

FIGS. 18a to 18b illustrate one example of constructing an MPM list of the current block when the case for the current block is case 1.

The present disclosure proposes two embodiments for constructing an MPM list of the current block when the cases for the current block shown in FIGS. 18a and 18b are case 1. Meanwhile, in both of the embodiments of FIGS. 18a and 18b, the L, the A, the planar intra prediction mode, and the DC intra prediction mode may be derived as a first MPM candidate, second MPM candidate, third MPM candidate, and fourth MPM candidate of the MPM list of the current block, respectively. Here, the first MPM candidate may represent an MPM candidate having an MPM index of 0, the second MPM candidate may represent an MPM candidate having an MPM index of 1, the third MPM candidate may represent an MPM candidate having an MPM index of 2, and the fourth MPM candidate may represent an MPM candidate having an MPM index of 3. Also, the first MPM candidate may be denoted by mpm[0], the second MPM candidate may be denoted by mpm[1], the third MPM candidate may be denoted by mpm[2], and the fourth MPM candidate may be denoted by mpm[3].

For example, referring to FIG. 18a, the encoding apparatus/decoding apparatus may derive the L, the A, the planar intra prediction mode, and the DC intra prediction mode as the first, the second, the third, and the fourth MPM candidate of the MPM list of the current block S1800.

Afterwards, the encoding apparatus/decoding apparatus may derive maxidx and diff S1805. Here, the maxidx may represent an MPM index indicating an MPM candidate having the larger mode number between the MPM candidate representing the A and the MPM candidate representing the L; and diff may represent a difference between the MPM candidate representing the A and the MPM candidate representing the L.

Also, the maxidx and the diff may be derived based on the L and the A. For example, the maxidx and the diff may be derived as shown in the table below.

TABLE 12

If L>A, max_idx is 0 and min_idx is 1.
Otherwise, max_idx is 1 and min_idx is 0.
diff=mpm[max_idx]−mpm[min_idx]

Referring to Table 12, if the mode number of the L is larger than the mode number of the A, the maxidx may be derived as 0, and minidx may be derived as 1. Also, if the mode number of the L is not larger than the mode number of the A, the maxidx may be derived as 1, and minidx may be derived as 0.

Also, the diff may be derived as a value obtained by subtracting an MPM candidate indicated by the minidx from the MPM candidate indicated by the maxidx.

Afterwards, the encoding apparatus/decoding apparatus may determine whether the value of diff is not 64 and is not 1 S1810. The exclamation mark shown in FIG. 18 may represent the logical NOT operator. The logical NOT operator may represent an operator that converts a false value to true or a true value to false. For example, the value of !7 may be 0, and the value of !0 may be 1. As another example, the value of !1 may be 0, and the value of !0 may be 1.

If the diff is not 64 and is not 1, the encoding apparatus/decoding apparatus may derive an intra prediction mode having a mode number obtained by subtracting 1 from the mode number of the MPM candidate indicated by the maxidx as the fifth MPM candidate of the current block and derive an intra prediction mode having a mode number obtained by adding 1 to the mode number of the MPM candidate indicated by the maxidx as the sixth MPM candidate of the current block S1815.

Also, if the diff is 64 or 1, the encoding apparatus/decoding apparatus may derive an intra prediction mode having a mode number obtained by subtracting 2 from the mode number of the MPM candidate indicated by the maxidx as the fifth MPM candidate of the current block and derive an intra prediction mode having a mode number obtained by adding 2 to the mode number of the MPM candidate indicated by the maxidx as the sixth MPM candidate of the current block S1820.

FIG. 18b may represent another example of constructing an MPM list of the current block when the case for the current block is case 1.

Referring to FIG. 18b, the encoding apparatus/decoding apparatus may derive the L, the A, the planar intra prediction mode, and the DC intra prediction mode as the first, the second, the third, and the fourth MPM candidate of the MPM list of the current block S1825.

Afterwards, the encoding apparatus/decoding apparatus may derive L−1 and L+1 S1830. The L−1 may represent a value obtained by subtracting 1 from the mode number of the L, and the L+1 may represent a value obtained by adding 1 to the mode number of the L.

The encoding apparatus/decoding apparatus may determine whether the L−1 is the same as the A S1835. In other words, the encoding apparatus/decoding apparatus may determine whether the L−1 is the same as the mode number of the A.

If the L−1 is the same as the A, the encoding apparatus/decoding apparatus may derive an intra prediction mode having a mode number obtained by subtracting 1 from the mode number of the A as the fifth MPM candidate of the current block and derive an intra prediction mode having a mode number obtained by adding 1 to the mode number of the L as the sixth candidate of the current block.

Meanwhile, if the L−1 is not the same as the A, the encoding apparatus/decoding apparatus may determine whether the L+1 is the same as the A S1845. In other words, the encoding apparatus/decoding apparatus may determine whether the L+1 is the same as the mode number of the A.

If the L+1 is the same as the A, the encoding apparatus/decoding apparatus may derive an intra prediction mode having a mode number obtained by subtracting 1 from the mode number of the L as the fifth MPM candidate of the current block and derive an intra prediction mode having a mode number obtained by adding 1 to the mode number of the A as the sixth candidate of the current block S1850.

If the L+1 is not the same as the A, the encoding apparatus/decoding apparatus may derive an intra prediction mode having a mode number obtained by subtracting 1 from the mode number of the L as the fifth MPM candidate of the current block and derive an intra prediction mode having a mode number obtained by adding 1 to the mode number of the L as the sixth candidate of the current block S1855.

Meanwhile, in the description above, intra prediction mode+1, intra prediction mode 1, intra prediction mode+2, and intra prediction mode−2 (for example, L+1, L−1, A+1, and A−1) may not be calculated by simply adding or subtracting a particular value mathematically.

For example, in some cases, a value derived by adding or subtracting a value to or from a directional intra prediction mode may represent a non-directional intra prediction mode for which consistency is not maintained or may exceed the maximum available intra prediction mode index. As one example, a value obtained by subtracting 1 from a directional intra prediction mode may be derived as 1 indicating a DC intra prediction mode. Also, as another example, a value obtained by adding 1 to 66 intra prediction mode may be derived as 67, where the 67 may be a value exceeding the maximum available intra prediction mode index (namely, 66). Therefore, adding and subtracting a value to and from a mode may not be conducted by simply adding or subtracting a particular value mathematically, but modular arithmetic may be used instead. The modular arithmetic may be denoted by %. Adding and subtracting a value to and from a mode may be restricted to use the modular arithmetic. In other words, a value representing a non-directional intra prediction mode for which consistency is not maintained or a value exceeding the maximum available intra mode index may be prevented from being derived. For example, when modular arithmetic is used, adding and subtracting a value to and from a mode may be derived as shown in the table below.

TABLE 13

- Intra mode −1 : (Intra mode +62)%65+2
- Intra mode +1 : (Intra mode −1)%65+2
- Intra mode −2 : (Intra mode +61)%65+2

Meanwhile, for example, if the case for the current block is case 2, namely, if one of the L and the A is a directional intra prediction mode, an MPM list of the current block may be constructed as shown in FIG. 19.

Figure 19A:
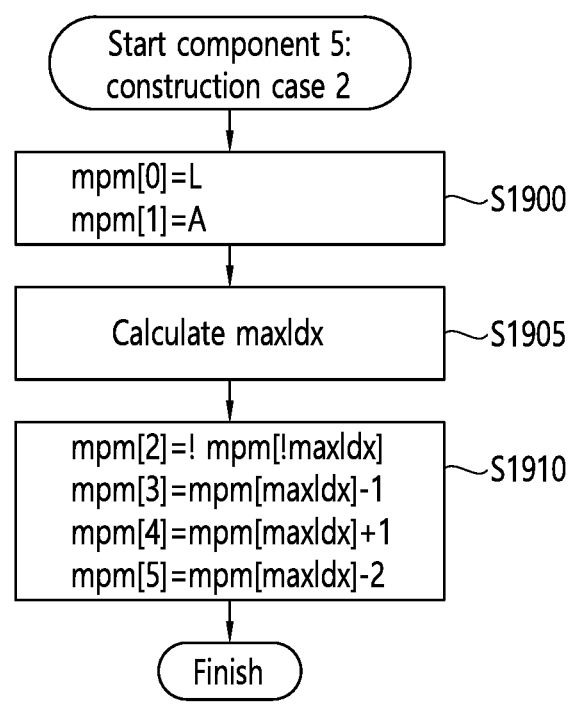
FIGS. 19a to 19b illustrate one example of constructing an MPM list of the current block when the case for the current block is case 2.
Figure 19B:
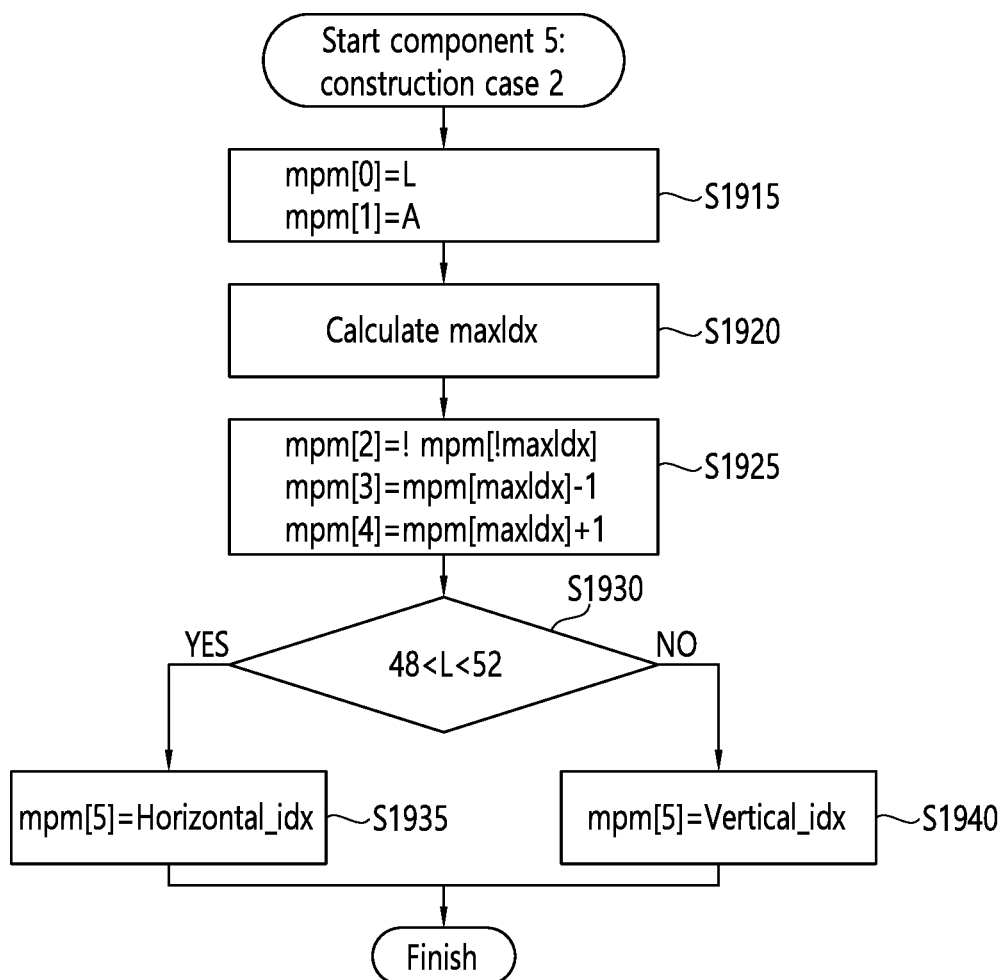

FIGS. 19a to 19b illustrate one example of constructing an MPM list of the current block when the case for the current block is case 2.

The present disclosure proposes two embodiments for constructing an MPM list of the current block when the cases for the current block shown in FIGS. 19a and 19b are case 2. Meanwhile, in both of the embodiments of FIGS. 19a and 19b, the L and the A may be derived as a first MPM candidate and a second MPM candidate of the MPM list of the current block. Here, the first MPM candidate may represent an MPM candidate having an MPM index of 0, and the second MPM candidate may represent an MPM candidate having an MPM index of 1. Also, the first MPM candidate may be denoted by mpm[0], and the second MPM candidate may be denoted by mpm[1].

For example, referring to FIG. 19a, the encoding apparatus/decoding apparatus may derive the L and the A as the first and the second MPM candidate of the MPM list of the current block S1900.

Afterwards, the encoding apparatus/decoding apparatus may derive maxidx S1905. Here, the maxidx may represent an MPM index indicating an MPM candidate having the larger mode number between the MPM candidate representing the A and the MPM candidate representing the L. The maxidx may be derived as shown in Table 12 above. For example, if the mode number of the L is larger than the mode number of the A, the maxidx may be derived as 0, and minidx may be derived as 1. Also, if the mode number of the L is not larger than the mode number of the A, the maxidx may be derived as 1, and minidx may be derived as 0.

Afterwards, the encoding apparatus/decoding apparatus may derive the remaining MPM candidates of the MPM list of the current block based on the maxidx S1910.

For example, the third MPM candidate, the fourth MPM candidate, the fifth MPM candidate, and the sixth MPM candidate of the MPM list may be derived as shown in the table below.

TABLE 14 mpm[2] = ! mpm[min_idx]
mpm[3] = mpm[max_idx]−1
mpm[4] = mpm[max_idx]+1
mpm[5] = mpm[max_idx]−2

Here, the third MPM candidate may represent an MPM candidate having an MPM index of 2, the fourth MPM candidate may represent an MPM candidate having an MPM index of 3, the fifth MPM candidate may represent an MPM candidate having an MPM index of 4, and the sixth MPM candidate may represent an MPM candidate having an MPM index of 5. Also, the third MPM candidate may be denoted by mpm[2], the fourth MPM candidate may be denoted by mpm[3], the fifth MPM candidate may be denoted by mpm[4], and the sixth MPM candidate may be denoted by mpm[5]. Referring to Table 14, the third MPM candidate may be derived as an intra prediction mode having a value obtained by applying the logical NOT operator to the MPM candidate indicated by the minidx, the fourth MPM candidate may be derived as an intra prediction mode having a value obtained by subtracting 1 from the MPM candidate indicated by the maxidx, the fifth MPM candidate may be derived as an intra prediction mode having a value obtained by adding 1 to the MPM candidate indicated by the maxidx, and the sixth MPM candidate may be derived as an intra prediction mode having a value obtained by subtracting 2 from the MPM candidate indicated by the maxidx.

FIG. 19b illustrates another example of constructing an MPM list of the current block when the case for the current block is case 2.

Referring to FIG. 19b, the encoding apparatus/decoding apparatus may derive the L and the A as the first MPM candidate and the second MPM candidate of the MPM list of the current block S1915.

Afterwards, the encoding apparatus/decoding apparatus may derive maxidx S1920. Here, the maxidx may represent an MPM index indicating an MPM candidate having the larger mode number between the MPM candidate representing the A and the MPM candidate representing the L. The maxidx may be derived as shown in Table 12. For example, if the mode number of the L is larger than the mode number of the A, the maxidx may be derived as 0, and the minidx may be derived as 1. Also, if the mode number of the L is not larger than the mode number of the A, the maxidx may be derived as 1, and the minidx may be derived as 0.

Afterwards, the encoding apparatus/decoding apparatus may derive the third MPM candidate, the fourth MPM candidate, and the fifth MPM candidate of the MPM list of the current block based on the maxidx S1925. For example, the third MPM candidate may be derived as an intra prediction mode having a value obtained by applying the logical NOT operator to the MPM candidate indicated by the minidx, the fourth MPM candidate may be derived as an intra prediction mode having a value obtained by subtracting 1 from the MPM candidate indicated by the maxidx, and the fifth MPM candidate may be derived as an intra prediction mode having a value obtained by adding 1 to the MPM candidate indicated by the maxidx.

Afterwards, the encoding apparatus/decoding apparatus may determine whether the L is larger than 48 and smaller than 52 S1930.

If the L is larger than 48 and smaller than 52, the encoding apparatus/decoding apparatus may derive the sixth MPM candidate of the MPM list of the current block as a horizontal intra prediction mode S1935. For example, the horizontal intra prediction mode may represent the 18 intra prediction mode. If the L is larger than 48 and smaller than 52, the encoding apparatus/decoding apparatus may derive the sixth MPM candidate of the MPM list of the current block as the 18 intra prediction mode.

Also, if the L is smaller than or equal to 48, or the L is larger than or equal to 52, the encoding apparatus/decoding apparatus may derive the sixth MPM candidate of the MPM list of the current block as a vertical intra prediction mode S1940. For example, if the vertical intra prediction mode may represent 50 intra prediction mode. If the L is smaller than or equal to 48, or the L is larger than or equal to 52, the encoding apparatus/decoding apparatus may derive the sixth MPM candidate of the MPM list of the current block as the 50 intra prediction mode.

Figure 20:
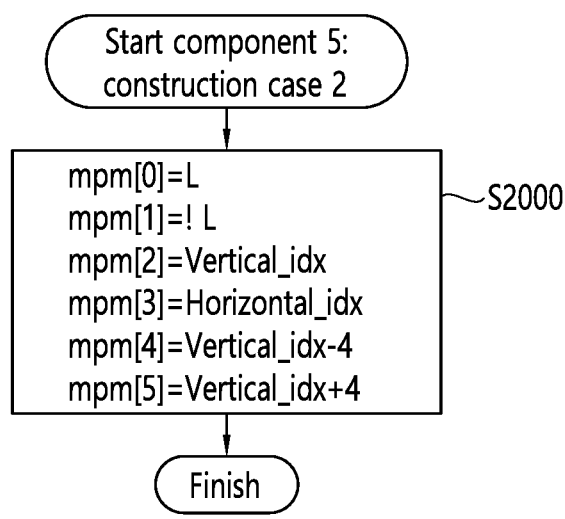
FIG. 20 illustrates one example of constructing an MPM list of the current block when the case for the current block is case 3.

Meanwhile, for example, if the case for the current block is case 3, namely, if both of the L and the A are non-directional intra prediction modes, the MPM list of the current block may be constructed as shown in FIG. 20.

FIG. 20 illustrates one example of constructing an MPM list of the current block when the case for the current block is case 3.

Referring to FIG. 20, the encoding apparatus/decoding apparatus may derive an MPM list of the current block as an MPM list for the case 3 S2000.

For example, if the case for the current block is case 3, the MPM list of the current block may be derived as shown in the table below.

TABLE 15 mpm[0] = L
mpm[1] = ! L
mpm[2] = Vertical_idx
mpm[3] = Horizontal_idx
mpm[4] = Vertical_idx−4
mpm[5] = Vertical_idx+4

The encoding apparatus/decoding apparatus may derive an MPM list including a first MPM candidate to a sixth MPM candidate as shown in Table 15.

Here, the first MPM candidate may represent an MPM candidate having an MPM index of 0, the second MPM candidate may represent an MPM candidate having an MPM index of 1, the third MPM candidate may represent an MPM candidate having an MPM index of 2, the fourth MPM candidate may represent an MPM candidate having an MPM index of 3, the fifth MPM candidate may represent an MPM candidate having an MPM index of 4, and the sixth MPM candidate may represent an MPM candidate having an MPM index of 5. Also, the first MPM candidate may be denoted by mpm[0], the second MPM candidate by mpm[1], the third MPM candidate by mpm[2], the fourth MPM candidate by mpm[3], the fifth MPM candidate by mpm[4], and the sixth MPM candidate by mpm[5]. Referring to Table 15, the first MPM candidate may be derived by the L, the second MPM candidate may be derived as an intra prediction mode having a value obtained by applying the logical NOT operator to the L, the third MPM candidate may be derived as a vertical intra prediction mode, the fourth MPM candidate may be derived as a horizontal intra prediction mode, the fifth MPM candidate may be derived as an intra prediction mode having a value obtained by subtracting 4 from the vertical intra prediction mode, and the sixth MPM candidate may be derived as an intra prediction mode having a value obtained by adding 4 to the vertical intra prediction mode.

Meanwhile, the encoding apparatus may construct an MPM list as described above and calculate a rate-distortion curve by deriving a plurality of candidates from the MPM list for efficient rate-distortion optimization (RDO). Afterwards, among the MPM candidates, an optimal intra prediction mode that optimizes rate and distortion may be determined. Therefore, after the MPM list is constructed, 1, 2, or 3 of the first MPM index may be derived. For example, if one MPM candidate is derived, mpm[0] may be put into RDO. Meanwhile, although the number of MPM candidates does not have a normative reference to be followed, it may be an issue for the encoding apparatus, which may have an influence on the coding efficiency. Accordingly, the present disclosure proposes a method for including two or three MPM candidates in a complete RDO calculation. For example, if the L is the same as the A after component 3, two MPM candidates may be used, otherwise three MPM candidates may be used.

Meanwhile, the present disclosure proposes an embodiment to be described below, as a method for constructing an MPM list for the current block.

Figure 21:
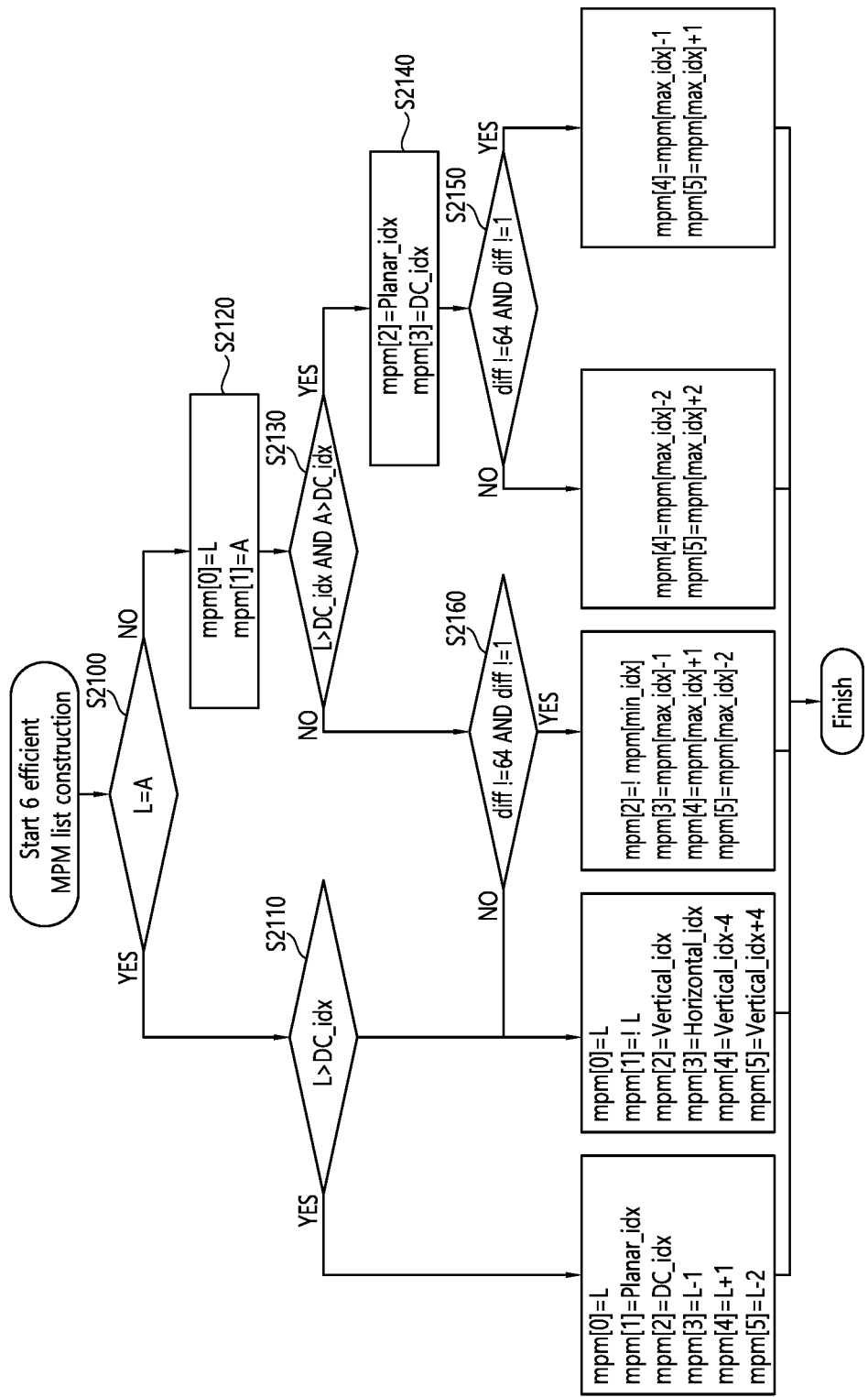
FIG. 21 illustrates one example of constructing an MPM list for a current block.

FIG. 21 illustrates one example of constructing an MPM list for a current block.

FIG. 21 illustrates one embodiment for efficiently constructing an MPM list for the current block containing k MPM candidates based on neighboring blocks of the current block. For example, k may be 6, and among 5 efficient lists, 5 conditions may be used to construct an MPM list for the current block. Meanwhile, referring to FIG. 21, L may represent an intra prediction mode of the neighboring block B, and A may represent an intra prediction mode of the neighboring block D. Or, referring to FIG. 21, L may represent an intra prediction mode of the neighboring block D, and A may represent an intra prediction mode of the neighboring block B.

More specifically, referring to FIG. 21, the encoding apparatus/decoding apparatus may check condition 1 indicating whether the L is the same as the A S2100. In other words, the encoding apparatus/decoding apparatus may determine whether the L is the same as the A.

If the L is the same as the A, the encoding apparatus/decoding apparatus may determine condition 2 indicating whether the mode number of the L is larger than the mode number of a DC intra prediction mode S2110. In other words, if the L is the same as the A, the encoding apparatus/decoding apparatus may check whether the L is the same as the A, and the L and the A are directional intra prediction modes. If the second condition is satisfied, MPM list 1 may be derived as an MPM list for the current block, otherwise MPM list 2 may be derived as an MPM list for the current block.

The MPM list 1 may be derived as shown in the table below.

TABLE 16 mpm[0] = L
mpm[2] = Planar_idx
mpm[3] = DC_idx
mpm[3] = L−1

TABLE 16-continued mpm[4] = L+1
mpm[5] = L−2

Referring to Table 16, the MPM list 1 may include a first MPM candidate representing L, a second MPM candidate representing a planar intra prediction mode, a third MPM candidate representing a DC intra prediction mode, a fourth MPM candidate representing L−1, a fifth MPM candidate representing L+1, and a sixth MPM candidate representing L−2.

Also, the MPM list 2 may be derived as shown in the table below.

TABLE 17 mpm[0] = L
mpm[1] = ! L
mpm[2] = Vertical_idx
mpm[3] = Horizontal_idx
mpm[4] = Vertical_idx−4
mpm[5] = Vertical_idx+4

Referring to Table 17, the MPM list 2 may include a first MPM candidate representing L, a second MPM candidate representing an intra prediction mode having a value obtained by applying the logical NOT operator to the L, a third MPM candidate representing a vertical intra prediction mode, a fourth MPM candidate representing a horizontal intra prediction mode, a fifth MPM candidate representing an intra prediction mode having a value obtained by subtracting 4 from the vertical intra prediction mode, and a sixth MPM candidate representing an intra prediction mode having a value obtained by adding 4 to the vertical intra prediction mode.

Meanwhile, the first MPM candidate may represent an MPM candidate having an MPM index of 0, the second MPM candidate may represent an MPM candidate having an MPM index of 1, the third MPM candidate may represent an MPM candidate having an MPM index of 2, the fourth MPM candidate may represent an MPM candidate having an MPM index of 3, the fifth MPM candidate may represent an MPM candidate having an MPM index of 4, and the sixth MPM candidate may represent an MPM candidate having an MPM index of 5. Also, the first MPM candidate may be denoted by mpm[0], the second MPM candidate by mpm[1], the third MPM candidate by mpm[2], the fourth MPM candidate by mpm[3], the fifth MPM candidate by mpm[4], and the sixth MPM candidate by mpm[5].

Meanwhile, if the L is not the same as the A, the encoding apparatus/decoding apparatus may derive a shared list 1 S2120 and may perform the next step S2130. The shared list 1 may be derived as part of the MPM list for the current block.

The shared list 1 may be derived as shown in the table below.

TABLE 18 mpm[0] = L
mpm[1] = A
If L>A, max_idx is 0 and min_idx is 1.
Otherwise, max_idx is 1 and min_idx is 0.

Referring to Table 18, the shared list 1 may include a first MPM candidate representing the L and a second MPM candidate representing the A. In other words, if the L is not the same as the A, the encoding apparatus/decoding apparatus may derive the L as the first MPM candidate and derive the A as the second MPM candidate. Referring to FIG. 18, mpm[0] may denote the first MPM candidate, and mpm[1] may denote the second MPM candidate. The first MPM candidate may represent an MPM candidate indicated by the MPM index having a value of 0, and the second MPM candidate may represent an MPM candidate indicated by the MPM index having a value of 1.

Also, referring to Table 18, maxidx and minidx may be derived based on the L and the A. For example, if the L is larger than the A, the maxidx may be derived as 0, and the minidx may be derived as 1. Also, for example, if the L is not larger than the A, the maxidx may be derived as 1, and the minidx may be derived as 0.

Afterwards, the encoding apparatus/decoding apparatus may check a third condition S2130. The third condition may indicate whether the mode number of the L is larger than the mode number of a DC intra prediction mode, and the mode number of the A is larger than the mode number of the DC intra prediction mode.

If the third condition is satisfied, namely, if the mode number of the L is larger than the mode number of the DC intra prediction mode, and the mode number of the A is larger than the mode number of the DC intra prediction mode, the encoding apparatus/decoding apparatus may derive shared list 2 S2130 and may perform the next step S2150.

The shared list 2 may be derived as part of the MPM list for the current block.

The shared list 2 may be derived as shown in the table below.

TABLE 19 mpm[2] = Planar_idx
mpm[3] = DC_idx
diff=mpm[max_idx]-mpm[min_idx]

Referring to Table 19, the shared list 2 may include a third MPM candidate representing a planar intra prediction mode and a fourth MPM candidate representing a DC intra prediction mode. In other words, if the mode number of the L is larger than the mode number of the DC intra prediction mode, and the mode number of the A is larger than the mode number of the DC intra prediction mode, the encoding apparatus/decoding apparatus may derive the planar intra prediction mode as the third MPM candidate and derive the DC intra prediction mode as the fourth MPM candidate. Referring to Table 19, mpm[2] may denote the third MPM candidate, and mpm[3] may denote the fourth MPM candidate. The third MPM candidate may represent an MPM candidate indicated by the MPM index having a value of 2, and the fourth MPM candidate may represent an MPM candidate indicated by the MPM index having a value of 3.

Also, referring to Table 19, diff may be derived based on the maxidx and the minidx derived as shown in Table 18. For example, the diff may be derived as a difference between an MPM candidate indicated by an MPM index having a value determined by the maxidx and an MPM candidate indicated by an MPM index having a value determined by the minidx. The diff may represent a difference between the L and the A.

Afterwards, the encoding apparatus/decoding apparatus may check a fourth condition S2150. The fourth condition may indicate whether the diff is not 64 and is not 1. In other words, the encoding apparatus/decoding apparatus may determine whether the diff is not 64 and is not 1. The encoding apparatus may determine whether a difference between the L and the A is 64 and 1.

If the fourth condition is satisfied, namely, if the diff is not 64 and is not 1, the remaining part of the MPM list of the current block may be derived as shown in the table below.

TABLE 20 mpm[4] = mpm[max_idx]-2
mpm[5] = mpm[max_idx]+2

Referring to Table 20, if the fourth condition is satisfied, namely, if the diff is not 64 and is not 1, the encoding apparatus/decoding apparatus may derive an intra prediction mode having a value obtained by subtracting 1 from the MPM candidate indicated by the maxidx as the fifth MPM candidate and derive an intra prediction mode having a value obtained by adding 1 to the MPM candidate indicated by the maxidx as the sixth MPM candidate. If the fourth condition is satisfied, the MPM list of the current block may be derived as MPM list 5. In other words, Table 20 may represent the remaining portion of the MPM list 5. The MPM list 5 may include the shared list 1, the shared list 2, and the remaining portion of the MPM list 5 disclosed in Table 20.

Meanwhile, if the fourth condition is not satisfied, namely, if the diff is 64 or 1, the remaining portion of the MPM list of the current block may be derived as shown in the table below.

TABLE 21 mpm[4] = mpm[max_idx]-1
mpm[5] = mpm[max_idx]+1

Referring to Table 21, if the fourth condition is not satisfied, namely, if the diff is 64 or 1, the encoding apparatus/decoding apparatus may derive an intra prediction mode having a value obtained by subtracting 2 from the MPM candidate indicated by the maxidx as the fifth MPM candidate and derive an intra prediction mode having a value obtained by adding 2 to the MPM candidate indicated by the maxidx as the sixth MPM candidate. If the fourth condition is not satisfied, the MPM list of the current block may be derived as MPM list 4. In other words, Table 21 may represent the remaining portion of the MPM list 4. The MPM list 4 may include the shared list 1, the shared list 2, and the remaining portion of the MPM list 4 disclosed in Table 21.

Meanwhile, if the third condition is not satisfied, namely, if the mode number of the L is not larger than the mode number of a DC intra prediction mode, or the mode number of the A is not larger than the mode number of the DC intra prediction mode, the encoding apparatus/decoding apparatus may check a fifth condition S2160. The fifth condition may indicate whether one of the L and the A is a directional intra prediction mode. In other words, the encoding apparatus/decoding apparatus may determine whether one of the L and the A is a directional intra prediction mode. For example, the encoding apparatus/decoding apparatus may determine whether a sum of the mode number of the L and the mode number of the A is larger than or equal to 2.

If the fifth condition is satisfied, namely, if a sum of the mode number of the L and the mode number of the A is larger than or equal to 2 (if one of the L and the A is a directional intra prediction mode), the remaining portion of the MPM list of the current block may be derived as shown in the table below.

TABLE 22

```
mpm[2] = ! mpm[min_idx]
mpm[3] = mpm[max_idx]-1
mpm[4] = mpm[max_idx]+1
mpm[5] = mpm[max_idx]-2
```

Referring to Table 22, if the fifth condition is satisfied, namely, if the sum of the mode number of the L and the mode number of the A is larger than or equal to 2 (if one of the L and the A is a directional intra prediction mode), the encoding apparatus/decoding apparatus may derive an intra prediction mode having a value obtained by applying the logical NOT operator to the MPM candidate indicated by the minidx as a third MPM candidate, derive an intra prediction mode having a value obtained by subtracting 1 from the MPM candidate indicated by the maxidx as a fourth MPM candidate, derive an intra prediction mode having a value obtained by adding 1 to the MPM candidate indicated by the maxidx as a fifth MPM candidate, and derive an intra prediction mode having a value obtained by subtracting 2 from the MPM candidate indicated by the maxidx as a sixth MPM candidate. If the fifth condition is satisfied, the MPM list of the current block may be derived as MPM list 3. In other words, Table 22 may represent the remaining portion of the MPM list 3. The MPM list 3 may include the shared list 1 and the remaining portion of the MPM list disclosed in Table 22.

Meanwhile, if the fifth condition is not satisfied, namely, if the sum of the mode number of the L and the mode number of the A is smaller than 2 (if both of the L and the A are non-directional intra prediction modes), the remaining portion of the MPM list of the current block may be derived as shown in Table 17.

More specifically, for example, if the fifth condition is not satisfied, namely, if a sum of the mode number of the L and the mode number of the A is smaller than 2 (if both of the L and the A are non-directional intra prediction mode), the encoding apparatus/decoding apparatus may derive the L as a first MPM candidate, derive an intra prediction mode having a value obtained by applying the logical NOT operator to the L as a second MPM candidate, derive a vertical intra prediction mode as a third MPM candidate, derive a horizontal intra prediction mode as a fourth MPM candidate, derive an intra prediction mode having a value obtained by subtracting 4 from the vertical intra prediction mode as a fifth MPM candidate, and derive an intra prediction mode having a value obtained by adding 4 to the vertical intra prediction mode as a sixth MPM candidate. If the fifth condition is not satisfied, the MPM list of the current block may be derived as MPM list 2.

As described in the embodiment above, the encoding apparatus may construct an MPM list of the current block and determine whether an optimal intra prediction mode to be applied to the current block is included in the configured MPM candidates (or MPM list). If the intra prediction mode of the current block belongs to the MPM candidates, the encoding apparatus may encode an MPM flag and an MPM index. Here, the MPM flag may indicate whether the intra prediction mode of the current block is included in the MPM list. Also, the MPM index may represent an MPM candidate derived as an intra prediction mode of the current block among the MPM candidates. Meanwhile, if the intra prediction mode of the current block does not belong to the MPM candidates, the encoding apparatus may encode information representing the intra prediction mode of the current block.

Also, the decoding apparatus may configure MPM candidates as in the embodiment described above in the same way as the encoding apparatus. Afterwards, the decoding apparatus may check, based on the MPM flag received from the encoding apparatus, whether the intra prediction mode applied to the current block belongs to the configured MPM candidates. If the intra prediction mode applied to the current block belongs to the MPM candidates, the decoding apparatus may derive an intra prediction mode applied to the current block by using the MPM index received from the encoding apparatus. Meanwhile, if the intra prediction mode applied to the current block does not belong to the MPM candidates, the decoding apparatus may derive an intra prediction mode applied to the current block based on a prediction mode index (or the remaining intra prediction mode index) indicating a specific intra prediction mode among the remaining prediction modes except for the MPM candidates.

Meanwhile, the present disclosure proposes another embodiment for constructing an MPM list including 6 MPM candidates as described below.

For example, a pseudo code illustrating another embodiment for constructing an MPM list including 6 MPM candidates may be derived as shown in the table below.

TABLE 23

```
Determine LEFT and ABOVE intra modes
Set MPM as MPM_ordering_0
If (LEFT==ABOVE)
If (LEFT>=DC_idx), then set MPM as MPM_ordering_1
Else if (LEFT>DC_idx and ABOVE>DC_idx), then set MPM as
MPM_order
ing_2
Else if (LEFT+ABOVE> DC_idx), then set MPM as MPM_ordering_3
```

Referring to Table 23, an MPM list of the current block may be generated based on LEFT and ABOVE, which are neighboring intra prediction modes. The LEFT may represent an intra prediction mode of neighboring block D of the current block, and the ABOVE may represent an intra prediction mode of neighboring block B of the current block. The neighboring block D may represent a left neighboring block located at the lowermost side among left neighboring blocks adjacent to the left side of the current block, and the neighboring block B may represent an upper neighboring block located at the rightmost side among neighboring block adjacent to the upper side of the current block.

Referring to Table 23, the MPM list of the current block may be configured as a first MPM list. MPM_ordering_0 may represent the first MPM list.

Afterwards, if the LEFT is the same as the ABOVE, and the mode number of the LEFT is larger than or equal to the mode number of a DC intra prediction mode, the MPM list of the current block may be configured as a second MPM list. MPM_ordering_1 may represent the second MPM list.

Also, if the LEFT is not the same as the ABOVE, the mode number of the LEFT is larger than the mode number of the DC intra prediction mode, and the mode number of the DC intra prediction mode is larger than the mode number of the ABOVE, the MPM list of the current block may be configured as a third MPM list. MPM_ordering_2 may represent the third MPM list.

Also, if the LEFT is not the same as the ABOVE, one of the mode number of the LEFT and the mode number of the ABOVE is not larger than the mode number of the DC intra prediction mode, and a sum of the mode number of the LEFT and the mode number of the ABOVE is larger than the mode number of the DC intra prediction mode, the MPM list of the current block may be configured as a fourth MPM list. MPM_ordering_3 may represent the fourth MPM list.

Meanwhile, the present disclosure proposes yet another embodiment for constructing an MPM list including 6 MPM candidates as described below.

For example, yet another embodiment for constructing an MPM list including 6 MPM candidates may be derived as shown in the table below.

Referring to Table 24, candidate intra prediction modes may be derived based on neighboring blocks of the current block, and an MPM list for the current block may be constructed based on the candidate intra prediction modes. The candidate intra prediction modes may include a candidate intra prediction mode A and a candidate intra prediction mode B.

For example, if at least one of the conditions described below is true (namely, if at least one of the conditions

TABLE 24

1. The neighbouring locations ( xNbA, yNbA ) and ( xNbB, yNbB ) are set equal to ( xCb −1, yCb+ cbHeight − 1 ) and ( xCb+ cbWidth − 1, yCb −1 ), respectively.
2. For X being replaced by either A or B, the variables candIntraPredModeX are derived as follows:
  - The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xNbX, yNbX ) as inputs, and the output is assigned to availableX.
  - The candidate intra prediction mode candIntraPredModeX is derived as follows:
    - If one or more of the following conditions are true, candIntraPredModeX is set equal to INTRA_PLANAR.
      - The variable availableX is equal to FALSE.
      - CuPredMode[ xNbX ][ yNbX] is not equal to MODE_INTRA.
      - X is equal to B and yCb −1 is less than ( ( yCb >> CtbLog2SizeY ) << CtbLog2SizeY ).
    - Otherwise, candIntraPredModeX is set equal to IntraPredModeY[ xNbX ][ yNbX ].
3. The candModeList[ x ] with x = 0..5 is derived as follows:
  - candModeList[ 0 ] = candIntraPredModeA (8-1)
    candModeList[ 1 ] = ! candIntraPredModeA (8-2)
    candModeList[ 2 ] = INTRA_ANGULAR50 (8-3)
    candModeList[ 3 ] = INTRA_ANGULAR18 (8-4)
    candModeList[ 4 ] = INTRA_ANGULAR46 (8-5)
    candModeList[ 5 ] = INTRA_ANGULAR54 (8-6)
  - If candIntraPredModeB is equal to candIntraPredModeA, the following applies:
  - If candIntraPredModeA is larger than 1, candModeList[ x ] with x = 0..5 is derived as follows:
      candModeList[ 0 ] = candIntraPredModeA (8 7)
      candModeList[ 1 ] = INTRA_PLANAR (8-8)
      candModeList[ 2 ] = INTRA_DC (8-9)
      candModeList[ 3 ] = 2 + ( ( candIntraPredModeA + 62 ) % 65 ) (8-10)
      candModeList[ 4 ] = 2 + ( ( candIntraPredModeA − 1 ) % 65 ) (8-11)
      candModeList[ 5 ] = 2 + ( ( candIntraPredModeA + 61 ) % 65 ) (8-12)
  - Otherwise (candIntraPredModeB is not equal to candIntraPredModeA), the following applies:
    - candModeList[ 0 ] and candModeList[ 1 ] are derived as follows:
      candModeList[ 0 ] = candIntraPredModeA
      (8-13)
      candModeList[ 1 ] = candIntraPredModeB
      (8-14)
    - Set the variable biggerIdx is as follows
      biggerIdx = candModeList[ 0 ] > candModeList[ 1 ] ? 0 : 1 (8-15)
    - If both of candIntraPredModeA and candIntraPredModeB are larger than 1, candModeList[ x ] with x =2..5 is derived as follows:
      candModeList[ 2 ] = INTRA_PLANAR (8-16)
      candModeList[ 3 ] = INTRA_DC (8-17)
      - If candModeList[biggerIdx] - candModeList[ !biggerIdx] is equal to neither 64 nor 1, the following applies:
        candModeList[ 4 ] =2 + ( ( candModeList[biggerIdx] + 62 ) % 65 ) (8-18)
        candModeList[ 5 ] =2 + ( ( candModeList[biggerIdx] − 1 ) % 65 ) (8-19)
      - Otherwise, the following applies:
        candModeList[ 4 ] =2 + ( ( candModeList[biggerIdx] + 61) % 65 ) (8-20)
        candModeList[ 5 ] =2 + ( candModeList[biggerIdx] % 65 ) (8-21)
    - Otherwise, if sum of candIntraPredModeA and candIntraPredModeB is larger or equal to 2, the following applies:
      candModeList[ 2 ] = ! candModeList[ ! biggerIdx] (8-22)
      candModeList[ 3 ] = 2 + ( ( candModeList[biggerIdx] + 62 ) % 65 ) (8-23)
      candModeList[ 4 ] = 2 + ( ( candModeList[biggerIdx] − 1 ) % 65 ) (8-24)
      candModeList[ 5 ] = 2 + ( ( candModeList[biggerIdx] + 61) % 65) (8-25)
4. IntraPredModeY[ xCb ][ yCb ] is derived by applying the following procedure:
  - If intra_luma_mpm_flag[ xCb ][ yCb ] is equal to 1, the IntraPredModeY[ xCb ][ yCb ] is set equal to candModeList[ intra_luma_mpm_idx[ xCb ][ yCb ] ].
  - Otherwise, IntraPredModeY[ xCb ][ yCb ] is derived by applying the following ordered steps:
    1. The array candModeList[ x ], x = 0..5 is modified by the following ordered steps:
      i. For i sequentially equals to 0 to 4, inclusive, apply:
        ii. For j sequentially equals to i + 1 to 5, inclusive, compare candModeList[ i ] to candModeList[ j ], When candModeList[ i ] is greater than candModeList[ j ], both values are swapped as follows:
          ( candModeList[ i ], candModeList[ j ] ) = Swap( candModeList[ i ], candModeList[ j ]) (8-26)
    2. IntraPredModeY[ xCb ][ yCb ] is derived by the following ordered steps:
      i. IntraPredModeY[ xCb ][ yCb ] is set equal to intra_luma_mpm_remainder[ xCb ][ yCb ].
      ii. For i equal to 0 to 5, inclusive, when IntraPredModeY[ xCb ][ yCb ] is greater than or equal to candModeList[ i ], the value of IntraPredModeY[ xCb ][ yCb ] is incremented by one.
The variable IntraPredModeY[ x ][ y ] with x = xCb..xCb + cbWidth − 1 and y = yCb..yCb + cbHeight − 1 is set to be equal to IntraPredModeY[ xCb ][ VCb ].

described below is satisfied), the candidate intra prediction mode A may be set to a planar intra prediction mode.

Neighboring block A is not available.

Intra prediction is not applied to the neighboring block A.

Here, the neighboring block A may be a left neighboring block of the current block. The left neighboring block may be a left neighboring block located at the lowermost side among left neighboring blocks adjacent to the current block. For example, if the size of the current block is cbWidth×cbHeight, x component of the top-left sample position of the current position is xCb, and y component thereof is yCb, the neighboring block A may be a block including a sample at the coordinates of (xCb−1, yCb+cbHeight−1). Meanwhile, the neighboring block A may represent the neighboring block D.

If none of the conditions is true (namely, if none of the conditions is satisfied), the candidate intra prediction mode A may be set to the intra prediction mode of the neighboring block A.

Also, for example, if at least one among the conditions described below is true (namely, if at least one among the conditions described below is satisfied), the candidate intra prediction mode B may be set to a planar intra prediction mode.

Neighboring block B is not available.

Intra prediction is not applied to the neighboring block B.

yCb−1 is smaller than ((yCb>>Ctb Log 2SizeY)<<Ctb Log 2SizeY).

Here, the neighboring block B may be an upper neighboring block of the current block. The upper neighboring block may be an upper neighboring block located at the rightmost side among upper neighboring blocks adjacent to the current block. For example, if the size of the current block is cbWidth×cbHeight, x component of the top-left sample position of the current block is xCb, and y component thereof is yCb, the neighboring block B may be a block including a sample at the coordinates of (xCb+cbWidth−1, yCb−1). Meanwhile, the Ctb Log 2SizeY may represent the size of a current CTU, and ((yCb>>Ctb Log 2SizeY)<<Ctb Log 2SizeY) may represent the coordinates of an upper boundary of the current CTU. In other words, if yCb−1 is smaller than ((yCb>>Ctb Log 2SizeY)<<Ctb Log 2SizeY), it may indicate the case where the neighboring block B leaves the range of the current CTU. In other words, the conditions described above may represent a case where the neighboring block leaves the range of the current CTU.

If none of the conditions is true (namely, if none of the conditions is satisfied), the candidate intra prediction mode B may be set to an intra prediction mode of the neighboring block B.

If the candidate intra prediction modes are derived, the MPM list of the current block may be constructed as in the first MPM list. The first MPM list may include a first MPM candidate representing the candidate intra prediction mode A, a second MPM candidate representing the intra prediction mode having a value obtained by applying the logical NOT operator to the candidate intra prediction mode A, a third MPM candidate representing intra prediction mode 50, a fourth MPM candidate representing intra prediction mode 18, a fifth MPM candidate representing intra prediction mode 46, and a sixth MPM candidate representing intra prediction mode 54.

Afterwards, whether the candidate intra prediction mode B is the same as the candidate intra prediction mode A may be determined.

If the candidate intra prediction mode B is the same as the candidate intra prediction mode A, it may be determined whether the candidate intra prediction mode A is larger than 1.

If the candidate intra prediction mode A is larger than 1, the MPM list of the current block may be constructed like the second MPM list. The second MPM list may include a first MPM candidate representing the candidate intra prediction mode A, a second MPM candidate representing a planar intra prediction mode, a third MPM candidate representing a DC intra prediction mode, a fourth MPM candidate representing an intra prediction mode derived as 2+((candIntraPredModeA+62)% 65), a fifth MPM candidate representing an intra prediction mode derived as 2+((candIntraPredModeA−1)% 65), and a sixth MPM candidate representing an intra prediction mode derived as 2+((candIntraPredModeA+61)% 65).

Meanwhile, if the candidate intra prediction mode B is not the same as the candidate intra prediction mode A, the first MPM candidate and the second MPM candidate of the current block may be derived first, and the first MPM candidate may be derived as the candidate intra prediction mode A while the second MPM candidate may be derived as the candidate intra prediction mode B.

Afterwards, biggerIdx may be configured. Referring to Table 24, if the first MPM candidate is larger than the second MPM candidate, the biggerIdx may be derived as 0, and if the first MPM candidate is not larger than the second MPM candidate, the biggerIdx may be derived as 1.

Next, it may be determined whether the candidate intra prediction mode A and the candidate intra prediction mode B are larger than 1 (namely, it may be determined whether the mode number of the candidate intra prediction mode A and the mode number of the candidate intra prediction mode B are larger than 1).

If the candidate intra prediction mode A and the candidate intra prediction mode B are larger than 1, the third MPM candidate and the fourth MPM candidate of the current block may be derived, where the third MPM candidate may be derived as a planar intra prediction mode, and the fourth MPM candidate may be derived as a DC intra prediction mode.

Next, it may be determined whether a difference (diff) between an MPM candidate indicated by an MPM index having the biggerIdx value and an MPM candidate indicated by an MPM index having a value obtained by applying the logical NOT operator to the biggerIdx (namely, !biggerIdx) is 1 or 64.

If the difference is 1 or 64, the fifth MPM candidate and the sixth MPM candidate of the current block may be derived, where the fifth MPM candidate may be derived as an intra prediction mode indicated by 2+((candModeList[biggerIdx]+62)% 65), and the sixth MPM candidate may be derived as an intra prediction mode indicated by 2+((candModeList[biggerIdx]−1)% 65).

Or, if the difference is not 1 and is not 64, the fifth MPM candidate and the sixth MPM candidate of the current block may be derived, where the fifth MPM candidate may be derived as an intra prediction mode indicated by 2+((candModeList[biggerIdx]+61)% 65), and the sixth MPM candidate may be derived as an intra prediction mode indicated by 2+(candModeList[biggerIdx] % 65).

Meanwhile, if a sum of the candidate intra prediction mode A and the candidate intra prediction mode B is larger than or equal to 2, the third MPM candidate, the fourth MPM candidate, the fifth MPM candidate, and the sixth MPM candidate of the current block may be derived; the third MPM candidate may be derived as an intra prediction mode having a value obtained by applying the logical NOT operator to the MPM candidate indicated by the MPM index having the value obtained by applying the logical NOT operator (namely, !biggerIdx) to the biggerIdx; the fourth MPM candidate may be derived as an intra prediction mode indicated by 2+((candModeList[biggerIdx]+62)% 65); the fifth MPM candidate may be derived as an intra prediction mode indicated by 2+((candModeList[biggerIdx]−1)% 65); and the sixth MPM candidate may be derived as an intra prediction mode indicated by 2+((candModeList[biggerIdx]+61)% 65).

Figure 22:
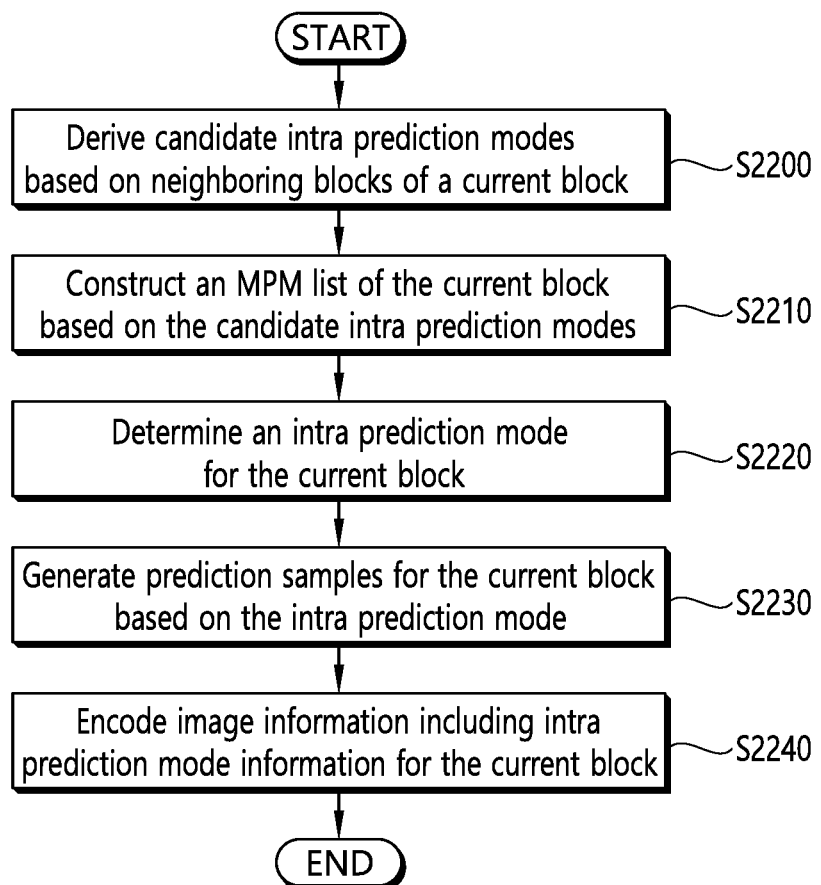
FIG. 22 illustrates an image encoding method performed by an encoding apparatus according to the present disclosure.

FIG. 22 illustrates an image encoding method performed by an encoding apparatus according to the present disclosure. The method disclosed in FIG. 22 may be performed by the encoding apparatus disclosed in FIG. 2. More specifically, for example, the S2200 to S2230 steps of FIG. 22 may be performed by the predictor of the encoding apparatus, and the S2240 step may be performed by the entropy encoder of the encoding apparatus. Also, although not shown in the figure, a process for deriving residual samples for the current block based on original samples and prediction samples of the current block may be performed by the subtractor of the encoding apparatus; a process for generating information about residuals for the current block based on the residual samples may be performed by the transformer of the encoding apparatus; and a process for encoding image information including information about the residuals may be performed by the entropy encoder of the encoding apparatus.

The encoding apparatus derives candidate intra prediction modes based on neighboring blocks of a current block S2200. The encoding apparatus may derive candidate intra prediction modes based on the neighboring blocks of the current block. Here, the neighboring blocks may include a first neighboring block and a second neighboring block of the current block, and the candidate intra prediction modes may include a first candidate intra prediction mode and a second candidate intra prediction mode. Also, for example, the first neighboring block may be a left neighboring block located at the lowermost side among neighboring blocks adjacent to the left boundary of the current block, and the second neighboring block may be an upper neighboring block located at the rightmost side among neighboring blocks adjacent to the upper boundary of the current block. If the size of the current block is W×H, x component of the top-left sample position of the current block is xN, and y component thereof is yN, the first neighboring block may be a block containing a sample at the coordinates of (xN−1, H+yN−1), and the second neighboring block may be a block containing a sample at the coordinates of (W+xN−1, yN−1).

As one example, the first candidate intra prediction mode may be derived based on the first neighboring block, and the second candidate intra prediction mode may be derived based on the second neighboring block. In other words, the candidate intra prediction modes may be derived based on the first neighboring block and the second neighboring block.

For example, if the first neighboring block is available, and intra prediction is applied to the first neighboring block, the first candidate intra prediction mode may be derived as an intra prediction mode of the first neighboring block, and if the first neighboring block is unavailable, or the intra prediction is not applied to the first neighboring block, the first candidate intra prediction mode may be derived as a planar intra prediction mode.

Also, for example, if the second neighboring block is available, intra prediction is applied to the second neighboring block, and a current CTU contains the second neighboring block, the second candidate intra prediction mode may be derived as an intra prediction mode of the second neighboring block, and if the second neighboring block is unavailable, the intra prediction is not applied to the second neighboring block, or the current CTU does not contain the second neighboring block, the second candidate intra prediction mode may be derived as a planar intra prediction mode.

The encoding apparatus constructs a Most Probable Mode (MPM) list of the current block based on the candidate intra prediction modes S2210. The encoding apparatus may construct the MPM list of the current block based on the candidate intra prediction modes.

For example, the encoding apparatus may determine whether the first candidate intra prediction mode is the same as the second candidate intra prediction mode.

If the first candidate intra prediction mode is the same as the second candidate intra prediction mode, the encoding apparatus may determine whether the mode number of the first candidate intra prediction mode is larger than the mode number of a DC intra prediction mode.

If the mode number of the first intra prediction mode is larger than the mode number of the DC intra prediction mode, the encoding apparatus may derive the MPM list of the current block as a first MPM list. Here, for example, the first MPM list may include 6 MPM candidates. The MPM candidates may include a first MPM candidate, a second MPM candidate, a third MPM candidate, a fourth MPM candidate, a fifth MPM candidate, and a sixth MPM candidate. The first MPM list may include the MPM candidates in the order of the first, the second, the third, the fourth, the fifth, and the sixth MPM candidate. In other words, the first MPM candidate may represent an MPM candidate indicated by an MPM index of 0, the second MPM candidate may represent an MPM candidate indicated by an MPM index of 1, the third MPM candidate may represent an MPM candidate indicated by an MPM index of 2, the fourth MPM candidate may represent an MPM candidate indicated by an MPM index of 3, the fifth MPM candidate may represent an MPM candidate indicated by an MPM index of 4, and the sixth MPM candidate may represent an MPM candidate indicated by an MPM index of 5.

Here, for example, the first MPM candidate may be derived as the first candidate intra prediction mode, the second MPM candidate may be derived as an intra prediction mode indicated by a value obtained by subtracting 1 from the mode number of the first candidate intra prediction mode according to modular arithmetic, the third MPM candidate may be derived as an intra prediction mode indicated by a value obtained by adding 1 to the mode number of the first candidate intra prediction mode according to modular arithmetic, the fourth MPM candidate may be derived as an intra prediction mode indicated by a value obtained by subtracting 2 from the mode number of the first intra prediction mode according to modular arithmetic, the fifth MPM candidate may be derived as a planar intra prediction mode, and the sixth MPM candidate may be derived as a DC intra prediction mode.

Or, for example, the first MPM candidate may be derived as the first candidate intra prediction mode, the second MPM candidate may be derived as a planar intra prediction mode, the third MPM candidate may be derived as a DC intra prediction mode, the fourth MPM candidate may be derived as an intra prediction mode indicated by a value obtained by subtracting 1 from the mode number of the first candidate intra prediction mode according to modular arithmetic, the fifth MPM candidate may be derived as an intra prediction mode indicated by a value obtained by adding 1 to the mode number of the first candidate intra prediction mode according to modular arithmetic, and the sixth MPM candidate may be derived as an intra prediction mode indicated by a value obtained by subtracting 2 from the mode number of the first intra prediction mode according to modular arithmetic.

Also, if the mode number of the first intra prediction mode is not larger than the mode number of the DC intra prediction mode, the encoding apparatus may derive the MPM list of the current block as a second MPM list. Here, for example, the second MPM list may include 6 MPM candidates. The MPM candidates may include a first MPM candidate, a second MPM candidate, a third MPM candidate, a fourth MPM candidate, a fifth MPM candidate, and a sixth MPM candidate. The second MPM list may include the MPM candidates in the order of the first, the second, the third, the fourth, the fifth, and the sixth MPM candidate. In other words, the first MPM candidate may represent an MPM candidate indicated by an MPM index of 0, the second MPM candidate may represent an MPM candidate indicated by an MPM index of 1, the third MPM candidate may represent an MPM candidate indicated by an MPM index of 2, the fourth MPM candidate may represent an MPM candidate indicated by an MPM index of 3, the fifth MPM candidate may represent an MPM candidate indicated by an MPM index of 4, and the sixth MPM candidate may represent an MPM candidate indicated by an MPM index of 5.

Here, for example, the first MPM candidate may be derived as a planar intra prediction mode, the second MPM candidate may be derived as a DC intra prediction mode, the third MPM candidate may be derived as a vertical intra prediction mode (namely, intra prediction mode 50), the fourth MPM candidate may be derived as a horizontal intra prediction mode (namely, intra prediction mode 18), the fifth MPM candidate may be derived as a horizontal diagonal intra prediction mode (namely, intra prediction mode 46), and the sixth MPM candidate may be derived as a vertical diagonal intra prediction mode (namely, intra prediction mode 54).

Meanwhile, if the first candidate intra prediction mode is not the same as the second candidate intra prediction mode, the encoding apparatus may derive the MPM list based on whether the mode number of the first candidate intra prediction mode and the mode number of the second candidate intra prediction mode are larger than the mode number of the DC intra prediction mode. Also, if the first candidate intra prediction mode is not the same as the second candidate intra prediction mode, the largest candidate intra prediction mode and the smallest candidate intra prediction mode may be derived among the candidate intra prediction modes. Among the candidate intra prediction modes, a candidate intra prediction mode having a large mode number may be derived as the largest candidate intra prediction mode while a candidate intra prediction mode having a small mode number may be derived as the smallest candidate intra prediction mode. Also, if the first candidate intra prediction mode is not the same as the second candidate intra prediction mode, the first MPM candidate of the MPM list may be derived as the first candidate intra prediction mode, and the second MPM candidate of the MPM list may be derived as the second candidate intra prediction mode. The remaining MPM candidates of the MPM list may be derived based on whether the mode number of the first candidate intra prediction mode and the mode number of the second candidate intra prediction mode are larger than the mode number of the DC intra prediction mode.

Also, for example, if the mode number of the first candidate intra prediction mode and the mode number of the second candidate intra prediction mode are larger than the mode number of the DC intra prediction mode, the third MPM candidate of the MPM list may be derived as the planar intra prediction mode, the fourth MPM candidate of the MPM list may be derived as the DC intra prediction mode, and the fifth MPM candidate and the sixth MPM candidate of the MPM list may be derived based on a difference between the mode number of the largest candidate intra prediction mode and the mode number of the smallest candidate intra prediction mode. If a difference between the mode number of the largest candidate intra prediction mode and the mode number of the smallest candidate intra prediction mode is not 1 and is not 64, the fifth MPM candidate of the MPM list may be derived as an intra prediction mode indicated by a value obtained by subtracting 1 from the mode number of the first candidate intra prediction mode according to modular arithmetic, and the sixth MPM candidate of the MPM list may be derived as an intra prediction mode indicated by a value obtained by adding 1 to the mode number of the first candidate intra prediction mode according to modular arithmetic. Also, if a difference between the mode number of the largest candidate intra prediction mode and the mode number of the smallest candidate intra prediction mode is 1 or 64, the fifth MPM candidate of the MPM list may be derived as an intra prediction mode indicated by a value obtained by subtracting 2 from the mode number of the first candidate intra prediction mode according to modular arithmetic, and the sixth MPM candidate of the MPM list may be derived as an intra prediction mode indicated by a value obtained by adding 2 to the mode number of the first candidate intra prediction mode according to modular arithmetic.

Also, for example, if one of the mode number of the first candidate intra prediction mode and the mode number of the second candidate intra prediction mode is larger than the mode number of the DC intra prediction mode, the third MPM candidate of the MPM list may be derived as an intra prediction mode indicated by a value obtained by applying the logical NOT operator to the smallest candidate intra prediction mode, the fourth MPM candidate of the MPM list may be derived as the vertical intra prediction mode (namely, intra prediction mode 50), the fifth MPM candidate of the MPM list may be derived as an intra prediction mode indicated by a value obtained by subtracting 4 from the mode number of the vertical intra prediction mode, and the sixth MPM candidate of the MPM list may be derived as an intra prediction mode indicated by a value obtained by adding 4 to the mode number of the vertical intra prediction mode.

Also, for example, if the mode number of the first candidate intra prediction mode and the mode number of the second candidate intra prediction mode are not larger than the mode number of the DC intra prediction mode, the encoding apparatus may derive the MPM list of the current block as a second MPM list. Here, for example, the second MPM list may include 6 MPM candidates. For example, the first MPM candidate may be derived as a planar intra prediction mode, the second MPM candidate may be derived as a DC intra prediction mode, the third MPM candidate may be derived as the vertical intra prediction mode (namely, intra prediction mode 50), the fourth MPM candidate may be derived as the horizontal intra prediction mode (namely, intra prediction mode 18), the fifth MPM candidate may be derived as the horizontal diagonal intra prediction mode (namely, intra prediction mode 46), and the sixth MPM candidate may be derived as the vertical diagonal intra prediction mode (namely, intra prediction mode 54).

Meanwhile, the MPM candidates may include a first MPM candidate, a second MPM candidate, a third MPM candidate, a fourth MPM candidate, a fifth MPM candidate, and a sixth MPM candidate. The first MPM list may include the MPM candidates in the order of the first, the second, the third, the fourth, the fifth, and the sixth MPM candidate. In other words, the first MPM candidate may represent an MPM candidate indicated by an MPM index of 0, the second MPM candidate may represent an MPM candidate indicated by an MPM index of 1, the third MPM candidate may represent an MPM candidate indicated by an MPM index of 2, the fourth MPM candidate may represent an MPM candidate indicated by an MPM index of 3, the fifth MPM candidate may represent an MPM candidate indicated by an MPM index of 4, and the sixth MPM candidate may represent an MPM candidate indicated by an MPM index of 5.

The encoding apparatus determines an intra prediction mode for the current block S2220. The encoding apparatus may derive an intra prediction mode having the optimal RD costs as an intra prediction mode for the current block by performing various intra prediction modes. The intra prediction mode may be one of two non-directional intra prediction modes and 65 directional intra prediction modes. As described above, the two non-directional intra prediction modes include the intra DC mode and the intra planar mode.

The encoding apparatus may generate an MPM flag indicating whether the determined intra prediction mode is included in the MPM candidates of the MPM list. If the determined intra prediction mode is included in the MPM candidates of the MPM list, the encoding apparatus may generate an MPM index indicating the determined intra prediction mode among the MPM candidates. If the determined intra prediction mode is not included in the MPM candidates of the MPM list, the encoding apparatus may generate remaining intra prediction mode information indicating the determined intra prediction mode among the remaining intra prediction modes not included in the MPM candidates. Meanwhile, the determined intra prediction mode is included in the MPM candidates of the MPM list, the encoding apparatus may not signal the MPM flag, and the value of the MPM flag may be derived as 1. The intra prediction mode information for the current block may include the MPM flag, the MPM index and/or the remaining intra prediction mode information.

The encoding apparatus generates a prediction sample for the current block based on the intra prediction mode S2230. The encoding apparatus may derive, based on the intra prediction mode, at least one neighboring sample among neighboring samples of the current block and based on the neighboring sample, generate the prediction sample. The neighboring samples may include a top-left corner neighboring sample, upper neighboring samples, and left neighboring samples of the current block. For example, if the size of the current block is W×H, x component of the top-left sample position of the current block is xN, and y component thereof is yN, the left neighboring samples may be p[xN−1][yN] to p[xN−1][2H+yN−1], the top-left corner neighboring sample may be p[xN−1][yN−1], the upper neighboring samples may be p[xN][yN−1] to p[2 W+xN−1][yN−1].

The encoding apparatus encodes image information including intra prediction mode information for the current block S2240. The encoding apparatus may encode image information including the intra prediction mode information for the current block and output the encoded image information in the form of a bitstream. The intra prediction mode information may include the MPM flag, the MPM index and/or the remaining intra prediction mode information. Also, although not shown in the figure, the encoding apparatus may derive residual samples for the current block based on original samples and prediction samples of the current block, generate information about residuals for the current block based on the residual samples, encode image information including information about the residuals, and output the encoded image information in the form of a bitstream. Meanwhile, the bitstream may be transmitted to the decoding apparatus via a network or a (digital) storage medium. Here, the network may include a broadcast network and/or communication network, and the digital storage medium may include various types of storage media such as USB, SD, CD, DVD, Bluray, HDD, and SSD.

Figure 23:
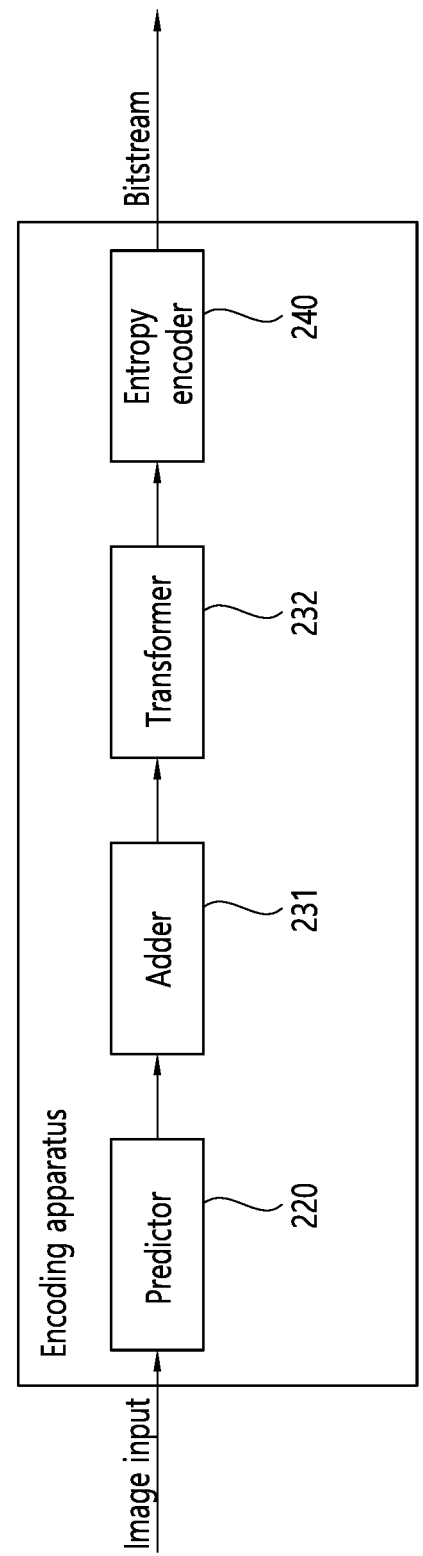
FIG. 23 illustrates an encoding apparatus performing an image encoding method according to the present disclosure.

FIG. 23 illustrates an encoding apparatus performing an image encoding method according to the present disclosure. The method disclosed in FIG. 22 may be performed by the encoding apparatus disclosed in FIG. 23. More specifically, the predictor of the encoding apparatus of FIG. 23 may perform the S2200 to S2230 steps of FIG. 22, and the entropy encoder of the encoding apparatus of FIG. 23 may perform the S2240 step of FIG. 22. Also, although not shown in the figure, a process for deriving residual samples for the current block based on original samples and prediction samples of the current block may be performed by the subtractor of the encoding apparatus of FIG. 23; a process for generating information about residuals for the current block based on the residual samples may be performed by the transformer of the encoding apparatus of FIG. 23; and a process for encoding image information including information about the residuals may be performed by the entropy encoder of the encoding apparatus of FIG. 23.

Figure 24:
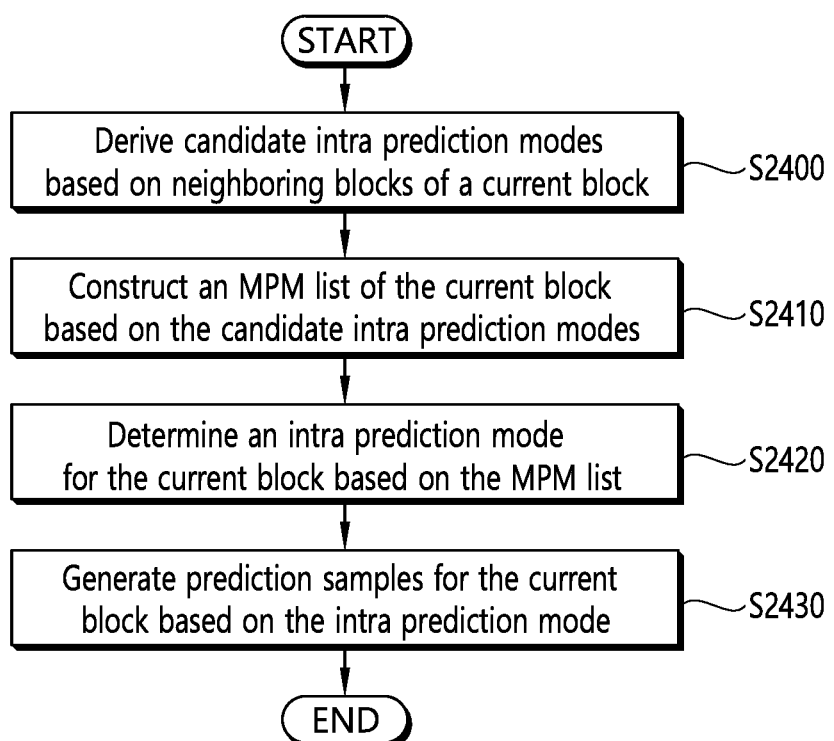
FIG. 24 illustrates an image decoding method performed by an image decoding apparatus according to the present disclosure.

FIG. 24 illustrates an image decoding method performed by an image decoding apparatus according to the present disclosure. The method disclosed in FIG. 24 may be performed by the decoding apparatus disclosed in FIG. 3. More specifically, the S2400 to S2430 steps of FIG. 24 may be performed by the predictor of the decoding apparatus. Also, although not shown in the figure, a process for obtaining intra prediction mode information and image information including residuals for the current block through a bitstream may be performed by the entropy decoder of the decoding apparatus, a process for deriving the residual samples for the current block based on the residual information may be performed by the inverse transformer of the decoding apparatus, and a process for generating a reconstructed picture based on the prediction samples and the residual samples may be performed by the adder of the decoding apparatus.

The decoding apparatus may derive candidate intra prediction modes based on neighboring blocks of a current block S2400. The decoding apparatus may derive candidate intra prediction modes based on the neighboring blocks of the current block. Here, the neighboring block may include a first neighboring block and a second neighboring block of the current block; and the candidate intra prediction modes may include a first candidate intra prediction mode and a second candidate intra prediction mode. Also, for example, the first neighboring block may be a left neighboring block located at the lowermost side among neighboring blocks adjacent to a left boundary of the current block, and the second neighboring block may be an upper neighboring block located at the rightmost side among neighboring blocks adjacent to an upper boundary of the current block. If the size of the current block is W×H, x component of the top-left sample position of the current block is xN, and y component thereof is yN, the first neighboring block may be block including a sample at the coordinates of (xN−1, H+yN−1), and the second neighboring block may be a block including a sample at the coordinates of (W+xN−1, yN−1).

As one example, the first candidate intra prediction mode may be derived based on the first neighboring block, and the second candidate intra prediction mode may be derived based on the second neighboring block. In other words, the candidate intra prediction modes may be derived based only on the first neighboring block and the second neighboring block.

For example, if the first neighboring block is available, and intra prediction is applied to the first neighboring block, the first candidate intra prediction mode may be derived as an intra prediction mode of the first neighboring block, and if the first neighboring block is unavailable, or the intra prediction is not applied to the first neighboring block, the first candidate intra prediction mode may be derived as a planar intra prediction mode.

Also, for example, if the second neighboring block is available, intra prediction is applied to the second neighboring block, and a current CTU contains the second neighboring block, the second candidate intra prediction mode may be derived as an intra prediction mode of the second neighboring block, and if the second neighboring block is unavailable, the intra prediction is not applied to the second neighboring block, or the current CTU does not contain the second neighboring block, the second candidate intra prediction mode may be derived as a planar intra prediction mode.

The decoding apparatus constructs a Most Probable Mode (MPM) list of the current block based on the candidate intra prediction modes S2410. The decoding apparatus may construct the MPM list of the current block based on the candidate intra prediction modes.

For example, the decoding apparatus may determine whether the first candidate intra prediction mode is the same as the second candidate intra prediction mode.

If the first candidate intra prediction mode is the same as the second candidate intra prediction mode, the decoding apparatus may determine whether the mode number of the first intra prediction mode is larger than the mode number of a DC intra prediction mode.

If the mode number of the first intra prediction mode is larger than the mode number of the DC intra prediction mode, the decoding apparatus may derive the MPM list of the current block as a first MPM list. Here, for example, the first MPM list may include 6 MPM candidates. The MPM candidates may include a first MPM candidate, a second MPM candidate, a third MPM candidate, a fourth MPM candidate, a fifth MPM candidate, and a sixth MPM candidate. The first MPM list may include the MPM candidates in the order of the first, the second, the third, the fourth, the fifth, and the sixth MPM candidate. In other words, the first MPM candidate may represent an MPM candidate indicated by an MPM index of 0, the second MPM candidate may represent an MPM candidate indicated by an MPM index of 1, the third MPM candidate may represent an MPM candidate indicated by an MPM index of 2, the fourth MPM candidate may represent an MPM candidate indicated by an MPM index of 3, the fifth MPM candidate may represent an MPM candidate indicated by an MPM index of 4, and the sixth MPM candidate may represent an MPM candidate indicated by an MPM index of 5.

Here, for example, the first MPM candidate may be derived as the first candidate intra prediction mode, the second MPM candidate may be derived as an intra prediction mode indicated by a value obtained by subtracting 1 from the mode number of the first candidate intra prediction mode according to modular arithmetic, the third MPM candidate may be derived as an intra prediction mode indicated by a value obtained by adding 1 to the mode number of the first candidate intra prediction mode according to modular arithmetic, the fourth MPM candidate may be derived as an intra prediction mode indicated by a value obtained by subtracting 2 from the mode number of the first intra prediction mode according to modular arithmetic, the fifth MPM candidate may be derived as a planar intra prediction mode, and the sixth MPM candidate may be derived as a DC intra prediction mode.

Or, for example, the first MPM candidate may be derived as the first candidate intra prediction mode, the second MPM candidate may be derived as a planar intra prediction mode, the third MPM candidate may be derived as a DC intra prediction mode, the fourth MPM candidate may be derived as an intra prediction mode indicated by a value obtained by subtracting 1 from the mode number of the first candidate intra prediction mode according to modular arithmetic, the fifth MPM candidate may be derived as an intra prediction mode indicated by a value obtained by adding 1 to the mode number of the first candidate intra prediction mode according to modular arithmetic, and the sixth MPM candidate may be derived as an intra prediction mode indicated by a value obtained by subtracting 2 from the mode number of the first intra prediction mode according to modular arithmetic.

Also, if the mode number of the first intra prediction mode is not larger than the mode number of the DC intra prediction mode, the decoding apparatus may derive the MPM list of the current block as a second MPM list. Here, for example, the second MPM list may include 6 MPM candidates. The MPM candidates may include a first MPM candidate, a second MPM candidate, a third MPM candidate, a fourth MPM candidate, a fifth MPM candidate, and a sixth MPM candidate. The second MPM list may include the MPM candidates in the order of the first, the second, the third, the fourth, the fifth, and the sixth MPM candidate. In other words, the first MPM candidate may represent an MPM candidate indicated by an MPM index of 0, the second MPM candidate may represent an MPM candidate indicated by an MPM index of 1, the third MPM candidate may represent an MPM candidate indicated by an MPM index of 2, the fourth MPM candidate may represent an MPM candidate indicated by an MPM index of 3, the fifth MPM candidate may represent an MPM candidate indicated by an MPM index of 4, and the sixth MPM candidate may represent an MPM candidate indicated by an MPM index of 5.

Here, for example, the first MPM candidate may be derived as a planar intra prediction mode, the second MPM candidate may be derived as a DC intra prediction mode, the third MPM candidate may be derived as a vertical intra prediction mode (namely, intra prediction mode 50), the fourth MPM candidate may be derived as a horizontal intra prediction mode (namely, intra prediction mode 18), the fifth MPM candidate may be derived as a horizontal diagonal intra prediction mode (namely, intra prediction mode 46), and the sixth MPM candidate may be derived as a vertical diagonal intra prediction mode (namely, intra prediction mode 54).

Meanwhile, if the first candidate intra prediction mode is not the same as the second candidate intra prediction mode, the decoding apparatus may derive the MPM list based on whether the mode number of the first candidate intra prediction mode and the mode number of the second candidate intra prediction mode are larger than the mode number of the DC intra prediction mode. Also, if the first candidate intra prediction mode is not the same as the second candidate intra prediction mode, the largest candidate intra prediction mode and the smallest candidate intra prediction mode may be derived among the candidate intra prediction modes. Among the candidate intra prediction modes, a candidate intra prediction mode having a large mode number may be derived as the largest candidate intra prediction mode while a candidate intra prediction mode having a small mode number may be derived as the smallest candidate intra prediction mode. Also, if the first candidate intra prediction mode is not the same as the second candidate intra prediction mode, the first MPM candidate of the MPM list may be derived as the first candidate intra prediction mode, and the second MPM candidate of the MPM list may be derived as the second candidate intra prediction mode. The remaining MPM candidates of the MPM list may be derived based on whether the mode number of the first candidate intra prediction mode and the mode number of the second candidate intra prediction mode are larger than the mode number of the DC intra prediction mode.

Also, for example, if the mode number of the first candidate intra prediction mode and the mode number of the second candidate intra prediction mode are larger than the mode number of the DC intra prediction mode, the third MPM candidate of the MPM list may be derived as the planar intra prediction mode, the fourth MPM candidate of the MPM list may be derived as the DC intra prediction mode, and the fifth MPM candidate and the sixth MPM candidate of the MPM list may be derived based on a difference between the mode number of the largest candidate intra prediction mode and the mode number of the smallest candidate intra prediction mode. If a difference between the mode number of the largest candidate intra prediction mode and the mode number of the smallest candidate intra prediction mode is not 1 and is not 64, the fifth MPM candidate of the MPM list may be derived as an intra prediction mode indicated by a value obtained by subtracting 1 from the mode number of the first candidate intra prediction mode according to modular arithmetic, and the sixth MPM candidate of the MPM list may be derived as an intra prediction mode indicated by a value obtained by adding 1 to the mode number of the first candidate intra prediction mode according to modular arithmetic. Also, if a difference between the mode number of the largest candidate intra prediction mode and the mode number of the smallest candidate intra prediction mode is 1 or 64, the fifth MPM candidate of the MPM list may be derived as an intra prediction mode indicated by a value obtained by subtracting 2 from the mode number of the first candidate intra prediction mode according to modular arithmetic, and the sixth MPM candidate of the MPM list may be derived as an intra prediction mode indicated by a value obtained by adding 2 to the mode number of the first candidate intra prediction mode according to modular arithmetic.

Also, for example, if one of the mode number of the first candidate intra prediction mode and the mode number of the second candidate intra prediction mode is larger than the mode number of the DC intra prediction mode, the third MPM candidate of the MPM list may be derived as an intra prediction mode indicated by a value obtained by applying the logical NOT operator to the smallest candidate intra prediction mode, the fourth MPM candidate of the MPM list may be derived as the vertical intra prediction mode (namely, intra prediction mode 50), the fifth MPM candidate of the MPM list may be derived as an intra prediction mode indicated by a value obtained by subtracting 4 from the mode number of the vertical intra prediction mode, and the sixth MPM candidate of the MPM list may be derived as an intra prediction mode indicated by a value obtained by adding 4 to the mode number of the vertical intra prediction mode.

Also, for example, if the mode number of the first candidate intra prediction mode and the mode number of the second candidate intra prediction mode are not larger than the mode number of the DC intra prediction mode, the decoding apparatus may derive the MPM list of the current block as a second MPM list. Here, for example, the second MPM list may include 6 MPM candidates. For example, the first MPM candidate may be derived as a planar intra prediction mode, the second MPM candidate may be derived as a DC intra prediction mode, the third MPM candidate may be derived as the vertical intra prediction mode (namely, intra prediction mode 50), the fourth MPM candidate may be derived as the horizontal intra prediction mode (namely, intra prediction mode 18), the fifth MPM candidate may be derived as the horizontal diagonal intra prediction mode (namely, intra prediction mode 46), and the sixth MPM candidate may be derived as the vertical diagonal intra prediction mode (namely, intra prediction mode 54).

Meanwhile, the MPM candidates may include a first MPM candidate, a second MPM candidate, a third MPM candidate, a fourth MPM candidate, a fifth MPM candidate, and a sixth MPM candidate. The first MPM list may include the MPM candidates in the order of the first, the second, the third, the fourth, the fifth, and the sixth MPM candidate. In other words, the first MPM candidate may represent an MPM candidate indicated by an MPM index of 0, the second MPM candidate may represent an MPM candidate indicated by an MPM index of 1, the third MPM candidate may represent an MPM candidate indicated by an MPM index of 2, the fourth MPM candidate may represent an MPM candidate indicated by an MPM index of 3, the fifth MPM candidate may represent an MPM candidate indicated by an MPM index of 4, and the sixth MPM candidate may represent an MPM candidate indicated by an MPM index of 5.

The decoding apparatus derives an intra prediction mode for the current block based on the MPM list S2420.

As one example, the decoding apparatus may derive an MPM flag for the current block. For example, the decoding apparatus may obtain intra prediction mode information for the current block from a bitstream, where the intra prediction mode information may include the MPM flag for the current block. Or, the intra prediction mode information may not include the MPM flag, and in this case, the decoding apparatus may derive the value of the MPM flag as 1.

If the MPM flag is 1, the decoding apparatus may derive an MPM candidate indicated by an MPM index among MPM candidates of the MPM list as the intra prediction mode for the current block. The intra prediction mode information may include the MPM index. The MPM index may be signaled in the form of mpm_idx or intra_luma_mpm_idx syntax element.

If the MPM flag is not 0, the decoding apparatus may derive an intra prediction mode indicated by remaining intra prediction mode information among the remaining intra prediction modes as the intra prediction mode for the current block. The remaining intra prediction modes may represent the remaining intra prediction modes not included in the MPM candidates. The intra prediction mode information may include the remaining intra prediction mode information. The remaining intra prediction mode information may be signaled in the form of rem_intra_luma_pred_mode or intra_luma_mpm_remainder syntax element.

Here, the neighboring samples may include a top-left corner neighboring sample, upper neighboring samples, and left neighboring samples of the current block. For example, if the size of the current block is W×H, x component of the top-left sample position of the current block is xN, and y component thereof is yN, the left neighboring samples may be p[xN−1][yN] to p[xN−1][2H+yN−1], the top-left corner neighboring sample may be p[xN−1][yN−1], the upper neighboring samples may be p[xN][yN−1] to p[2 W+xN−1][yN−1].

The decoding apparatus generates a prediction sample for the current block based on the intra prediction mode S2430. The decoding apparatus may derive, based on the intra prediction mode, at least one neighboring sample among neighboring samples of the current block and based on the neighboring sample, generate the prediction sample. The neighboring samples may include a top-left corner neighboring sample, upper neighboring samples, and left neighboring samples of the current block. For example, if the size of the current block is W×H, x component of the top-left sample position of the current block is xN, and y component thereof is yN, the left neighboring samples may be p[xN−1][yN] to p[xN−1][2H+yN−1], the top-left corner neighboring sample may be p[xN−1][yN−1], the upper neighboring samples may be p[xN][yN−1] to p[2 W+xN−1][yN−1].

Meanwhile, although not shown in the figure, the decoding apparatus may directly use the prediction samples as reconstructed samples according to a prediction mode or may generate reconstructed samples by adding residual samples to the prediction samples. In the existence of residual samples for the current block, the decoding apparatus may receive information about residuals for the current block, and the information about the residuals may be included in the information about the phase. The information about the residuals may include transform coefficients about the residual samples. The decoding apparatus may derive the residual samples (or a residual sample array) for the current block based on the residual information. The decoding apparatus may generate reconstructed samples based on the prediction samples and the residual samples and derive a reconstructed block or a reconstructed picture based on the reconstructed samples. Afterwards, depending on the needs, the decoding apparatus may apply a deblocking filtering process and/or an in-loop filtering process such as the SAO process to the reconstructed picture to improve subjective/objective image quality as described above.

Figure 25:
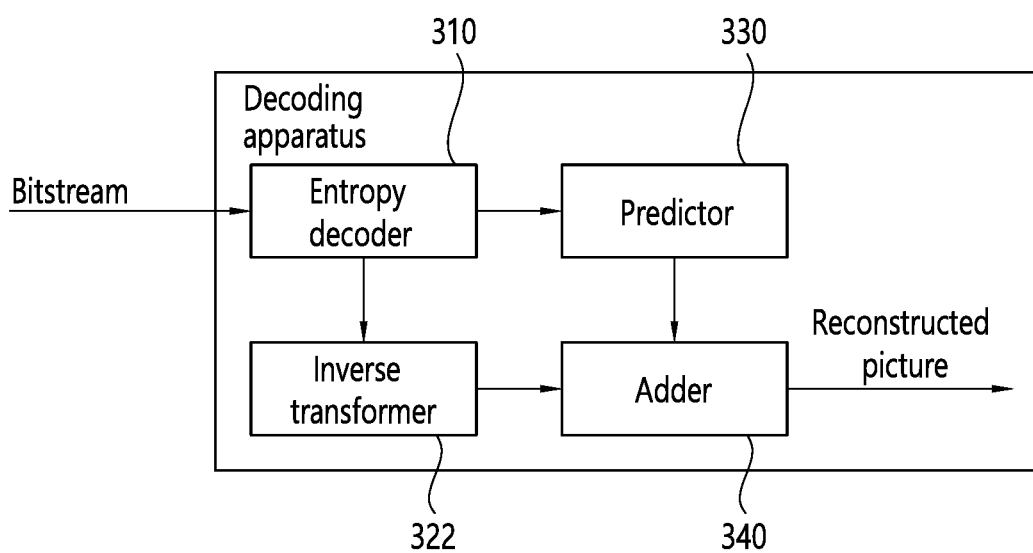
FIG. 25 illustrates a decoding apparatus performing an image decoding method according to the present disclosure.

FIG. 25 illustrates a decoding apparatus performing an image decoding method according to the present disclosure. The method disclosed in FIG. 24 may be performed by the decoding apparatus disclosed in FIG. 25. More specifically, the predictor of the decoding apparatus of FIG. 25 may perform the S2400 to S2430 steps of FIG. 24. Also, although not shown in the figure, a process for obtaining image information including intra prediction mode information and/or information about residuals for the current block through a bitstream may be performed by the entropy decoder of the decoding apparatus of FIG. 25, a process for deriving the residual samples for the current block based on the residual information may be performed by the inverse transformer of the decoding apparatus of FIG. 25, and a process for generating a reconstructed picture based on the prediction samples and the residual samples may be performed by the adder of the decoding apparatus of FIG. 25.

According to the present disclosure, an MPM list for the current block may be constructed by considering the increase of the number of intra prediction modes, through which accuracy of the MPM list for representing an intra prediction mode of the current block may be improved, and the overall coding efficiency may be improved.

Also, according to the present disclosure, complicated computations may be reduced, and an MPM list including a plurality of MPM candidates may be constructed based on candidate intra prediction modes derived from neighboring blocks, through which computational complexity of a process for representing an intra prediction mode of a current block may be reduced, and the overall coding efficiency may be improved.

In the embodiments described above, methods are described according to a flow diagram by using a series of steps and blocks. However, the present disclosure is not limited to a specific order of the steps, and some steps may be performed with different steps and in a different order from those described above or simultaneously. Also, it should be understood by those skilled in the art that the steps shown in the flow diagram are not exclusive, other steps may be further included, or one or more steps of the flow diagram may be deleted without influencing the technical scope of the present disclosure.

The method according to the present disclosure may be implemented in the form of software, and the encoding apparatus and/or decoding apparatus according to the present disclosure may be included in an apparatus that performs image processing, such as TV, computer, smartphone, set-top box, and display device.

When embodiments of the present disclosure are implemented by software, the aforementioned method may be implemented by a module (process or function) that performs the aforementioned function. The module may be stored in a memory and executed by a processor. The memory may be located inside or outside of the processor and may be connected to the processor via various well-known means. The processor may include Application-Specific Integrated Circuit (ASIC), other chipset, logical circuit and/or data processing device. The memory may include Read-Only Memory (ROM), Random Access Memory (RAM), flash memory, memory card, storage medium and/or other storage device. In other words, embodiments according to the present disclosure may be implemented and performed on a processor, micro-processor, controller, or chip. For example, function units illustrated in each drawing may be implemented and performed on a computer, processor, micro-processor, controller, or chip. In this case, information (for example, information on instructions) or algorithm for implementation may be stored in a digital storage medium.

Also, the decoding apparatus and the encoding apparatus to which the present disclosure is applied may include a multimedia broadcast transmission and reception device, mobile communication terminal, home cinema video device, digital cinema video device, surveillance camera, video communication device, real-time communication device for video communication, mobile streaming device, storage medium, camcorder, video on demand (VoD) service provision device, Over the top (OTT) video device, Internet streaming service provision device, 3D video device, virtual reality (VR) device, augmented reality (AR) device, video phone device, transportation means terminal (for example, vehicle (including self-driving vehicles) terminal, airplane terminal, and ship terminal), and medical video device; and may be used for processing a video signal or a data signal. For example, OTT video devices may include a game console, Bluray player, Internet connection TV, home theater system, smartphone, tablet PC, and digital video recorder (DVR).

Also, a processing method to which the present disclosure is applied may be produced in the form of a program executed by a computer and may be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Bluray disk (BD), universal serial bus (USB), ROM, PROM, EPROM, EEPROM, RAM, CD-ROM, magnetic tape, floppy disk, and optical data storage device. Also, the computer-readable recording medium includes a media implemented in the form of a carrier (for example, transmission through the Internet). Also, a bitstream generated according to the encoding method may be stored in a computer-readable recording medium or transmitted through a wired or wireless communication network.

Also, the embodiment of the present disclosure may be implemented as a computer program product in the form of program code, and the program code may be executed by a computer according to the embodiment of the present disclosure. The program code may be stored on a computer-readable carrier.

Figure 26:
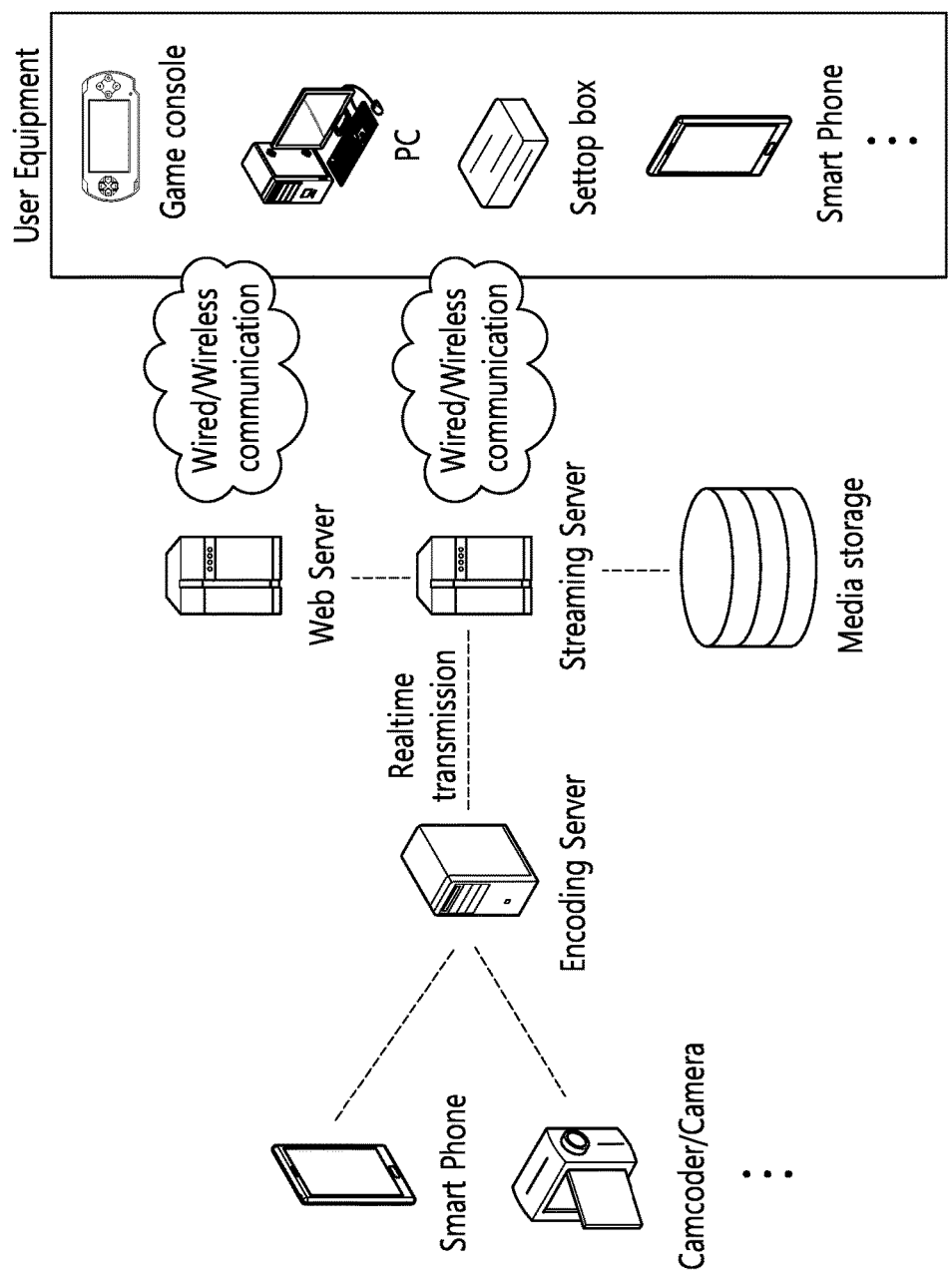
FIG. 26 illustrates an example of a contents streaming system to which the present disclosure disclosed in the present document may be applied.

FIG. 26 illustrates an example of a contents streaming system to which the present disclosure disclosed in the present document may be applied.

Referring to FIG. 26, the contents streaming system to which the present disclosure is applied may largely include an encoding server, streaming server, web server, media storage, user device, and multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

What is claimed is:

1. A video decoding method performed by a decoding apparatus, the method comprising:
deriving a first candidate intra prediction mode based on a first neighboring block of a current block;
deriving a second candidate intra prediction mode based on a second neighboring block of the current block;
constructing an intra prediction mode candidate list of the current block based on the first candidate intra prediction mode and the second candidate intra prediction mode;
deriving an intra prediction mode for the current block based on the intra prediction mode candidate list; and
generating a prediction sample for the current block based on the intra prediction mode,
wherein the first neighboring block is a left neighboring block located at the lowermost side among neighboring blocks adjacent to a left boundary of the current block,
wherein the second neighboring block is an upper neighboring block located at the rightmost side among neighboring blocks adjacent to an upper boundary of the current block,
wherein, based on a determination that a size of the current block is W×H, and x and y components of a top-left sample position of the current block are xN and yN respectively, the first neighboring block is a block including a sample at the coordinates of (xN−1, yN+H−1), and the second neighboring block is a block including a sample at the coordinates of (xN+W−1, yN−1),
wherein the intra prediction mode candidate list of the current block is derived as a first intra prediction mode candidate list based on a determination that the first candidate intra prediction mode and the second candidate intra prediction mode are non-angular intra modes, and
wherein the first intra prediction mode candidate list comprises a vertical intra prediction mode of which value is 50, a horizontal intra prediction mode of which value is 18, an intra prediction mode having a value of 46 being equal to a value derived by subtracting 4 from the value of the vertical intra prediction mode, and an intra prediction mode having a value of 54 being equal to a value derived by adding 4 to the value of the vertical intra prediction mode.

2. The method of claim 1, wherein, based on a determination that the first neighboring block is available, and intra prediction is applied to the first neighboring block, the first candidate intra prediction mode is derived as an intra prediction mode of the first neighboring block, and
wherein based on a determination that the first neighboring block is unavailable, or the intra prediction is not applied to the first neighboring block, the first candidate intra prediction mode is derived as a planar intra prediction mode.

3. The method of claim 1, wherein, based on a determination that the second neighboring block is available, intra prediction is applied to the second neighboring block, and the second neighboring block is included in a current CTU, the second candidate intra prediction mode is derived as an intra prediction mode of the second neighboring block, and wherein based on a determination that the second neighboring block is unavailable, the intra prediction is not applied to the second neighboring block, or the second neighboring block is not included in the current CTU, the second candidate intra prediction mode is derived as a planar intra prediction mode.

4. The method of claim 1, wherein the intra prediction mode candidate list of the current block is derived as a second intra prediction mode candidate list based on a determination that the first candidate intra prediction mode is equal to the second candidate intra prediction mode and a mode value of the first candidate intra prediction mode is larger than a mode value of a DC intra prediction mode which is 1, and wherein the second intra prediction mode candidate list is derived based on the first candidate intra prediction mode and an intra prediction mode having a value obtained by subtracting 1 from the first candidate intra prediction mode.

5. The method of claim 1, wherein the intra prediction mode candidate list of the current block is derived as a third intra prediction mode candidate list based on a determination that the first candidate intra prediction mode is not equal to the second candidate intra prediction mode, both of the first and the second candidate intra prediction modes are not larger than a mode value of a DC intra prediction mode, and the sum of mode values of the first and second candidate intra prediction modes are larger than or equal to 2, and wherein the third intra prediction mode candidate list is derived based on an intra prediction mode having a value obtained by subtracting 1 from a larger mode value of mode values of the first and second candidate intra prediction modes.

6. The method of claim 1, wherein the intra prediction mode candidate list of the current block is derived as a fourth intra prediction mode candidate list based on a determination that the first candidate intra prediction mode is not equal to the second candidate intra prediction mode, both of the first and the second candidate intra prediction modes are larger than a mode value of a DC intra prediction mode, and wherein the fourth intra prediction mode candidate list is derived based on an intra prediction mode having a value obtained by subtracting 1 from a larger mode value of mode values of the first and second candidate intra prediction modes.

7. The method of claim 4, wherein, based on a determination that the mode value of the first candidate intra prediction mode is not larger than the mode value of the DC intra prediction mode, the intra prediction mode candidate list of the current block is derived as a second intra prediction mode candidate list.

8. The method of claim 7, wherein the second intra prediction mode candidate list includes 6 intra prediction mode candidates; and the first intra prediction mode candidate is derived as a planar intra prediction mode, the second intra prediction mode candidate is derived as a DC intra prediction mode, the third intra prediction mode candidate is derived as intra prediction mode 50, the fourth intra prediction mode candidate is derived as intra prediction mode 18, the fifth intra prediction mode candidate is derived as intra prediction mode 46, and the sixth intra prediction mode candidate is derived as intra prediction mode 54.

9. The method of claim 4, wherein the constructing the intra prediction mode candidate list of the current block further includes:

based on a determination that the first candidate intra prediction mode is not the same as the second candidate intra prediction mode, deriving a first intra prediction mode candidate of the intra prediction mode candidate list as the first candidate intra prediction mode and a second intra prediction mode candidate of the intra prediction mode candidate list as the second candidate intra prediction mode; and deriving the remaining intra prediction mode candidates of the intra prediction mode candidate list based on whether the mode values of the first candidate intra prediction mode and the second candidate intra prediction mode are larger than that of the DC intra prediction mode.

10. The method of claim 9, wherein, based on a determination that the mode values of the first candidate intra prediction mode and the second candidate intra prediction mode are larger than that of the DC intra prediction mode, the third intra prediction mode candidate is derived as the planar intra prediction mode, the fourth intra prediction mode candidate is derived as the DC intra prediction mode, and the fifth intra prediction mode candidate and the sixth intra prediction mode candidate are derived based on a difference between the mode values of the largest candidate intra prediction mode and the smallest candidate intra prediction mode.

11. The method of claim 10, wherein, based on a determination that a difference between the mode values of the largest candidate intra prediction mode and the smallest candidate intra prediction mode is not 1 nor 64, the fifth intra prediction mode candidate is derived as an intra prediction mode represented by a value obtained by subtracting 1 from the mode value of the first candidate intra prediction mode according to modular arithmetic, and the sixth intra prediction mode candidate is derived as an intra prediction mode represented by a value obtained by adding 1 to the mode value of the first candidate intra prediction mode according to the modular arithmetic.

12. The method of claim 11, wherein the candidate intra prediction with the larger mode value between the first candidate intra prediction mode and the second intra prediction mode is derived as the largest candidate intra prediction mode, and the candidate intra prediction mode with the smaller mode value between the two is derived as the smallest candidate intra prediction mode.

13. A video encoding method performed by an encoding apparatus, the method comprising:

deriving a first candidate intra prediction mode based on a first neighboring block of a current block;

deriving a second candidate intra prediction mode based on a second neighboring block of the current block;

constructing an intra prediction mode candidate list of the current block based on the first candidate intra prediction mode and the second candidate intra prediction mode;

determining an intra prediction mode for the current block based on the intra 7 prediction mode candidate list;

generating a prediction sample for the current block based on the intra prediction mode; and encoding video information comprising intra prediction mode information for the current block, wherein the first neighboring block is a left neighboring block located at the lowermost side among neighboring blocks adjacent to a left boundary of the current block, wherein the second neighboring block is an upper neighboring block located at the rightmost side among neighboring blocks adjacent to an upper boundary of the current block, wherein, based on a determination that a size of the current block is W x H, and x and y components of a top-left sample position of the current block are xN and yN respectively, the first neighboring block is a block including a sample at the coordinates of (xN−1, yN+H−1), and the second neighboring block is a block including a sample at the coordinates of (xN+W−1, yN−1), wherein the intra prediction mode candidate list of the current block is derived as a first intra prediction mode candidate list based on a determination that the first candidate intra prediction mode and the second candidate intra prediction mode are non-angular intra modes, and wherein the first intra prediction mode candidate list comprises a vertical intra prediction mode of which value is 50, a horizontal intra prediction mode of which value is 18, an intra prediction mode having a value of 46 being equal to a value derived by subtracting 4 from the value of the vertical intra prediction mode, and an intra prediction mode having a value of 54 being equal to a value derived by adding 4 to the value of the vertical intra prediction mode.

14. A non-transitory computer-readable storage medium storing a bitstream, the bitstream causing a decoding apparatus to perform a video decoding method including the following steps:

deriving a first candidate intra prediction mode based on a first neighboring block of a current block;

deriving a second candidate intra prediction mode based on a second neighboring block of the current block;

constructing an intra prediction mode candidate list of the current block based on the first candidate intra prediction mode and the second candidate intra prediction mode;

deriving an intra prediction mode for the current block based on the intra prediction mode candidate list; and generating a prediction sample for the current block based on the intra prediction mode, wherein the first neighboring block is a left neighboring block located at the lowermost side among neighboring blocks adjacent to a left boundary of the current block, wherein the second neighboring block is an upper neighboring block located at the rightmost side among neighboring blocks adjacent to an upper boundary of the current block, wherein, based on a determination that a size of the current block is W x H, and x and y components of a top-left sample position of the current block are xN and yN respectively, the first neighboring block is a block including a sample at the coordinates of (xN−1, yN+H−1), and the second neighboring block is a block including a sample at the coordinates of (xN+W−1, yN−1), wherein the intra prediction mode candidate list of the current block is derived as a first intra prediction mode candidate list based on a determination that the first candidate intra prediction mode and the second candidate intra prediction mode are non-angular intra modes, and wherein the first intra prediction mode candidate list comprises a vertical intra prediction mode of which value is 50, a horizontal intra prediction mode of which value is 18, an intra prediction mode having a value of 46 being equal to a value derived by subtracting 4 from the value of the vertical intra prediction mode, and an intra prediction mode having a value of 54 being equal to a value derived by adding 4 to the value of the vertical intra prediction mode.

* * * * *

UNITED STATES PATENT AND TRADEMARK OFFICE
CERTIFICATE OF CORRECTION

PATENT NO. : 11,128,857 B2  
APPLICATION NO. : 16/837857  
DATED : September 21, 2021  
INVENTOR(S) : Heo et al.

Page 1 of 1

It is certified that error appears in the above-identified patent and that said Letters Patent is hereby corrected as shown below:

In the Claims

Column 62, Line 56, of Claim 13, replace "based on the intra 7 prediction mode candidate list;" with --based on the intra prediction mode candidate list;--.

Signed and Sealed this  
Twenty-second Day of March, 2022

Drew Hirshfeld  
*Performing the Functions and Duties of the*  
*Under Secretary of Commerce for Intellectual Property and*  
*Director of the United States Patent and Trademark Office*